United States Patent [19]
Check, Jr. et al.
[11] 3,978,457
[45] Aug. 31, 1976

[54] MICROCOMPUTERIZED ELECTRONIC POSTAGE METER SYSTEM

[75] Inventors: Frank T. Check, Jr., Orange; Alton B. Eckert, Jr., Norwalk; Joseph R. Warren, Stamford, all of Conn.

[73] Assignee: Pitney-Bowes, Inc., Stamford, Conn.

[22] Filed: Dec. 23, 1974

[21] Appl. No.: 536,248

[52] U.S. Cl. .............................................. 340/172.5
[51] Int. Cl.² .............................................. G06F 1/00
[58] Field of Search ..................... 340/172.5, 147 R; 235/92 EA, 1, 151; 101/91, 93.08

[56] References Cited

UNITED STATES PATENTS

| | | | |
|---|---|---|---|
| 3,057,547 | 10/1962 | Adler et al. | 235/1 |
| 3,255,439 | 6/1966 | Simjian | 340/172.5 |
| 3,428,948 | 2/1969 | Simjian | 340/147 |
| 3,770,945 | 11/1973 | Dlugos et al. | 235/92 EA |
| 3,792,446 | 2/1974 | McFiggins et al. | 340/172.5 |
| 3,823,666 | 7/1974 | Hanson | 101/91 |
| 3,832,946 | 9/1974 | Lupkas et al. | 101/93.08 |
| 3,869,986 | 3/1975 | Hubbard | 101/91 |
| 3,938,095 | 2/1976 | Check et al. | 340/172.5 |

*Primary Examiner*—Raulfe B. Zache
*Attorney, Agent, or Firm*—William D. Soltow, Jr.; Albert W. Scribner; Robert S. Salzman

[57] ABSTRACT

An advanced electronic postage meter system is described, which is built around a micro computer set. The micro computer set is of LSI design, and comprises a single chip central processor unit (CPU) which performs all control and data processing functions. Auxiliary to the CPU are ROM's which store the program of the postage meter system; RAM's which provide the system with a working memory; and Shift Registers which expand the I/O capacity of the system and provide multiplexing capability. The postage meter system comprises componentry such as a non-volatile memory for postage accounting purposes; a display for visually monitoring the functions of the system; a keyboard for instructing the system; and a modified postage meter with motorized setting means for printing postage upon pieces of mail. These peripheral devices communicate with the micro computer set through ports, and means are provided to expand port capabilities for these peripheral devices.

11 Claims, 60 Drawing Figures

LAMP OUTPUT AREA – MEMORY LOCATION

206

| | BIT 8 | BIT 4 | BIT 2 | BIT 1 |
|---|---|---|---|---|
| 8B | 17 | 18 | 19 | 20 |
| 8C | 13 CALL P.B. SERVICE | 14 $ UNLOCK | 15 LOW POSTAGE < 100.00 | 16 INSUFFICIENT POSTAGE |
| 8D | 9 | 10 METER ENABLED | 11 | 12 CHECK DATE |
| 8E | 5 BATCH AMOUNT | 6 BATCH COUNT | 7 CONTROL SUM | 8 |
| 8F | 1 ASCENDING REGISTER | 2 DESCENDING REGISTER | 3 PIECE COUNTER | 4 |

POWER SUPPLY TURN-ON/SHUT DOWN SIGNAL

CHART FOR POSTAGE METER PROGRAM

INITIALIZATION

CHCK

INRAM

DOWN

FIG. 26.

FCTN

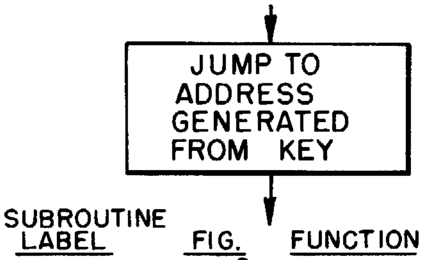

| KEY | SUBROUTINE LABEL | FIG. | FUNCTION |
|---|---|---|---|
| 0 | ZERO | 27 | NUMERICAL KEYBOARD ENTRY |
| 1 | ONE | 27 | |
| 2 | TWO | 27 | |
| 3 | THREE | 27 | |
| 4 | FOUR | 27 | |
| 5 | FIVE | 27 | |
| 6 | SIX | 27 | |
| 7 | SEVEN | 27 | |
| 8 | EIGHT | 27 | |
| 9 | NINE | 27 | |
| SET | SET | 28 | SET METER OR RECALL PREVIOUS SETTING |
| $ UNLOCK | UNLCK | 29 | $ UNLOCK FLAG |
| PRINT PHOTOCELL INPUT | POST | 30 | UPDATE REGISTERS AFTER PRINTING POSTAGE |
| + | ADD | 31 | ADD FUNDS INTO METER |
| − | SUBD | 32 | SUBTRACT FUNDS FROM METER |
| CLEAR | CLEAR | 34 | CLEAR FUNCTION |
| ± | PLUS | 33 | ADDITION FUNCTION |
| DESC. REG. | DESC | 35 | PUT CONTENTS OF SELECTED REGISTER INTO DISPLAY |
| ASC. REG. | ASC | 35 | |
| PIECE COUNT | PIECE | 35 | |
| CONT. SUM | CNTRL | 35 | |
| BATCH AMOUNT | BSUM | 35 | |
| BATCH COUNT | BCNT | 35 | |

FIG. 27.

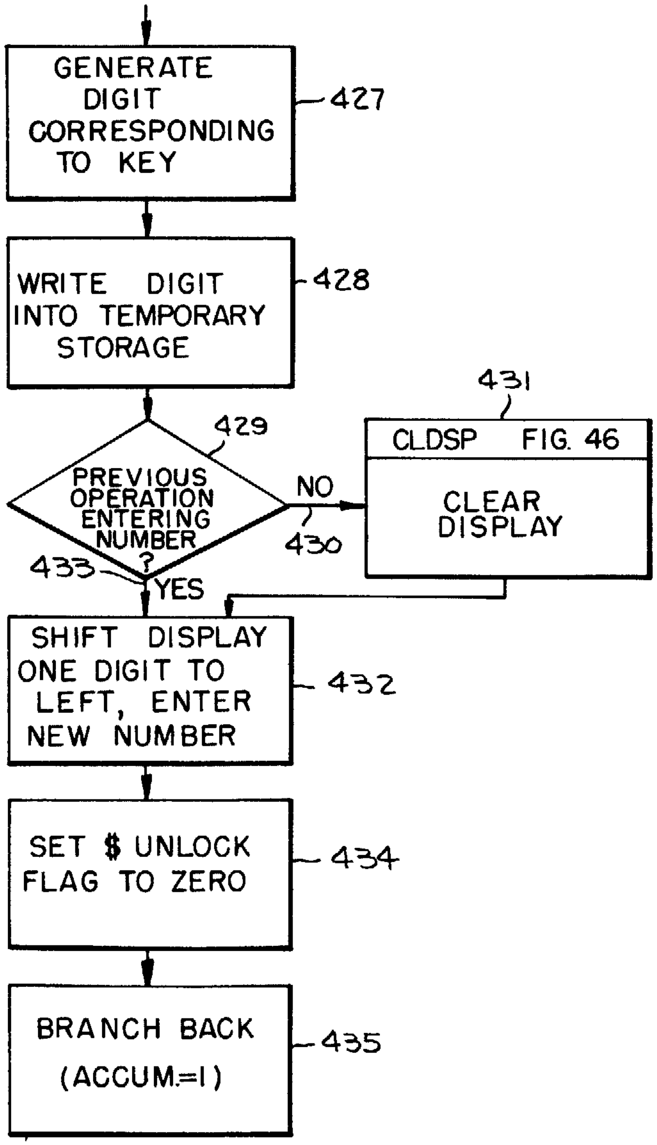

SET

FIG. 38. SCANX
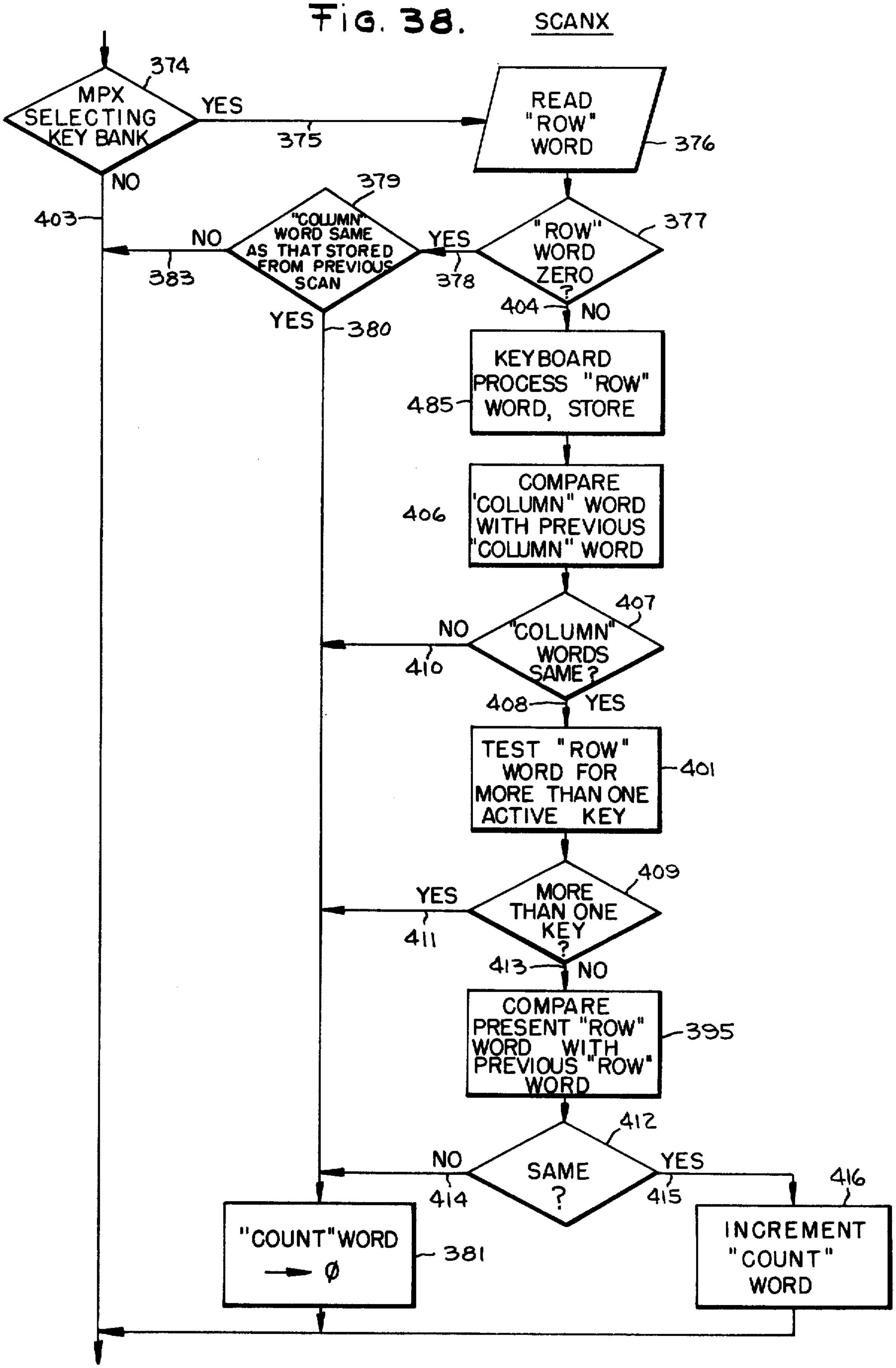

CHECK

CMPAR

FETCH

STEP

MICROCOMPUTERIZED ELECTRONIC POSTAGE METER SYSTEM

The invention relates to an electronic postage meter system, and more particularly pertains to an electronic postage meter system built upon a micro computer system.

BACKGROUND OF THE INVENTION AND RELATED APPLICATIONS

The present electronic postage meter system is a second generation, stand-alone postage system superseding the predecessor system generally shown in copending application, Ser. No. 406,898 filed Oct. 16, 1973; application Ser. No. 195,729 filed Nov. 4, 1971, now U.S. Pat. No. 3,832,946; and copending application, Ser. No. 337,234 filed July 9, 1973.

The prior postage meter system was one of the first of its kind using electronic accounting and control techniques to record and keep track of postage operations. The present inventive postage meter system follows in the steps of the previous system, but adds versatility, compactness, and flexibility to the electronic metering concept. The TTL logic of the prior system has now been replaced by a totally self-contained postage system built around an LSI micro computer set. The micro computer set provides flexibility by affording easy system changes by the addition of peripheral equipment and associated programming. The entire personality of the postage system is determined by the instructions in ROM. The inventive micro computer postage system can have the programmed capability of a more intricate system built into it, and when there is a need to expand the system, it can be accomplished without having to make intricate wiring changes as was required with the prior TTL logic system. Each micro computer postage system may thus be specifically fashioned to the needs of the individual user without difficulty.

SUMMARY OF THE INVENTION

The invention relates to a computerized postage meter system employing a central processing unit, a plurality of memory units, a multiplex input and output, and postage setting means responsive to the controlled interactions between the CPU, memories, input and outputs, for setting predetermined postage and printing the postage as desired. The system is built up about a plurality of LSI components and employs LSI technology to provide a functional relationship enabling the electronic postage meter system to accomplish its predetermined functions.

In general configuration, a central processing unit for providing the data flow control and for providing calculation of postage in accordance with input supply thereto, is the essential element of this system. Coupled to the CPU is a permanent memory for storing a postal data program and is a non-alterable storage medium. A temporary memory is also provided for storing and forwarding working data in accordance with the operation of CPU. A non-volatile memory is intercoupled with the CPU and provides a permanent or nondestructive storage location for postal funding data in accordance with the transfer routine previously established and activated in accordance with a shut-down or start-up sequence of the system. The use of a nonvolatile memory is important in that data which is significant in the system, such as the contents of descending registers which keep track of the remaining balance in the postal meter or ascending registers which keep track of the continuous accumulation of charges thereto, is permanently stored in the nonvolatile memory when the system is de-energized. As a corollary, when the system starts up, the data from the nonvolatile memory is transferred back into the temporary memory.

Further interaction with the CPU is provided by means of an appropriate input device such as a keyboard which provides the appropriate postal data to the CPU for the calculations to be performed. An output or display which is multiplexed with the input also interfaces with the CPU for recalling data from the temporary storage in accordance with the commands. The ultimate output of the CPU is coupled to a postage setting mechanism which sets the amount of postage to be printed into a postal printing unit for printing the postage as desired.

More specifically, the micro computerized postage meter system is built upon the MCS-4$^{R}$ micro computer set; a product of Intel Corporation, Santa Clara, Calif. It will be understood that other manufacturers and equivalent components may be employed and that Intel components are used for purposes of example. The micro computer set is of LSI design, and comprises a central processor unit (CPU-4004) which performs all control and data processing functions, and contains the control unit and arithmetic unit of a general purpose micro programmable computer. The computer system comprises a plurality of ROM's (Read Only Memory Chips - 4001) and a plurality of RAM's (Random Access Memory Chips - 4002) which are interconnected to the CPU. The ROM's contain the postage system program. One four-bit input-output port is provided on each ROM package. The RAM's provide the system with a working memory and each RAM package provides one four-bit output port. A permanent (nonvolatile) memory is provided for accounting purposes, and comprises a 4 × 128 bit COS/MOS shift register with hold-up battery. The computer system also contains shift registers (Intel number 4003) for port expansion and multiplexing capability, and associated circuitry including clocks, power supplies, and interfacing circuits to connect with the outside world.

The postage setting mechanism, although an indispensable part of this system, is itself one of several components including a keyboard for instructing the system, a display for visually monitoring the system's functions, and the aforementioned non-volatile shift register memory.

The postage printer of the inventive system is a modified Model 5300 postage meter manufactured by Pitney-Bowes, Inc., Stamford, Connecticut. The mechanical accounting means (ascending and descending registers) have been removed from the meter along with the actuator assemblies and setting levers. The remaining printer is set by a pair of solenoids and a stepping motor. The mechanical operation of the printer is monitored by a plurality of photocells strategically placed within the printer housing. When a particular function of the printer fails to be performed, a photocell monitoring that appropriate function will provide an error input to the system via an input port.

The micro computer system also receives inputs from the keyboard and non-volatile memory through an input port.

Outputs from the system are generally handled via the shift registers and output ports. These outputs include: (1) data to the display; (2) data to the nonvolatile memory; and (3) control signals to the stepper motor and solenoids setting the postage printer.

Peripheral devices may easily be added to the system such as a large external display, a receipt printer, or a listing printer, etc.

The non-volatile memory of the present system is similarly protected as in the prior system, because the meter registers must always be maintained. A shut-down circuit is again provided to protect the memory during a shut-down sequence. An enable solenoid is also provided which inhibits the printer operation when the meter is not ready or when sufficient postage is not available for the printing of postage.

Upon application of power to the system, voltage sensing circuits generate a reset pulse which initializes the micro computer system and starts executing the program from address $\phi$. The nonvolatile memory is loaded into working storage in RAM, the postage meter printer is set to zero ($\phi$), the descending register is loaded into the display to inform the operator how much funds are available, and a "check date" reminder is turned on. As with conventional meters the user is responsible for mechanically setting the correct data. The system then goes into a scan routine searching for inputs.

The inventive micro computer postage system has the following advantages:

a. This postage meter provides the capability of monitoring its own registers for errors. This feature is unique to postage metering, and results in greater accounting accuracies as well as improved security.

b. The present system offers two new registers, a batch amount register, and a batch count register. These registers provide a record of the total number of meter printings, and the total amount of postage printed. These registers are resettable to zero by the operator. These extra registers are useful to the user as a means to gage his mailing expenses.

c. The postage system of this invention allows for easier recharging of the registers with additional funds. Funds can be added without having to do any mathematical computations, or any of the mechanical operations required to recharge the mechanical postage meter. Funds are entered into the appropriate registers of the system by (1) entering the amount via keyboard and operating a switch accessable only to Postal Authorities, or (2) by means of a remote resetting method similar to that shown in U.S Pat. No. 3,792,446, issued Feb. 12, 1974.

d. Setting the postage meter is faster in this inventive system, since the printer is set by electrical signals instead of mechanical levers. Stepping motor and solenoids set the individual banks. Photocells monitor and sense proper printer operation. The solenoids position a driving gear from the stepping motor into engagement with a particular bank of the meter, one bank at a time. Each step of the motor is monitored by a slotted disc and photocells. Every fifth step is checked by a second photocell detecting a slot on the disc which is extra deep. This provides an additional check on the system. Absolute position of each bank is not sensed except at the zero position. Thus, upon initialization of the system, each bank of the printer has to be set to zero in order to establish a reference. Once the reference position has been established, the position of the printer is controlled by the micro computer.

e. The inventive postage system has means for adding in special charges to the basic postage rate, such as special delivery, certification, and insurance charges.

f. The funding registers of the invention may be run (but not necessarily so) to a zero balance. All registers (funding or otherwise) are variable in size by means of programming.

g. As previously mentioned, peripheral equipment can be easily added to this inventive system to expand and amplify its usefulness. The system can be redesigned to the individual needs of the user without having to make costly and intricate changes in the basic equipment, wiring, or circuitry.

It is an object of this invention to provide an improved electronic postage meter system;

It is another object of the invention to provide a postage meter system built around a micro computer set; and It is a further object of the invention to provide an electronic postage meter system which is compact, and which can be easily modified to the individual needs of the user.

These and other objects of the invention will become more apparent and will be better understood with reference to the following detailed description taken in conjunction with the attached drawings, in which:

FIG. 1*a* is a functional block diagram of a micro computerized postage meter system of the present invention;

FIG. 1*b* is a perspective view of the housing for the computerized postage meter of FIG. 1*a;*

FIG. 1*c* is an enlarged plan view of the keyboard display shown in FIG. 1*b;*

FIG. 1*d* is a block diagram of the micro computerized LSI components making up the postage meter system of the invention;

Figure 1A:
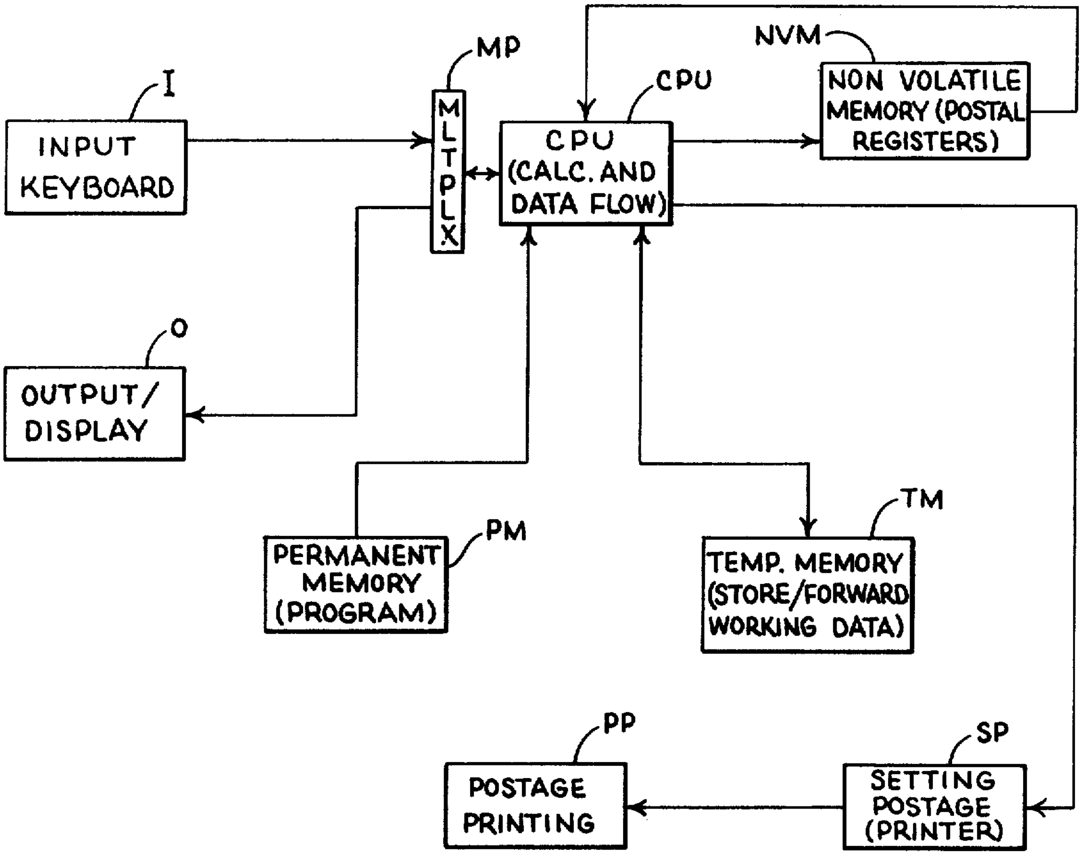
Figure 1B:
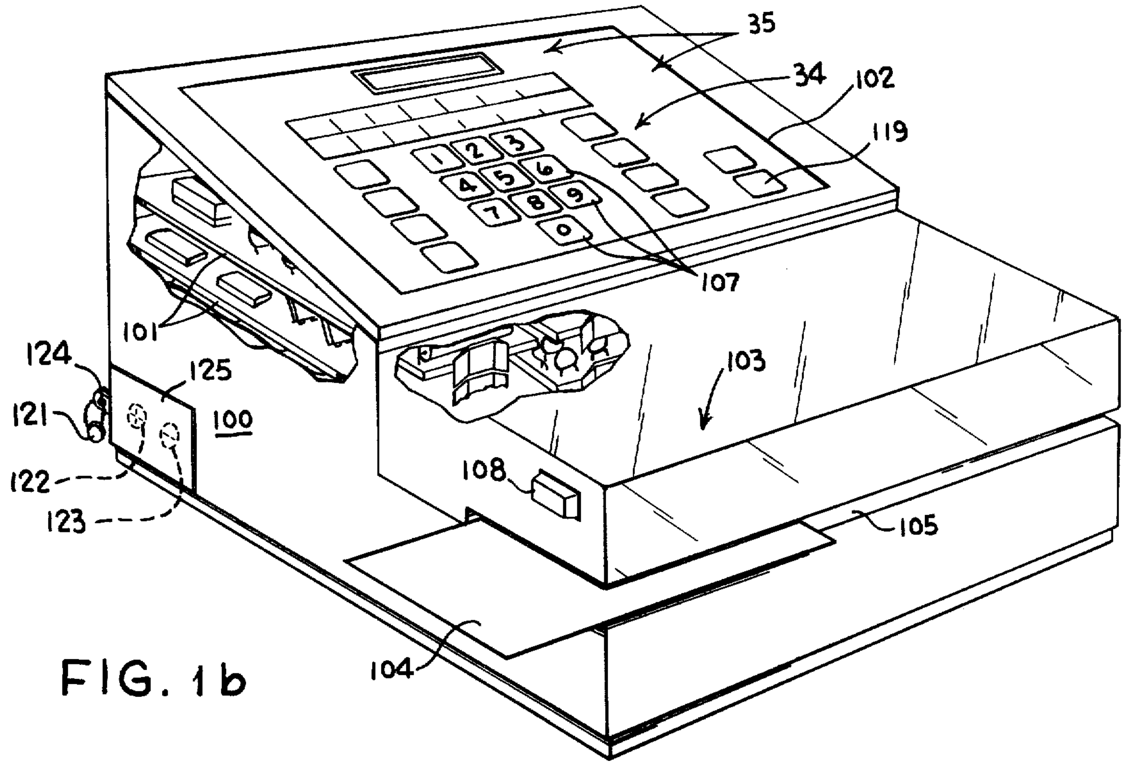
Figure 1C:
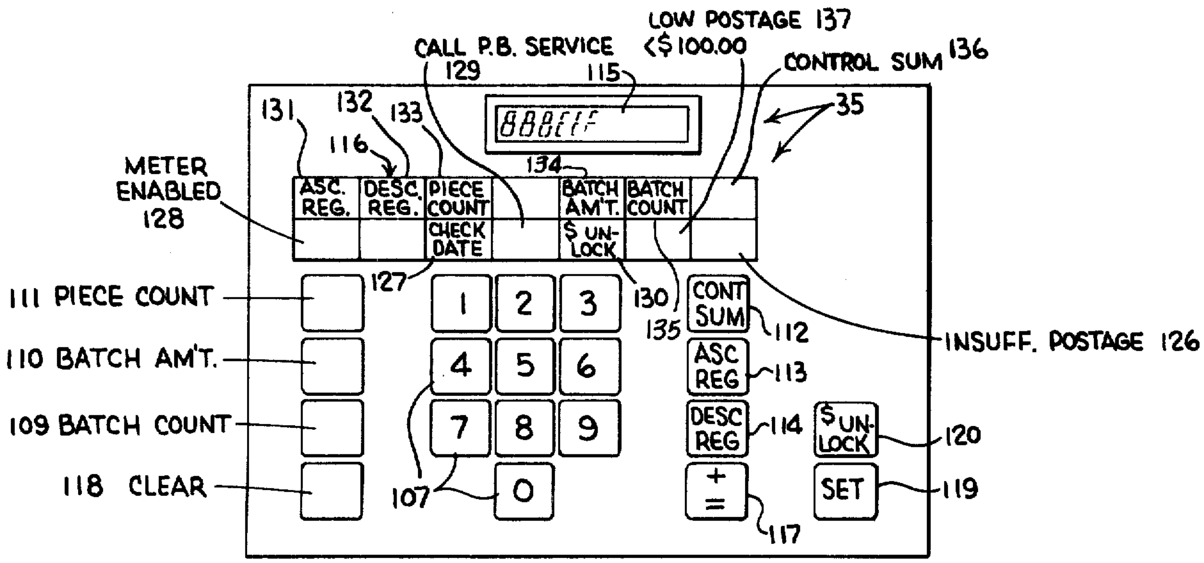
Figure 1D:
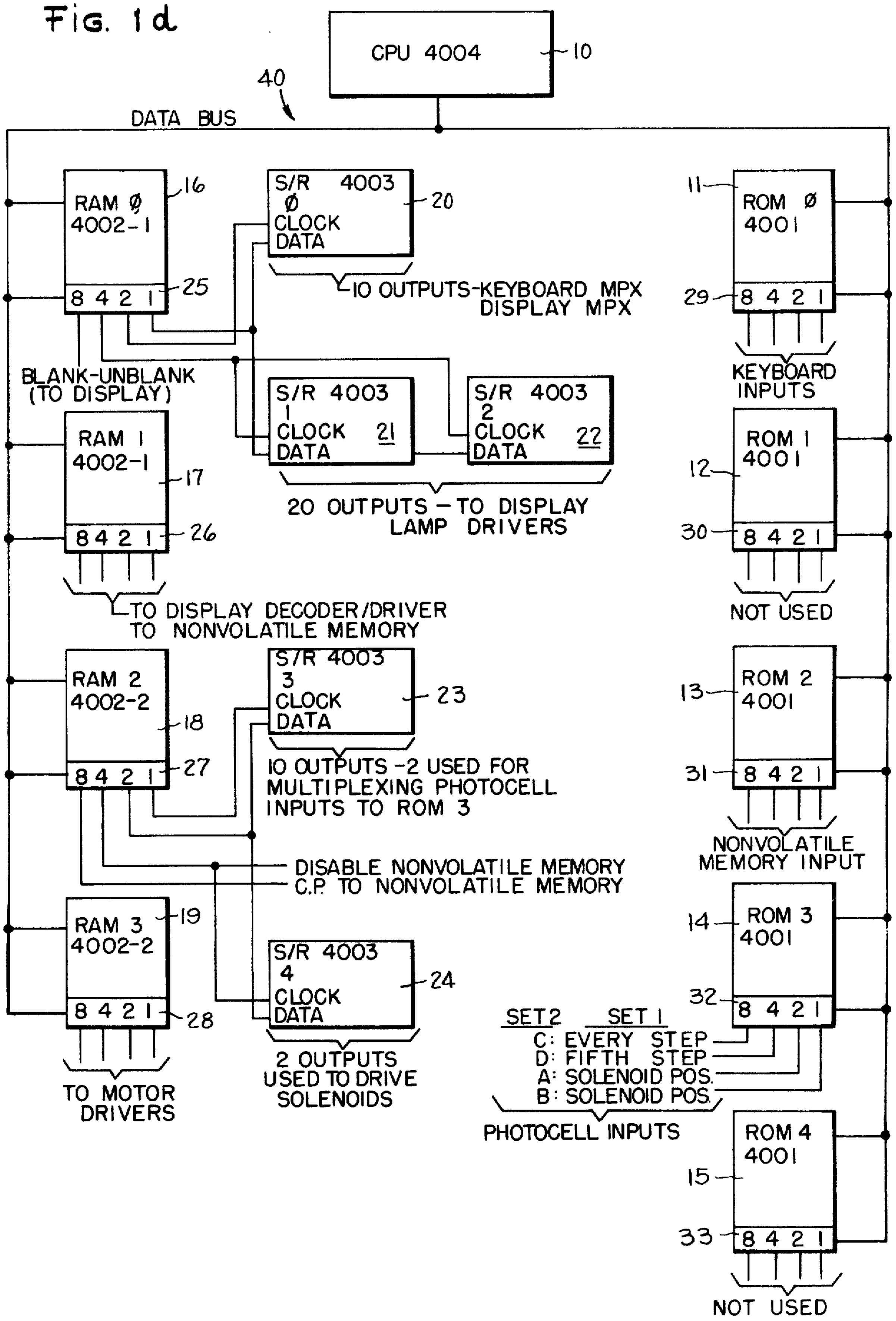
Figure 3:
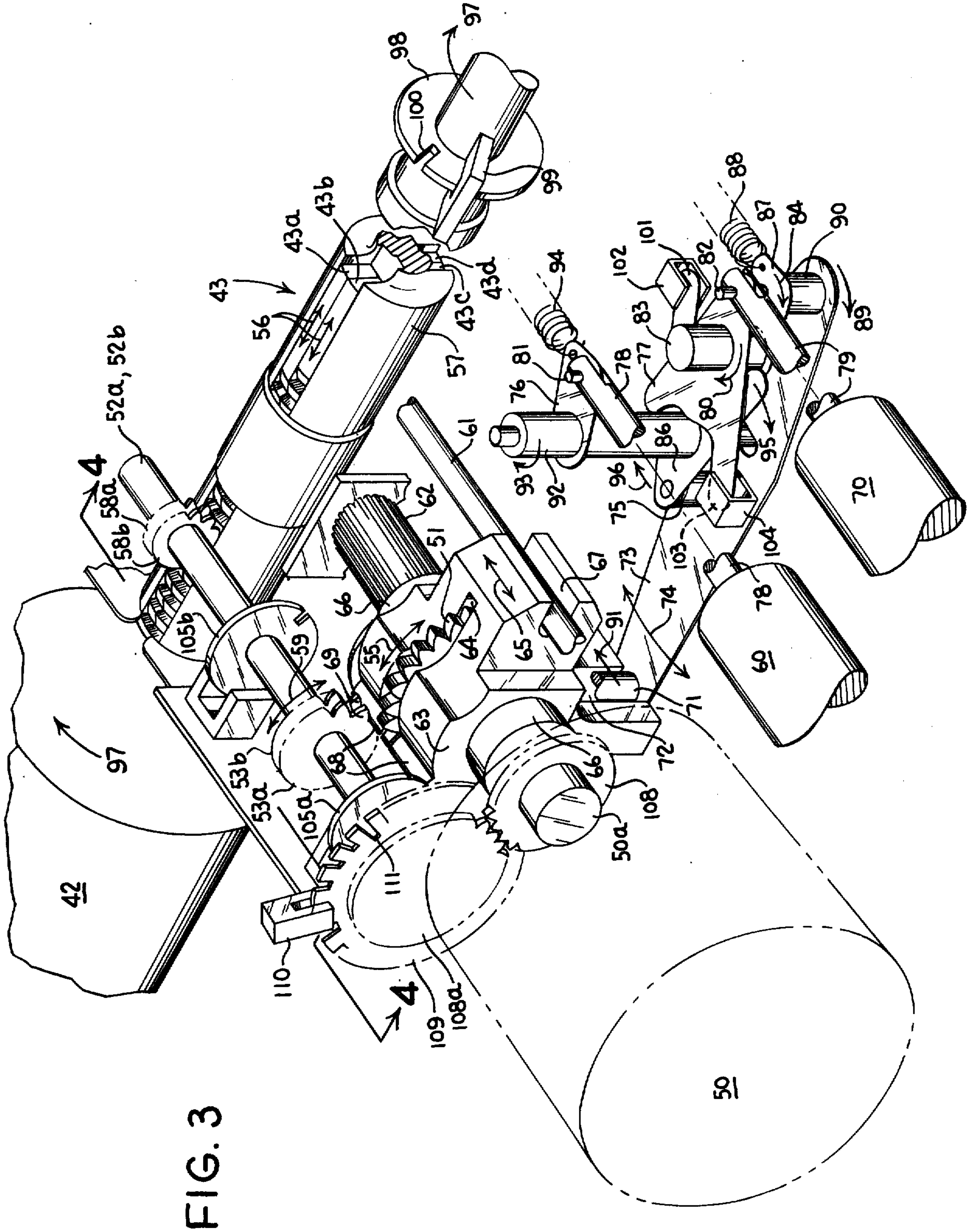
FIG. 3 is a perspective view of the postage setting and printing apparatus for the computerized postage meter system of FIG. 1*d;*
Figure 4A:
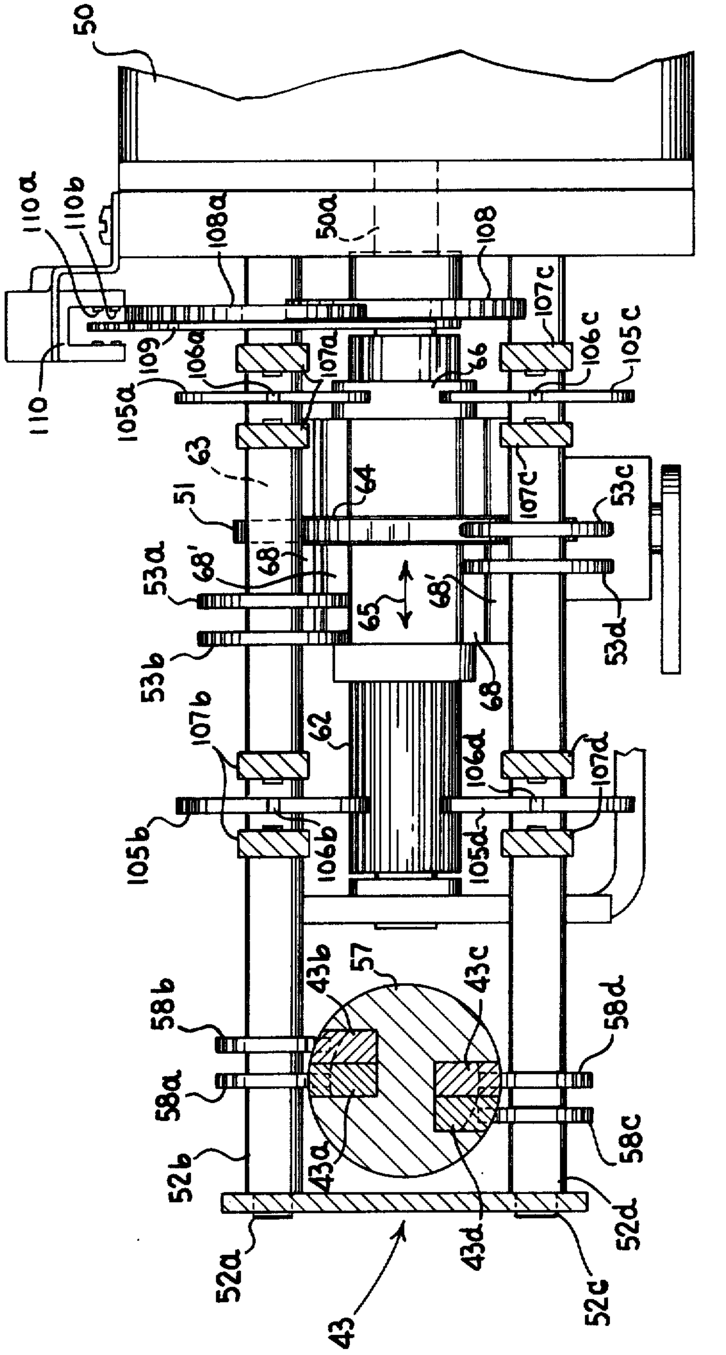
Figure 5:
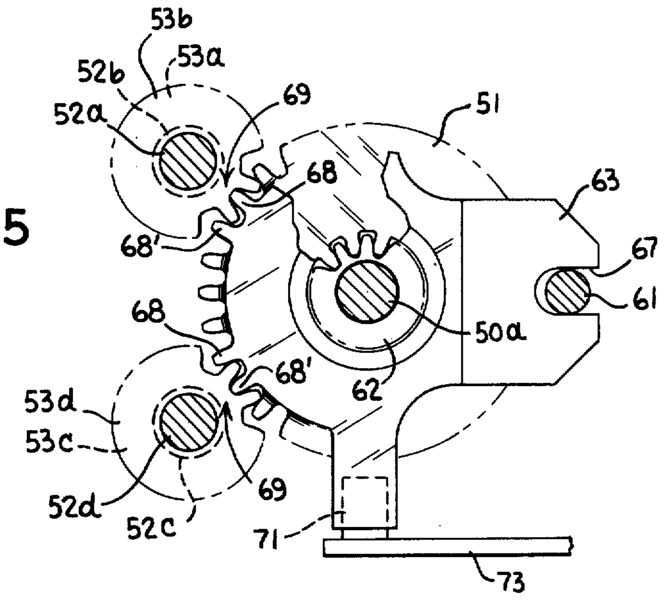
Figure 4B:
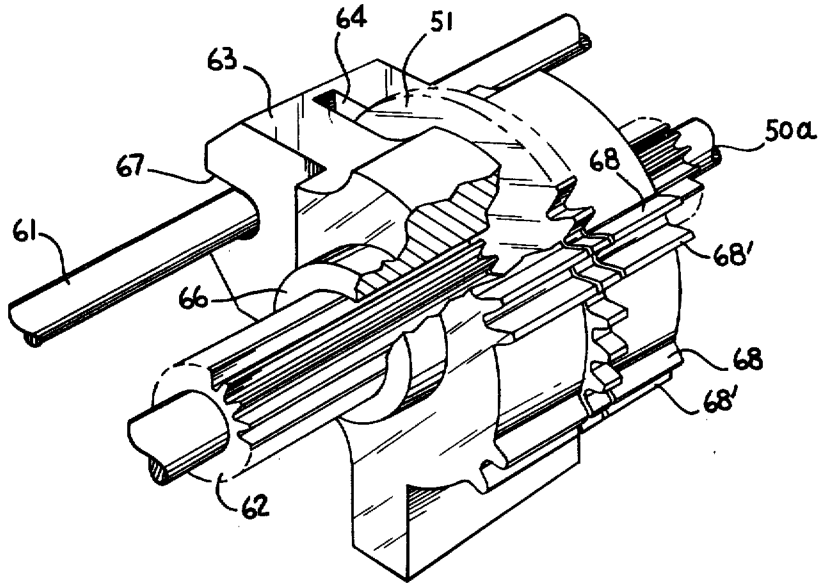
Figures 6, 8A:
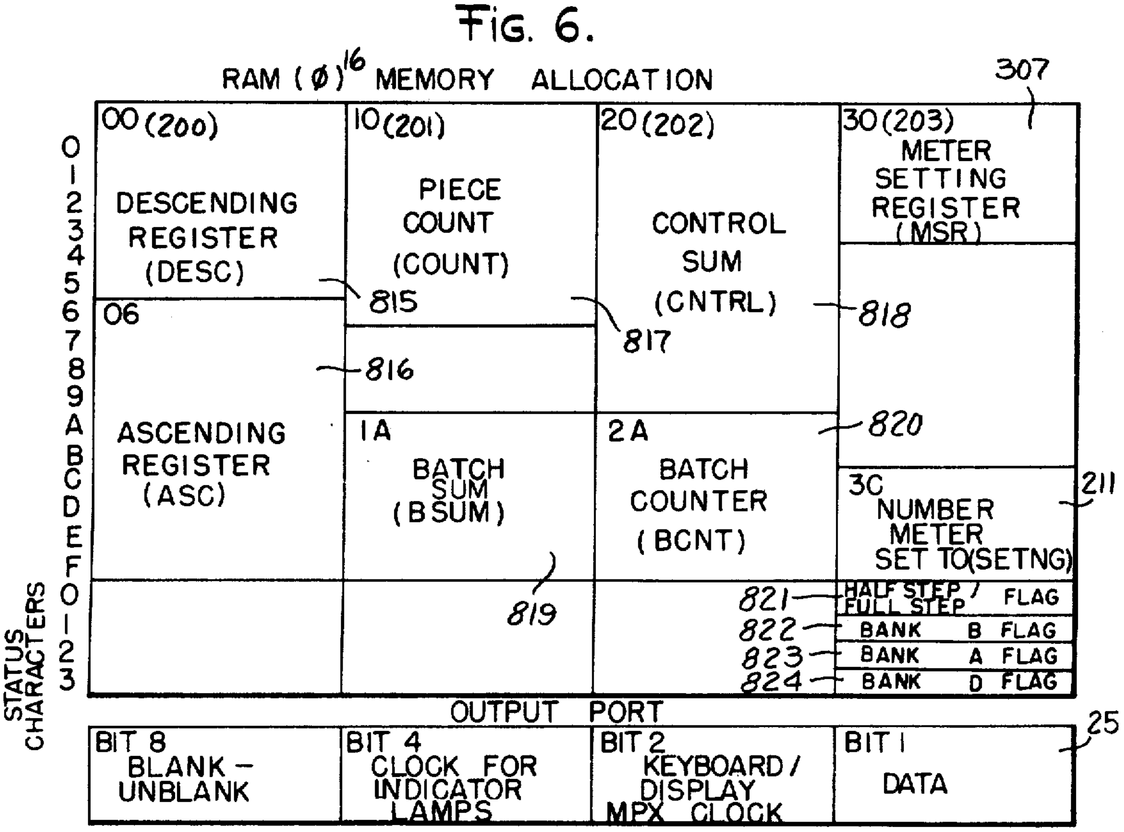
Figure 7:
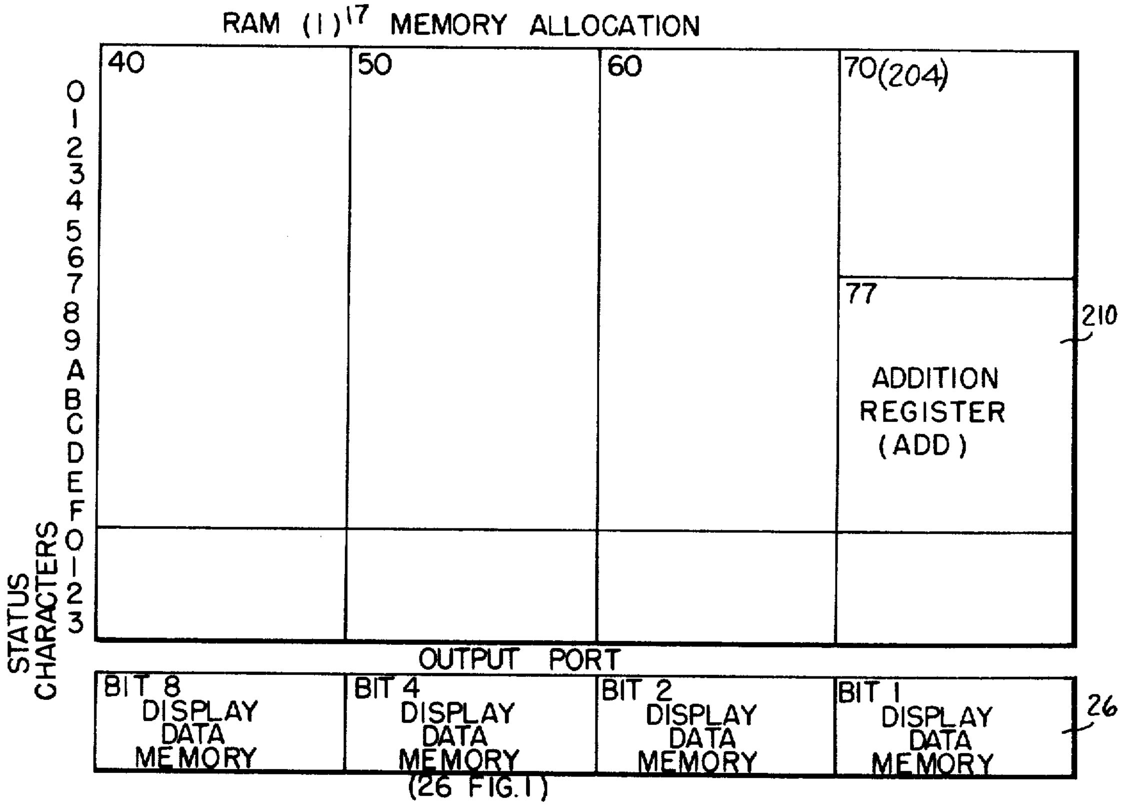
Figure 8:
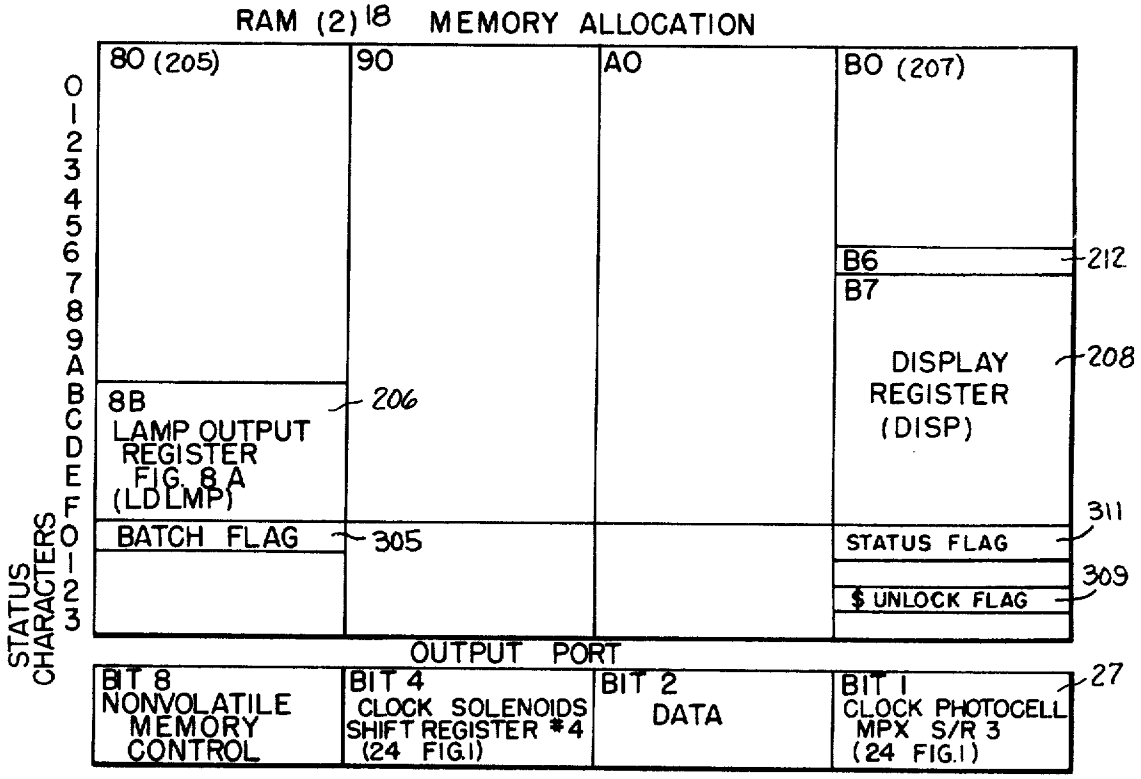
Figure 9:
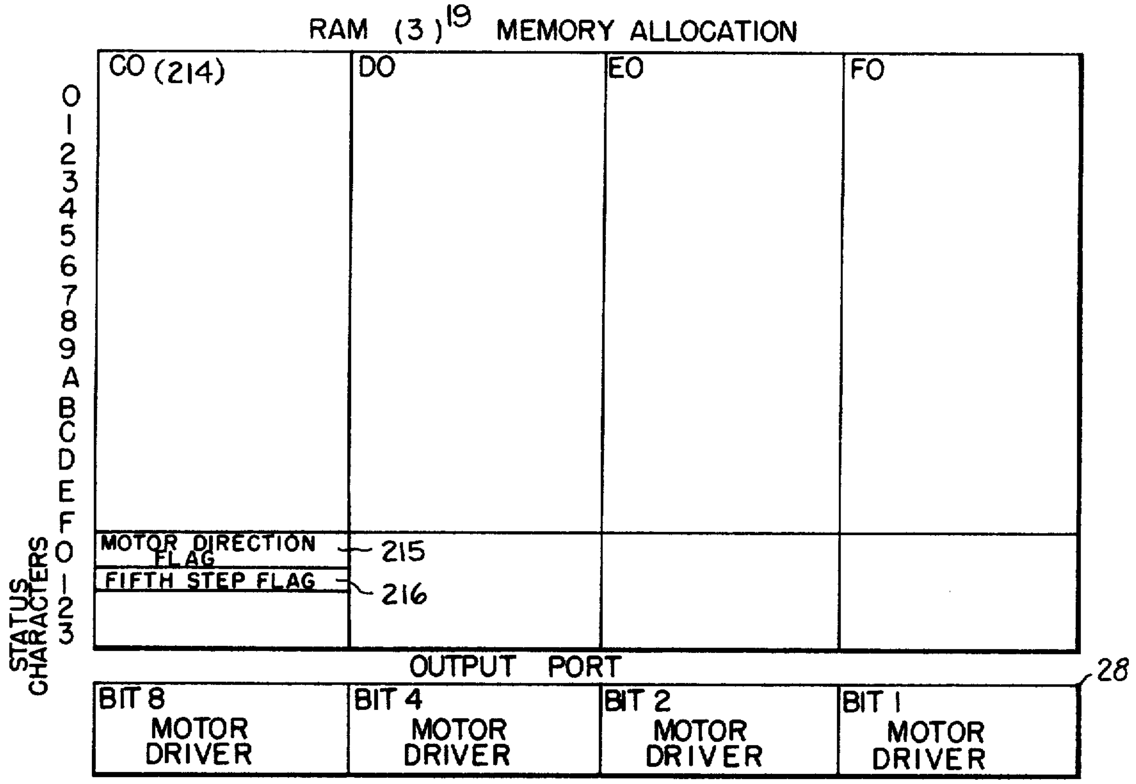
Figure 10:
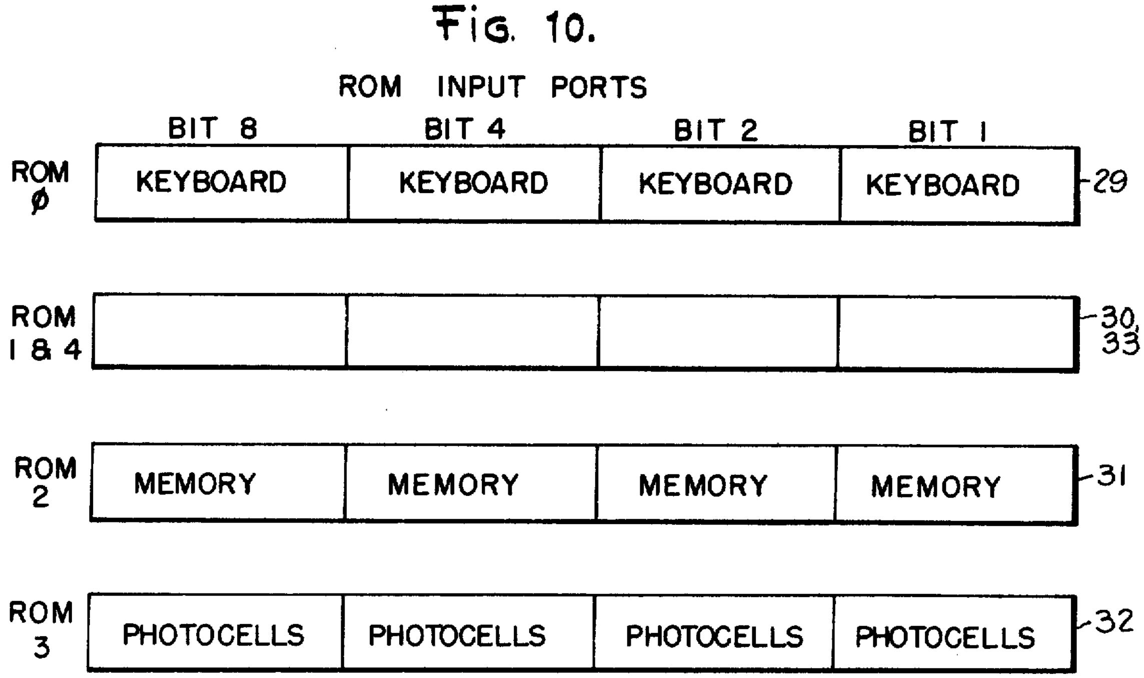

FIG. 4*a* is a side view of the setting and printing apparatus of FIG. 3 as taken along lines 4—4;

FIG. 4*b* is an enlarged partially cutaway perspective view of the yoke, main gear, and splined shaft of the setting mechanism of FIG. 3;

FIG. 5 is a front view of FIG. 4*a* with a section cutaway to show the intermeshing relationships between various geared parts;

FIG. 6 is a schematic view of the memory allocation shown for RAM($\phi$)16 of FIG. 1*d* and its associated output port;

FIG. 7 is a schematic view of the memory allocation depicted for RAM(1)17 of FIG. 1*d* and its associated output port;

FIG. 8 is a schematic view of the memory allocation illustrated for RAM(2)18 of FIG. 1*d* and its associated output port;

FIG. 8*a* is a more detailed schematic view of a portion of the memory allocation shown in FIG. 8;

FIG. 9 is a schematic view of the memory allocation shown for RAM(3)19 of FIG. 1*d* and its associated output port;

FIG. 10 is a schematic view of the ROM input ports of FIG. 1*d;*

Figure 2:
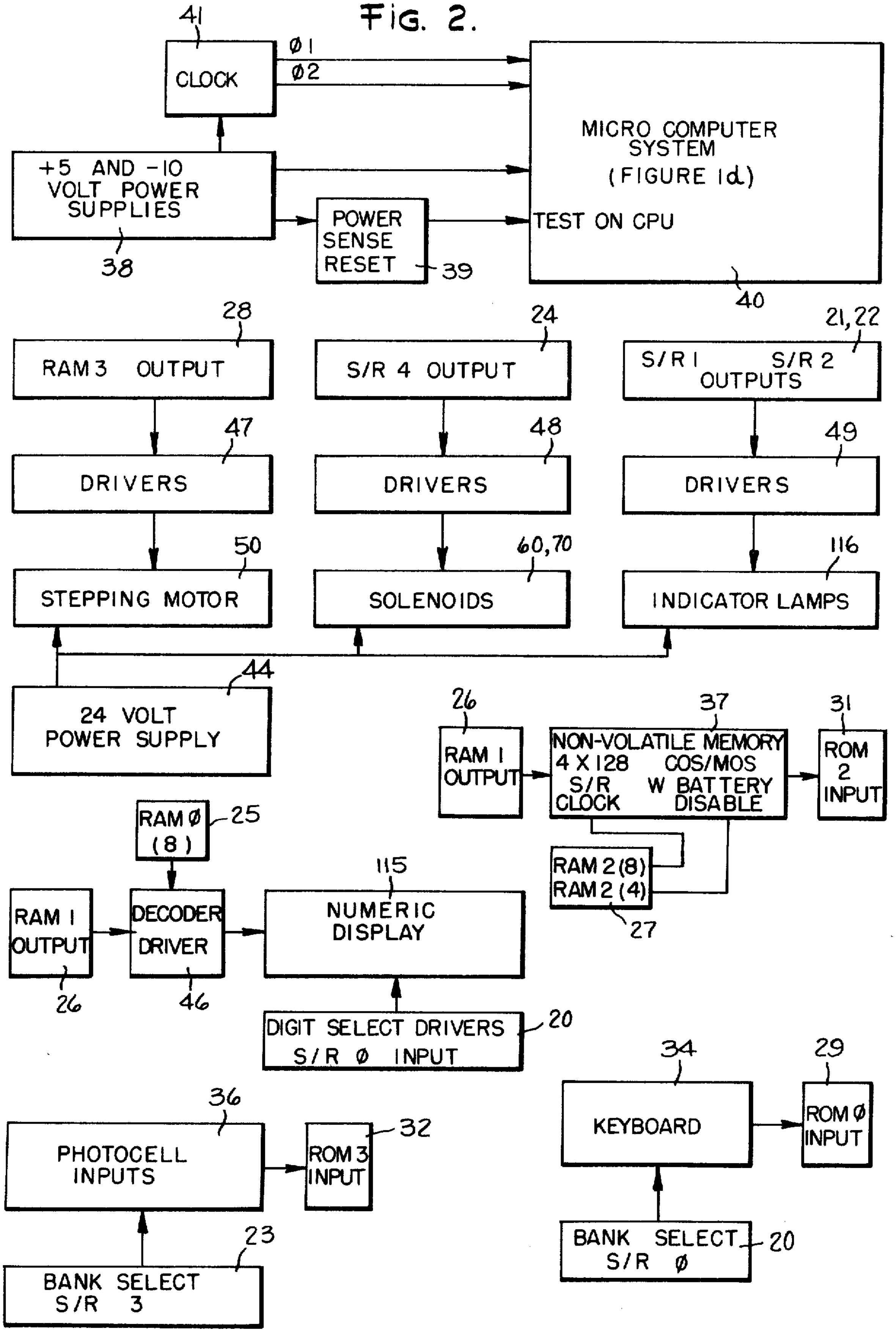
FIG. 2 is a block diagram of the peripheral components for the computer system of FIG. 1*d;*
Figure 11:
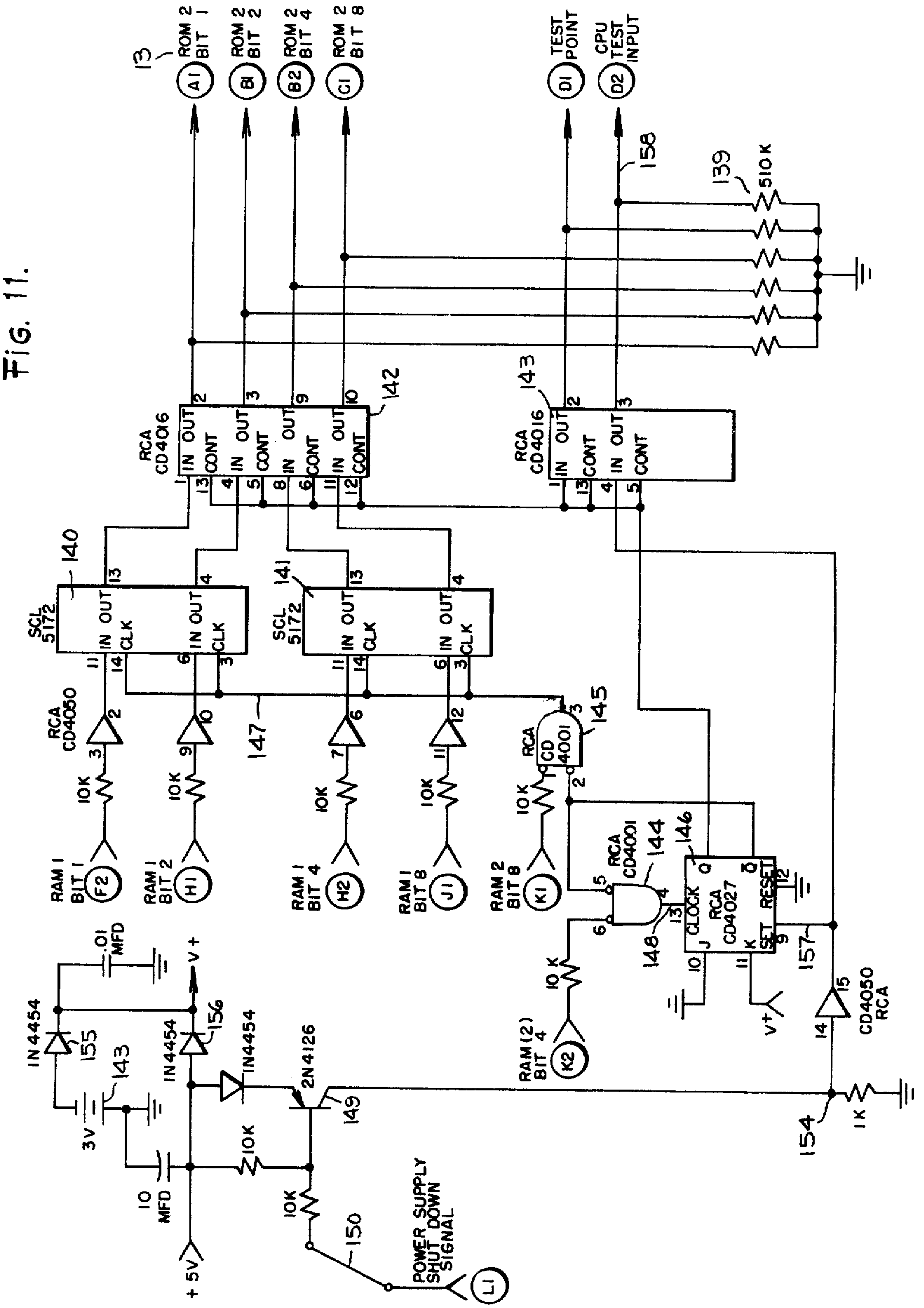
Figure 12A:
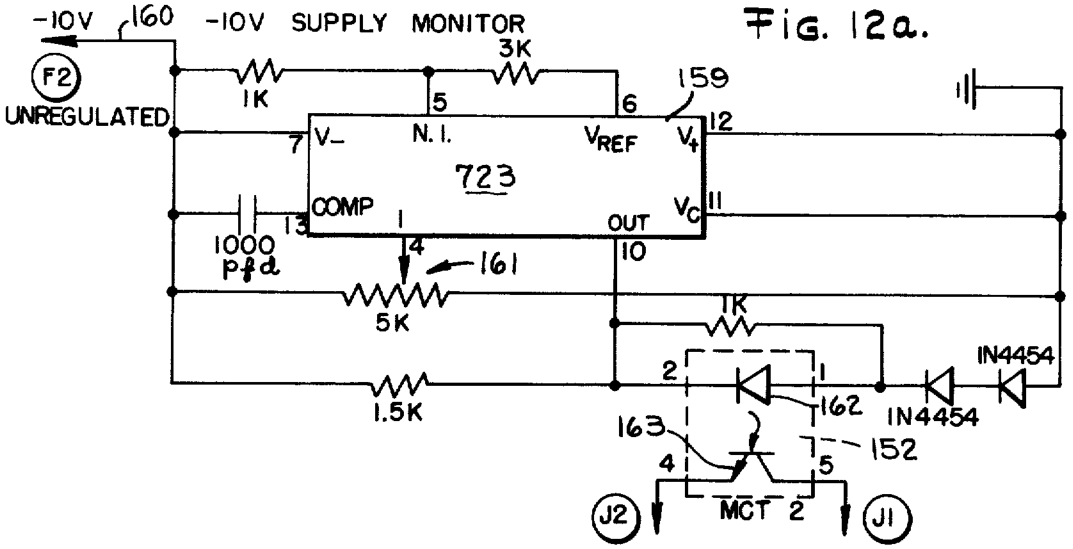

FIG. 11 is an electrical schematic for the non-volatile memory circuitry of FIG. 2;

FIG. 12*a* is an electrical schematic of the monitoring circuit for the −10 volt power supply for the system of FIG. 1*d;*

Figure 12B:
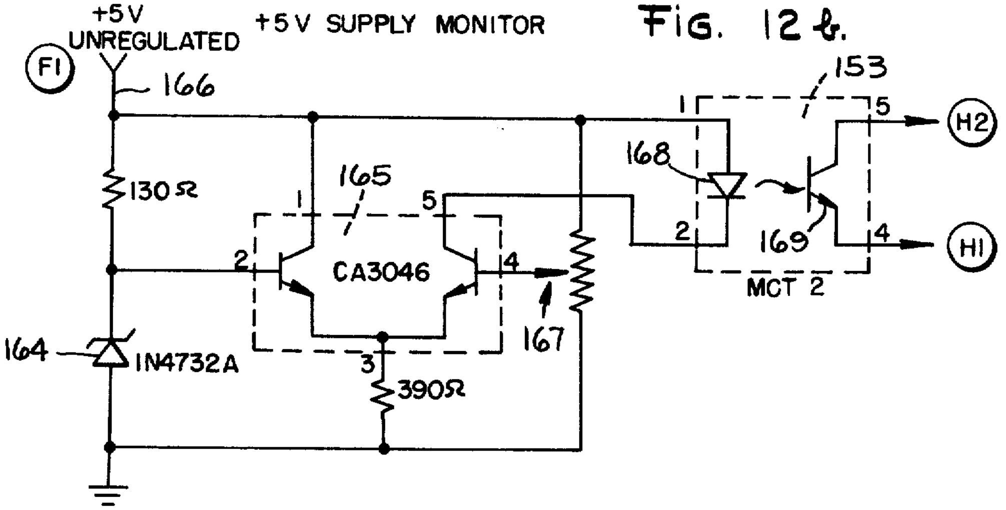

FIG. 12*b* is an electrical schematic of the monitoring circuit for the +5 volt power supply for the system of FIG. 1*d;*

Figure 13:
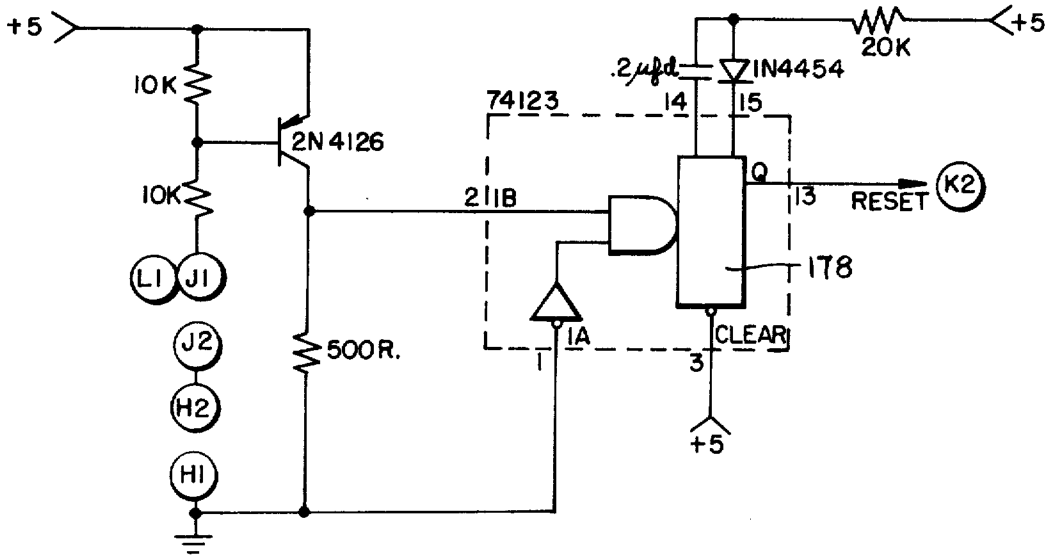

FIG. 13 is an electrical schematic of the reset circuitry for the system of FIG. 1*d;*

Figure 14B:
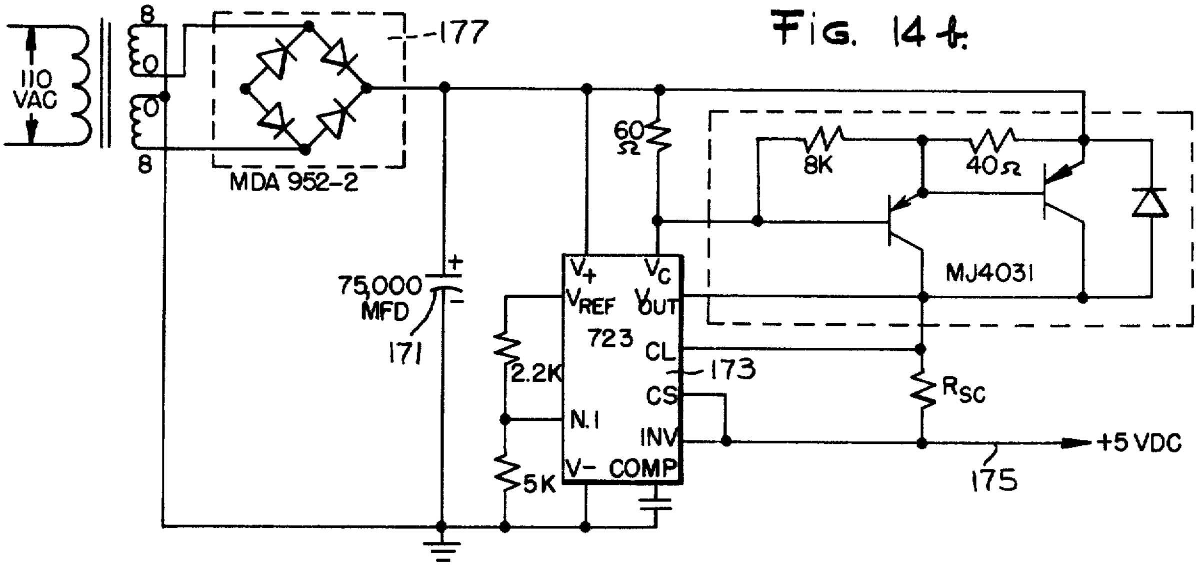
Figure 14A:
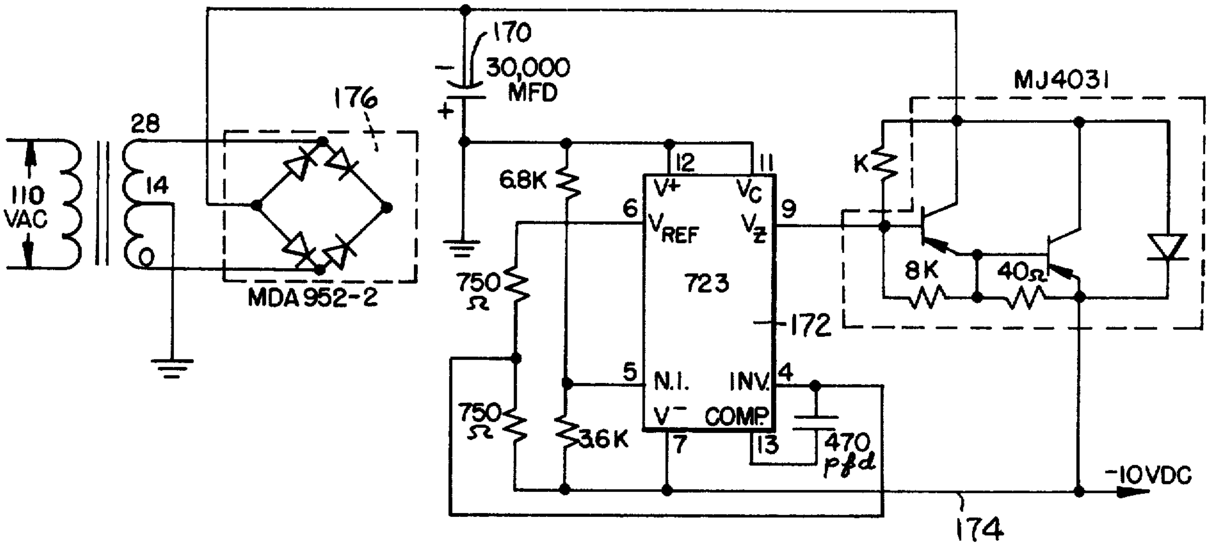

FIG. 14*a* is an electrical schematic for the −10 volt power supply for the system of FIG. 1*d;*

FIG. 14*b* is an electrical schematic for the +5 volt power supply for the system of FIG. 1*d;*

Figure 14C:
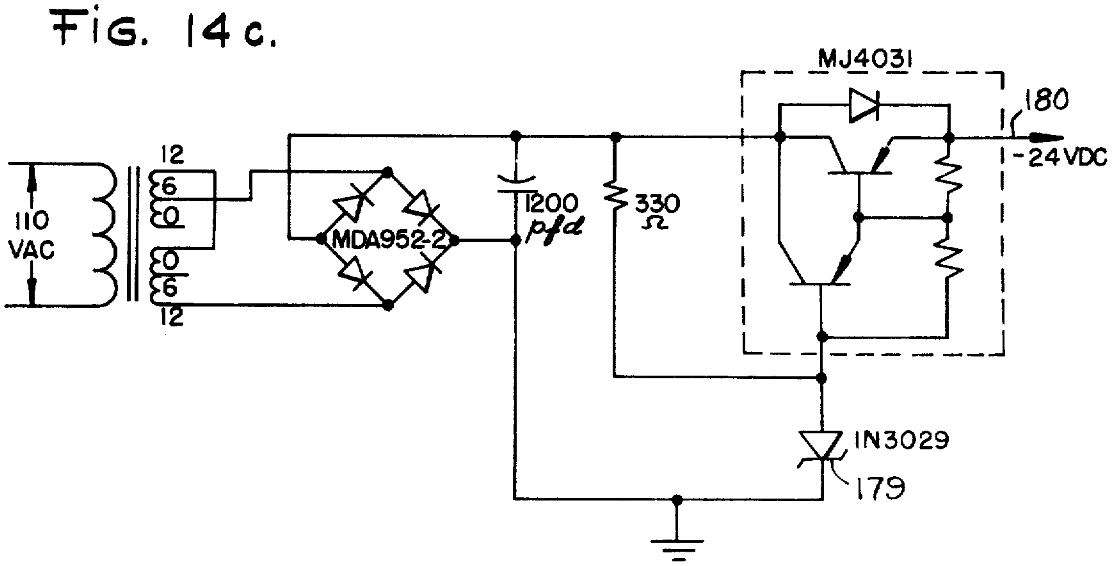
Figure 15:
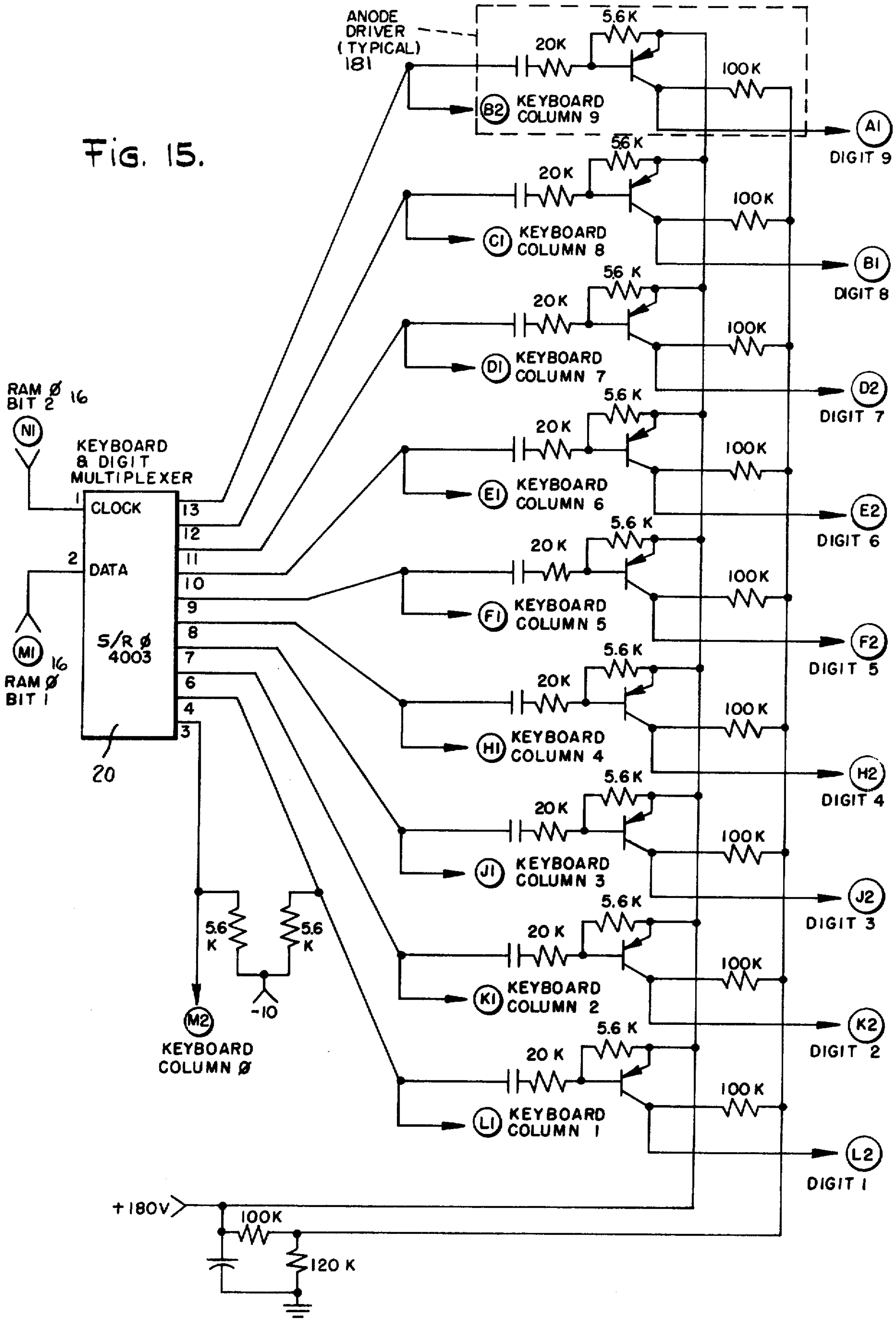

FIG. 14*c* is an electrical schematic for the −24 volt power supply for powering some of the peripheral components shown in FIG. 2;

FIG. 15 is an electrical schematic of the circuitry associated with the shift register (ϕ)20 of FIG. 1*d* for multiplexing the keyboard and the display of FIGS. 1*b* and 1*c;*

Figure 16:
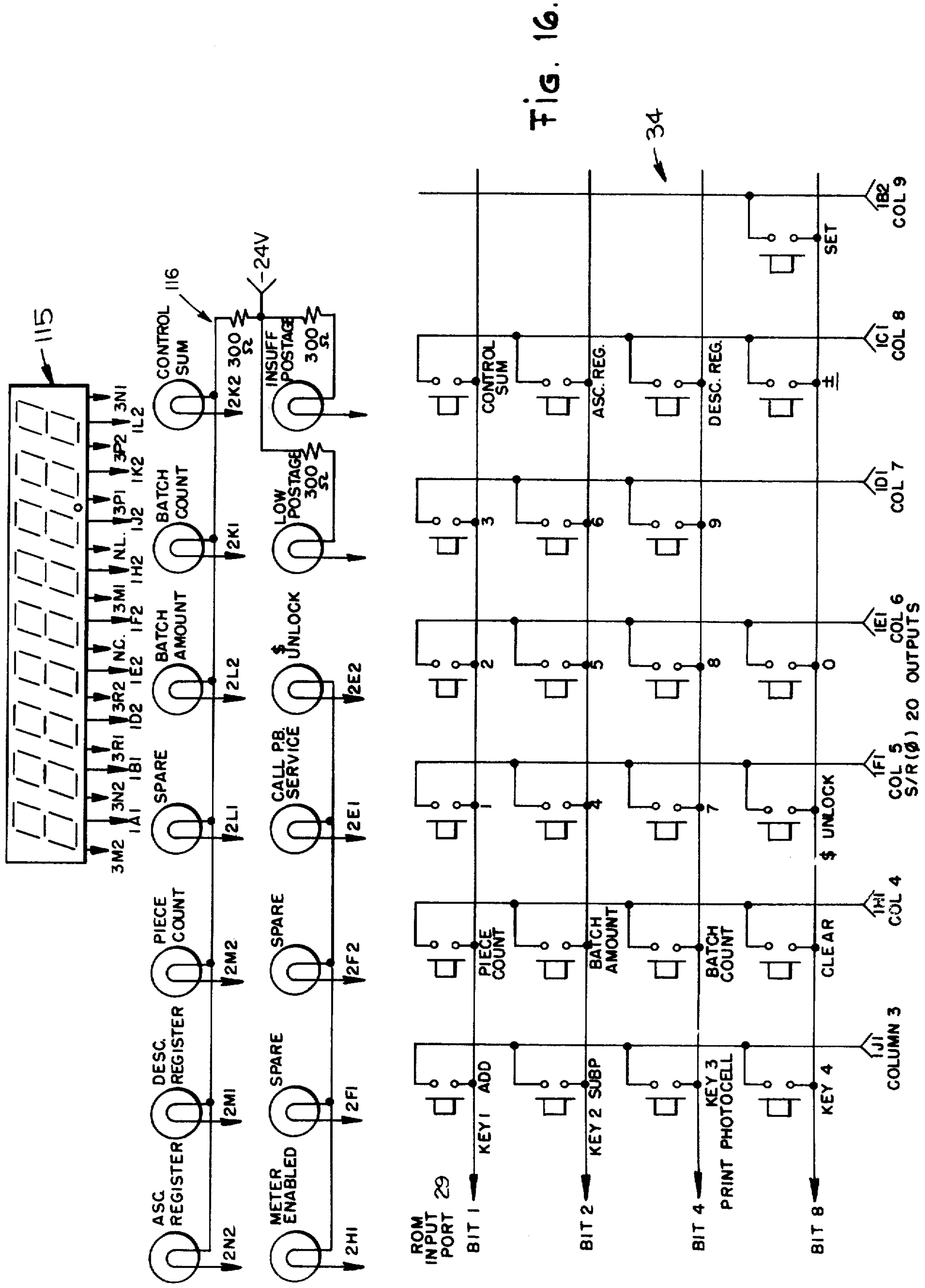

FIG. 16 is an electrical schematic of the keyboard and the display shown in FIGS. 1*b* and 1*c;*

Figure 17:
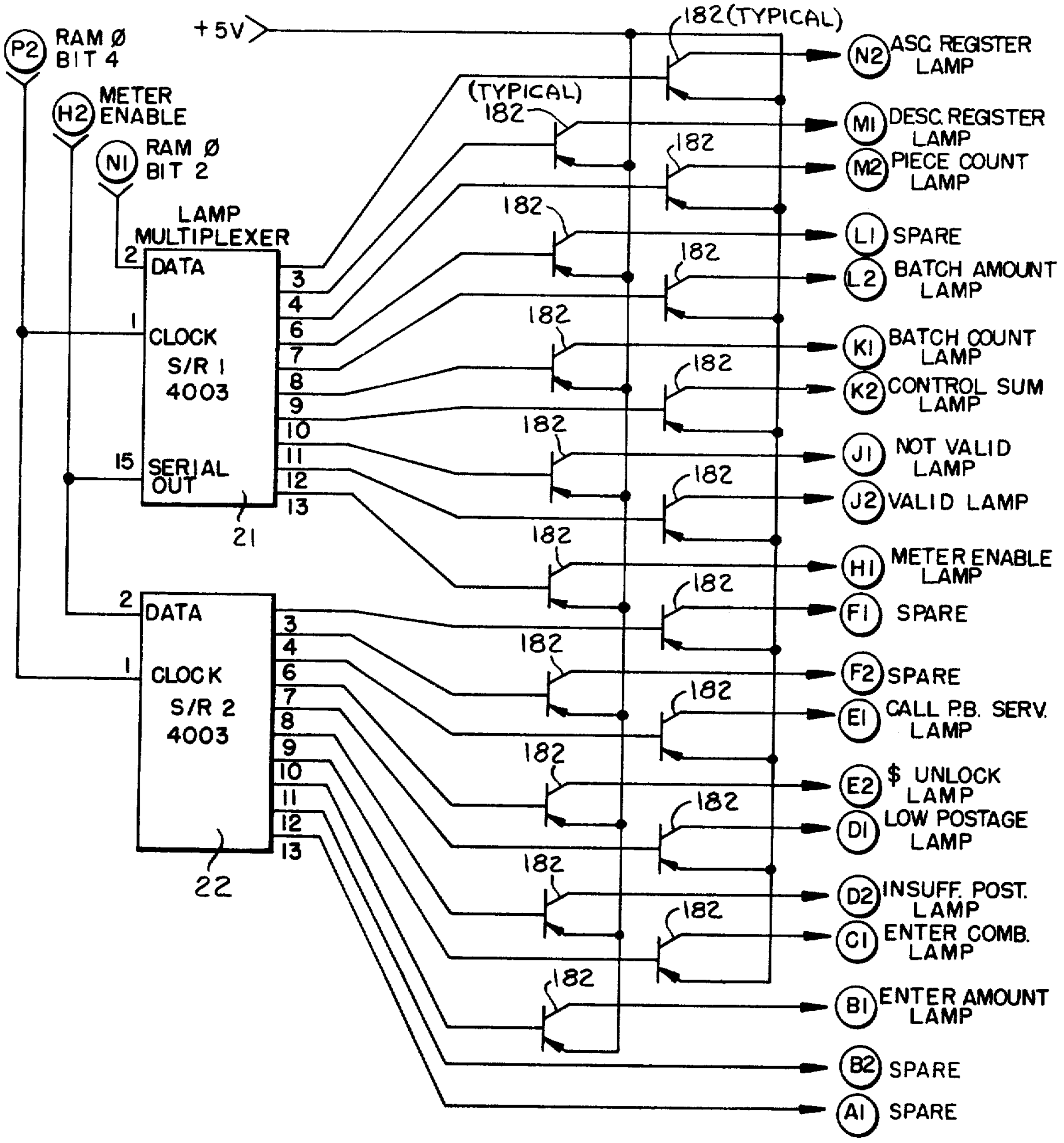
Figure 18:
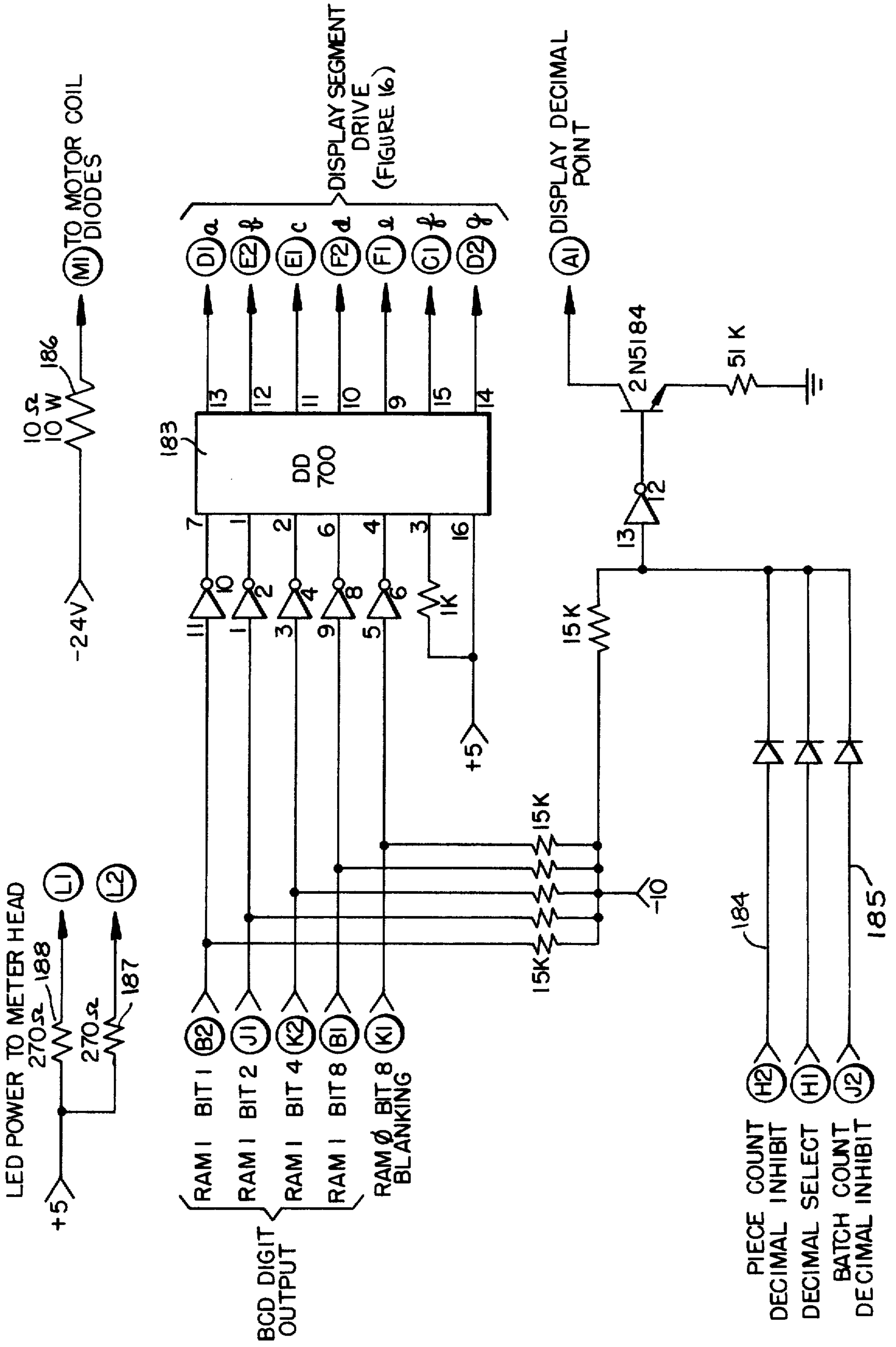
Figure 19:
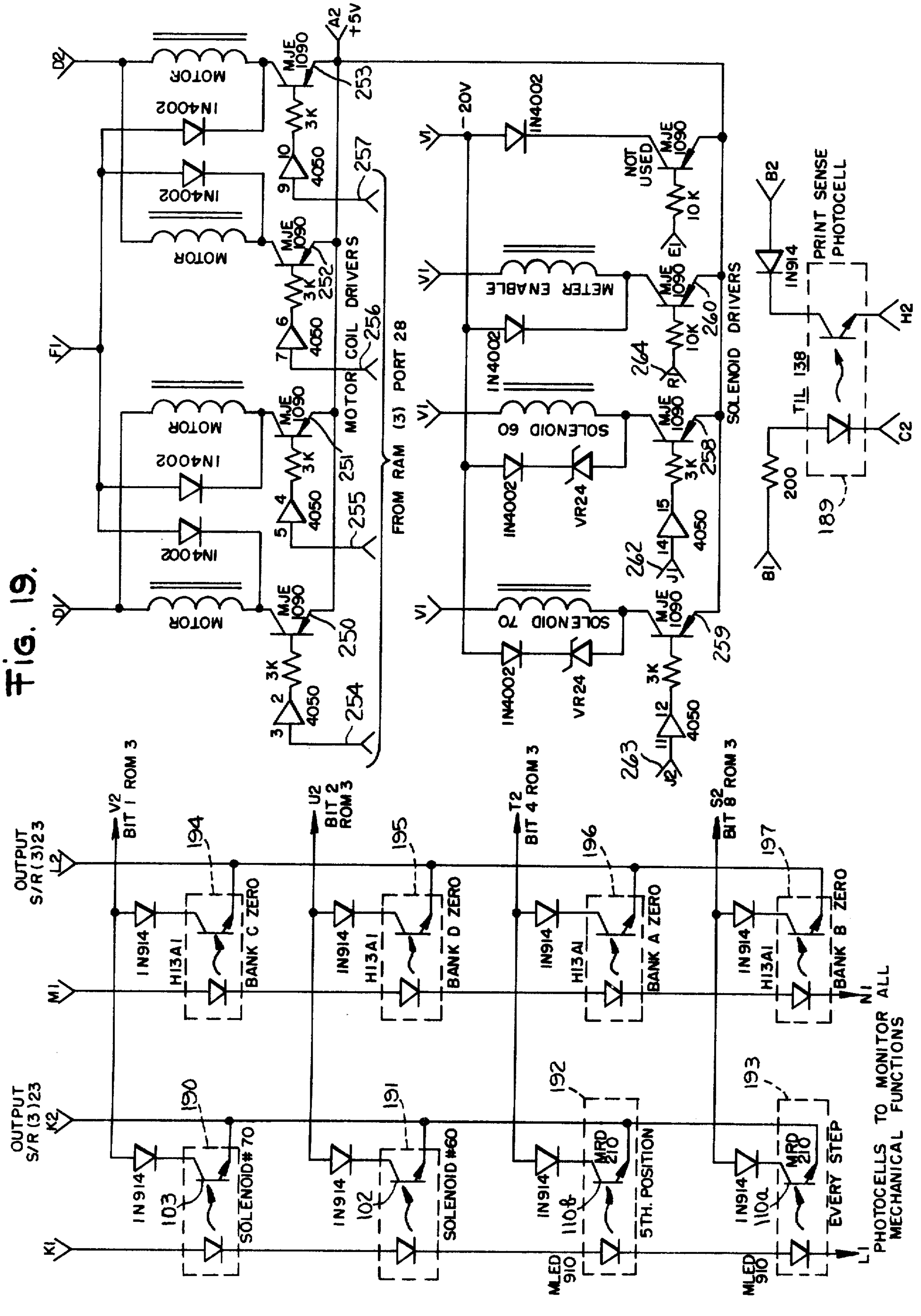
Figure 20:
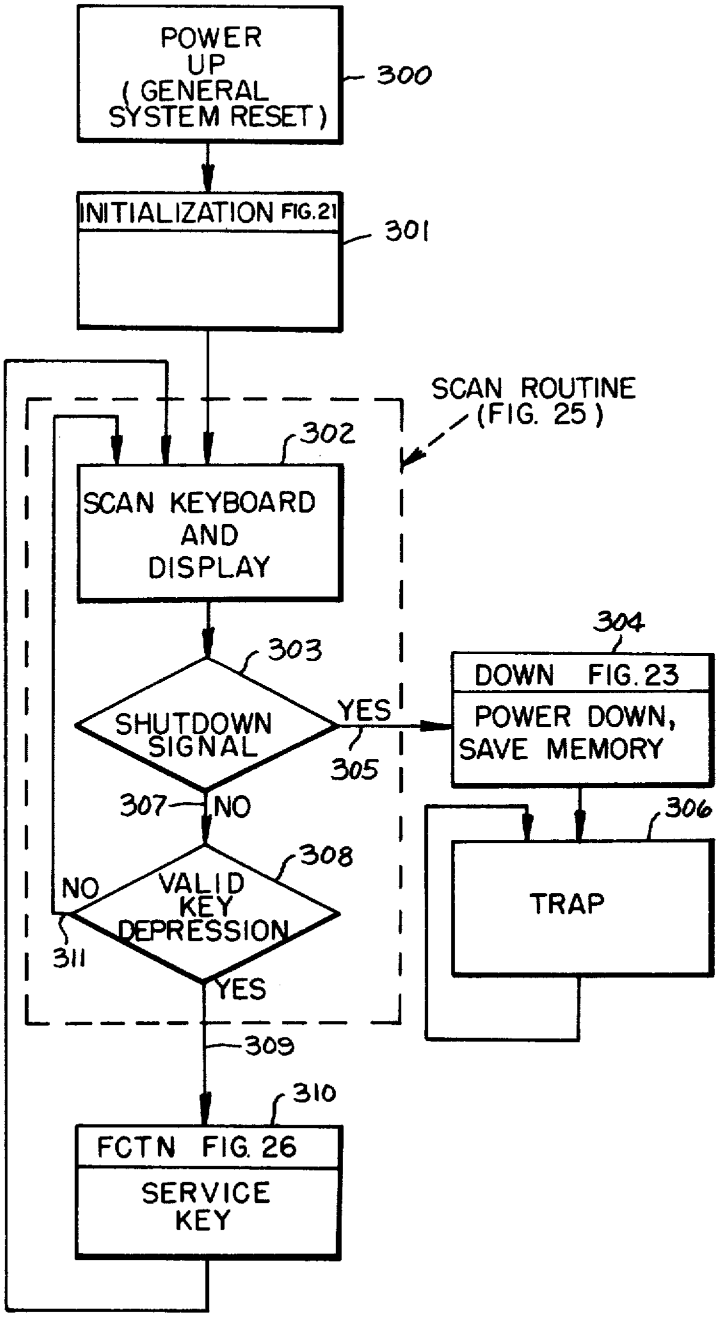
Figure 21:
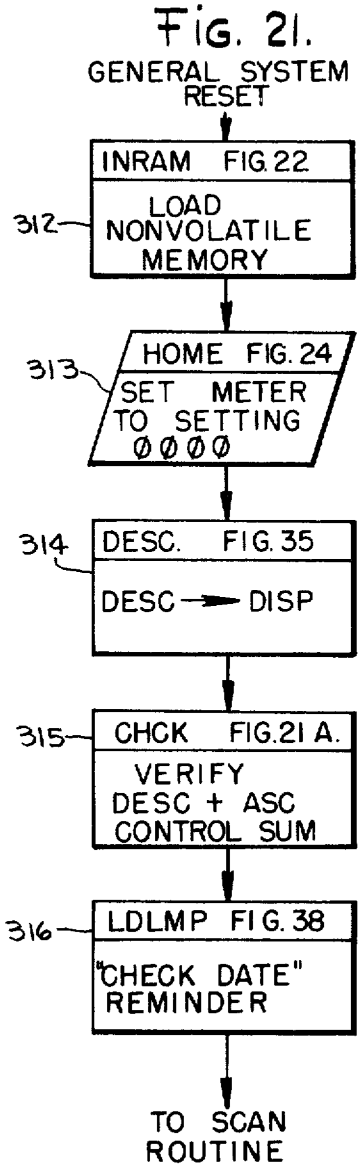
Figure 21A:
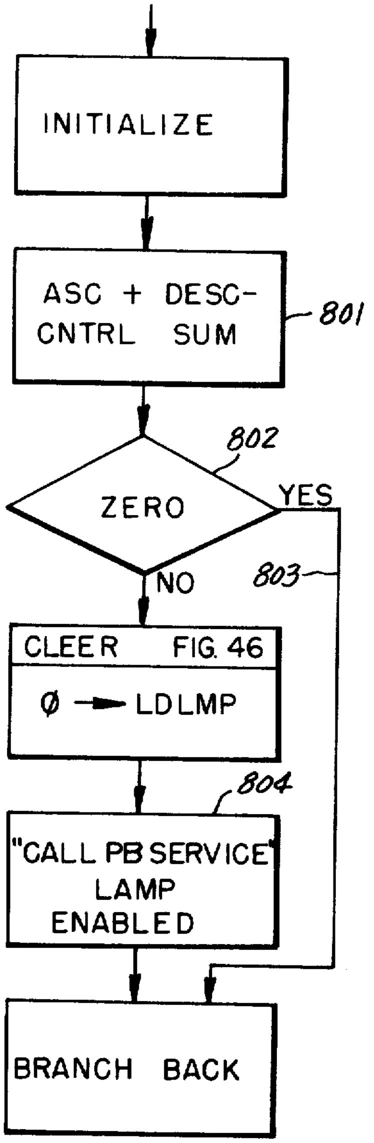
Figure 22:
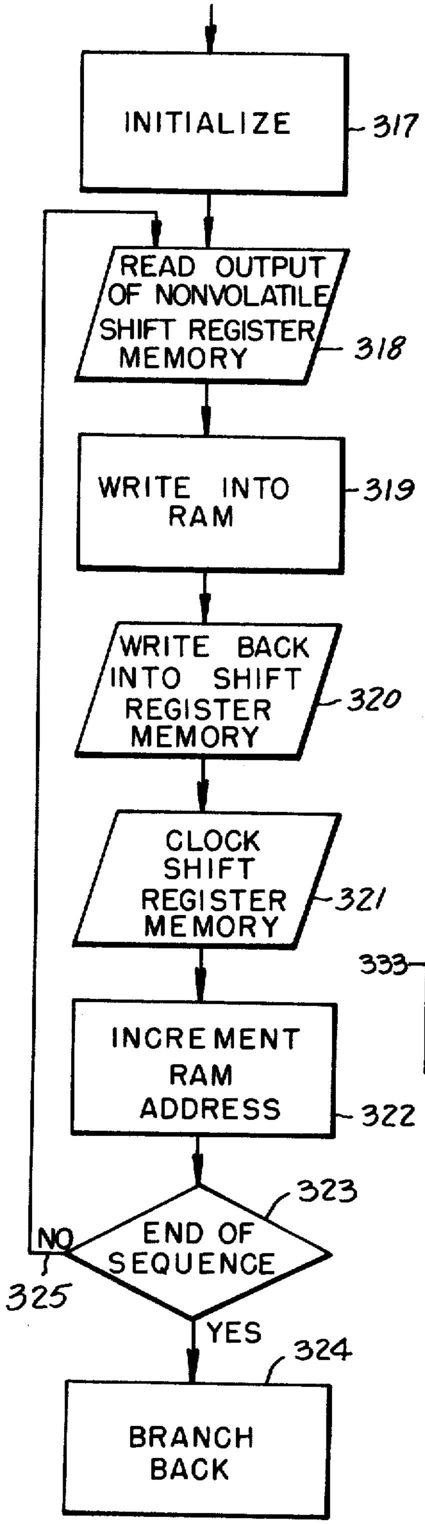
Figure 23:
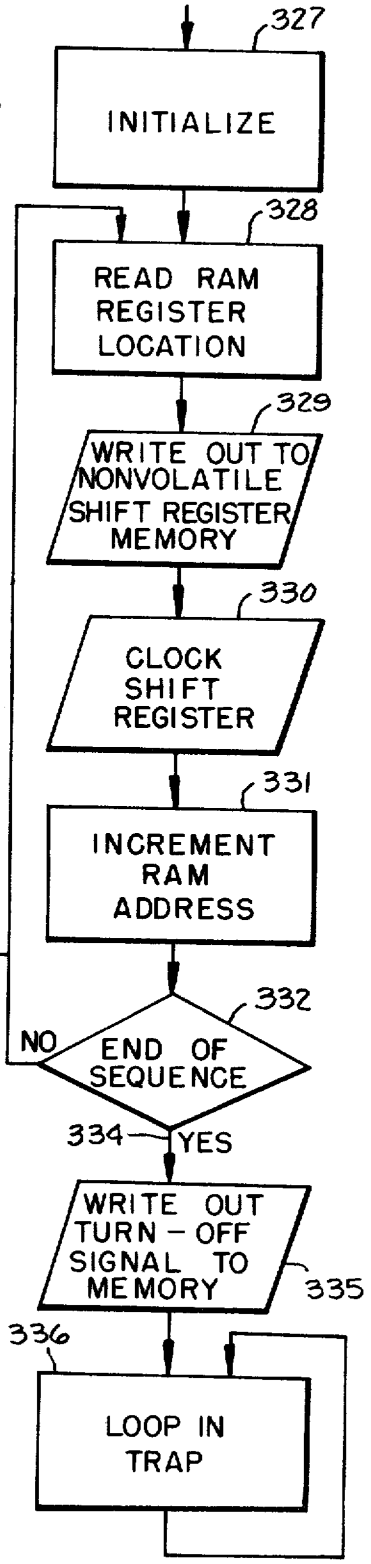
Figure 24:
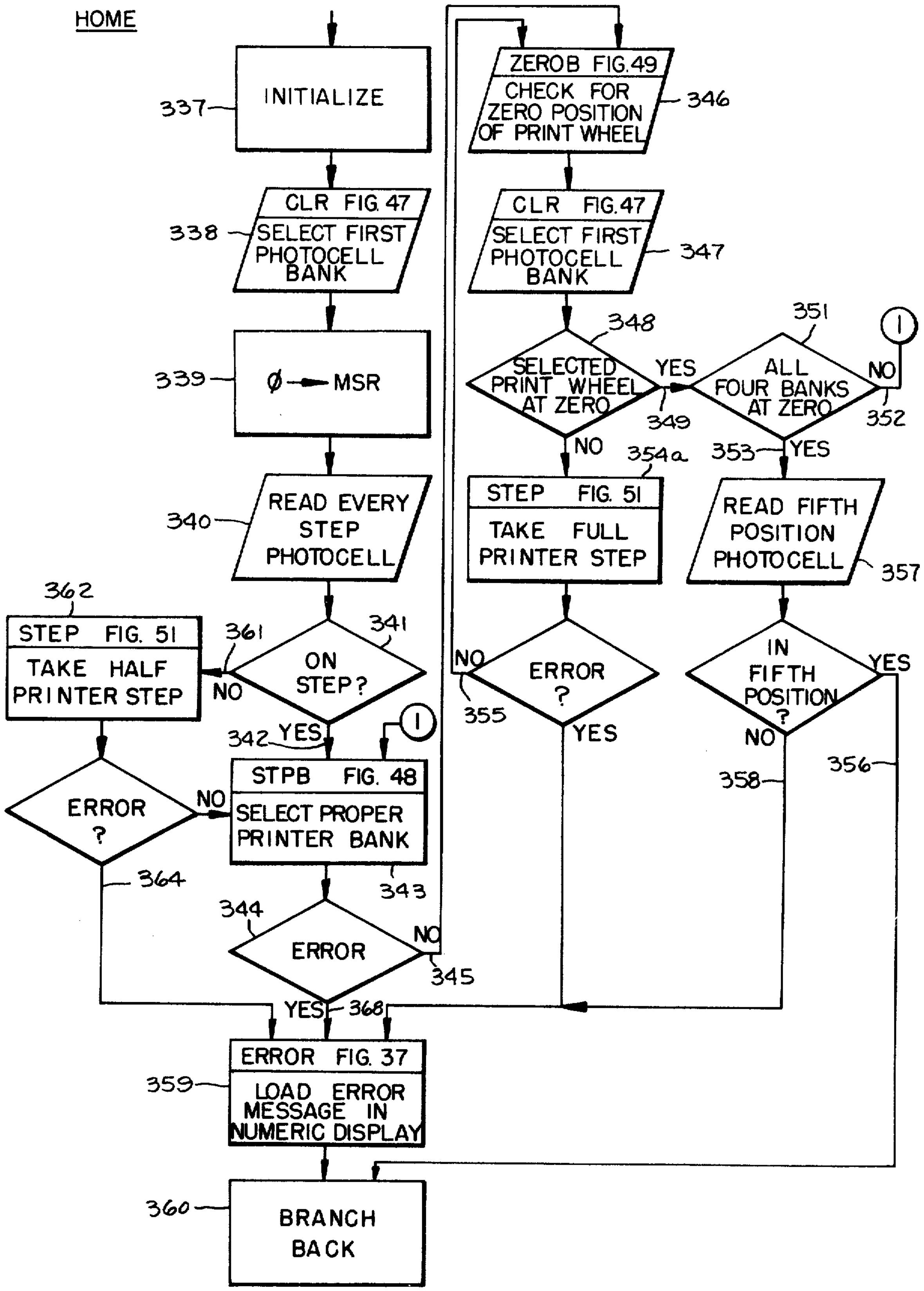
Figure 25:
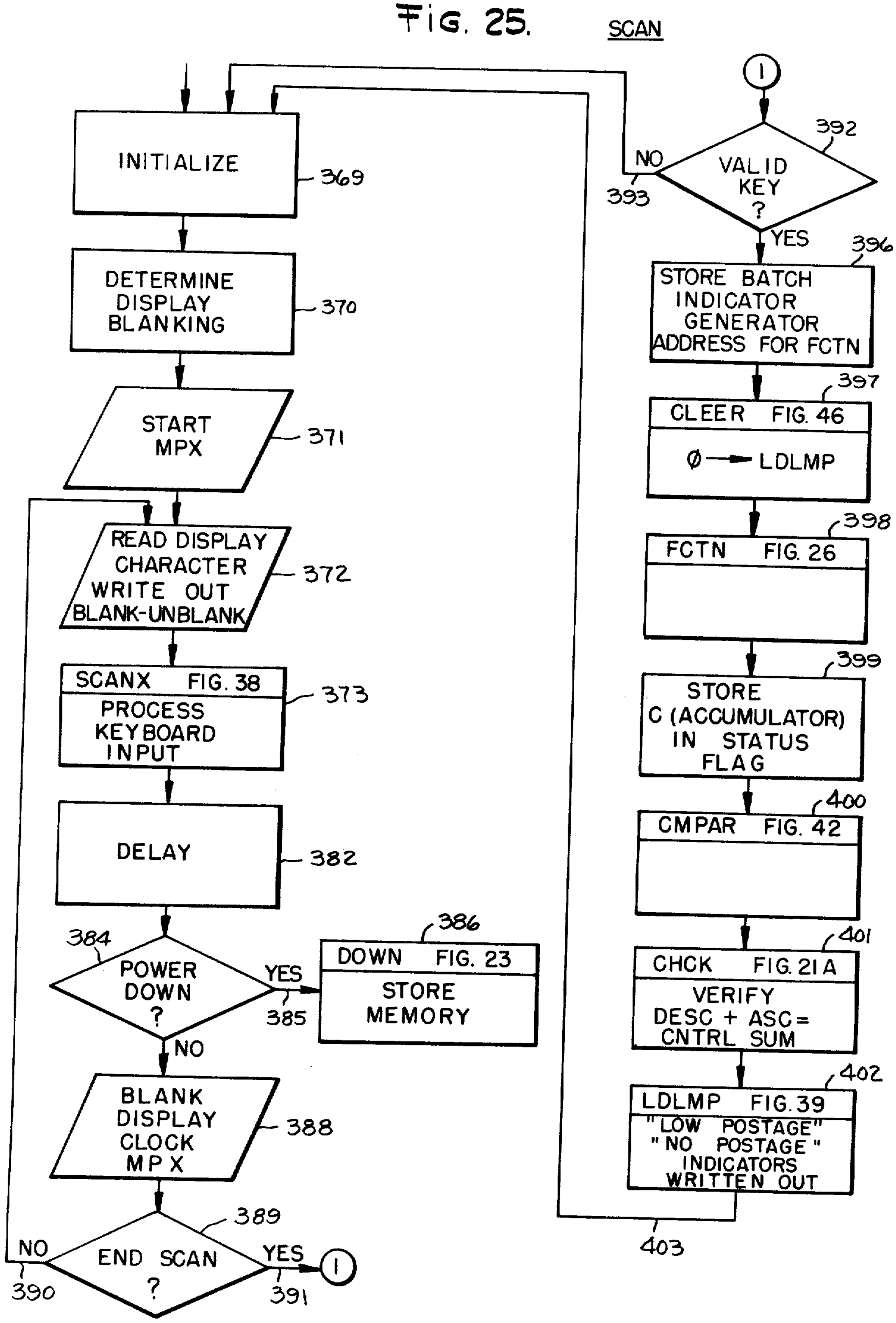
Figure 28:
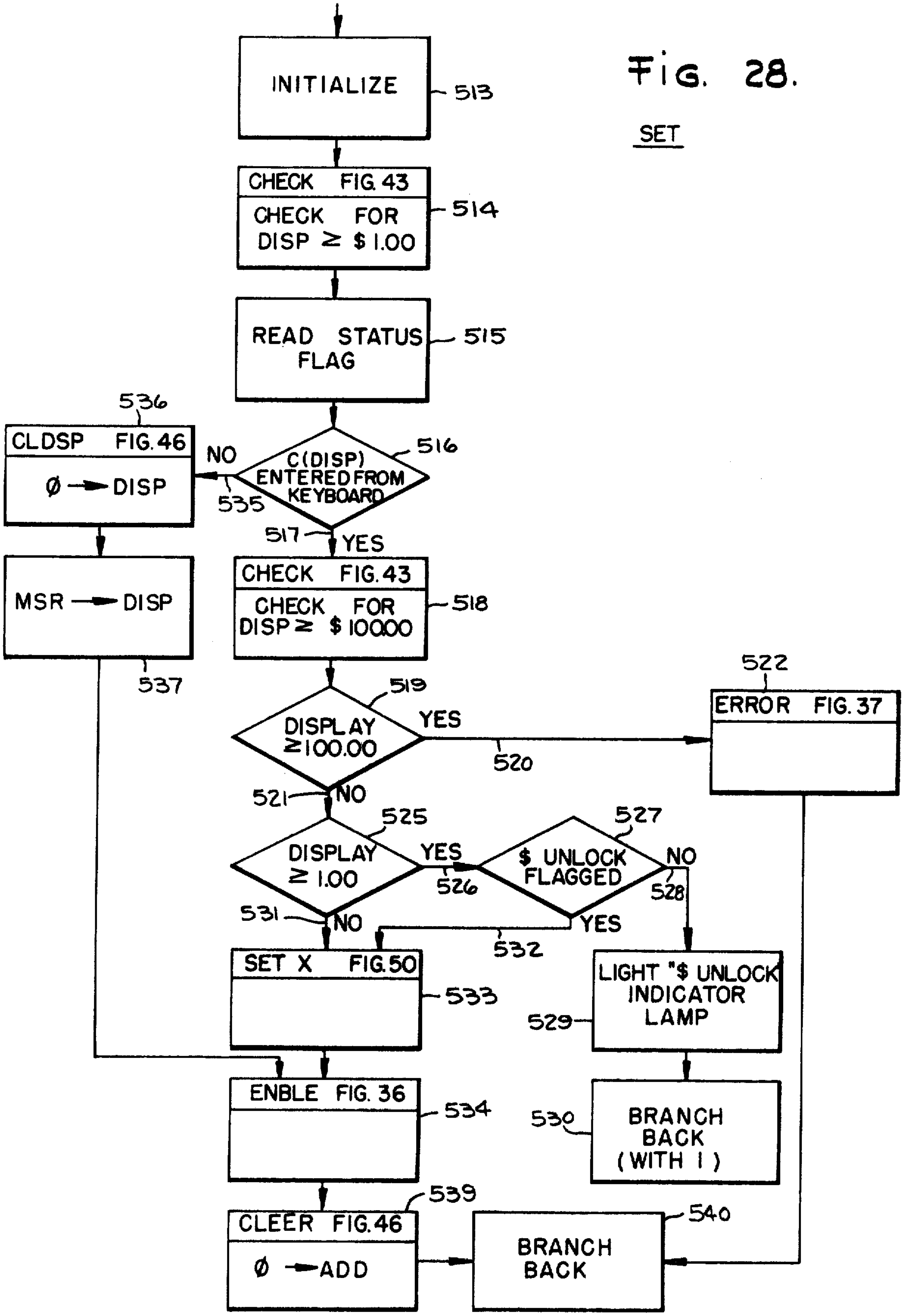
Figure 31:
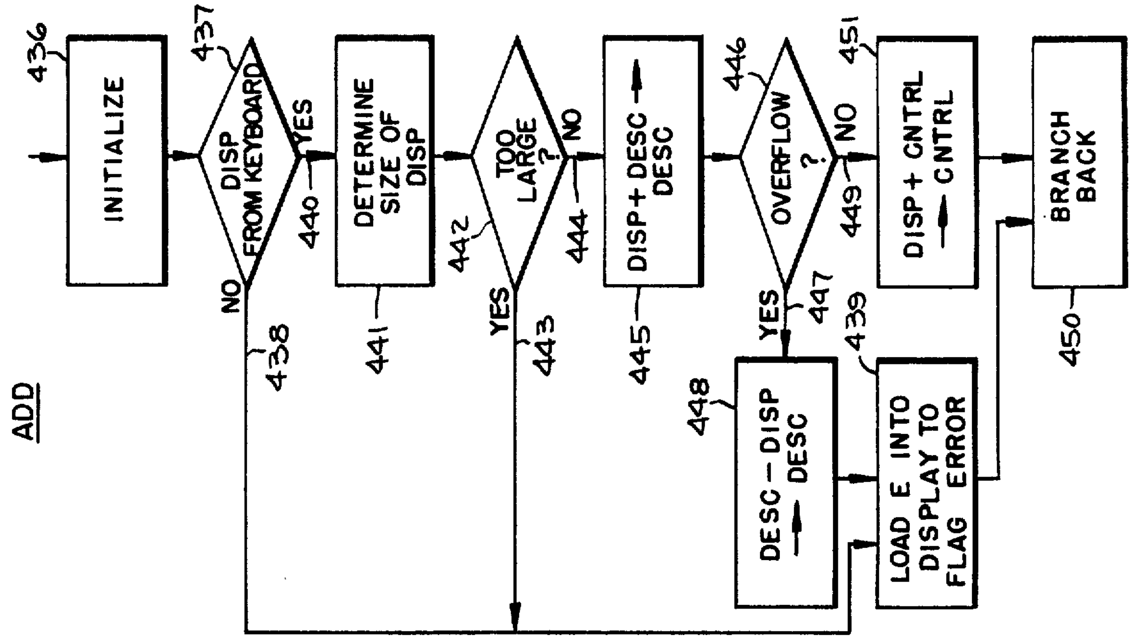
Figure 30:
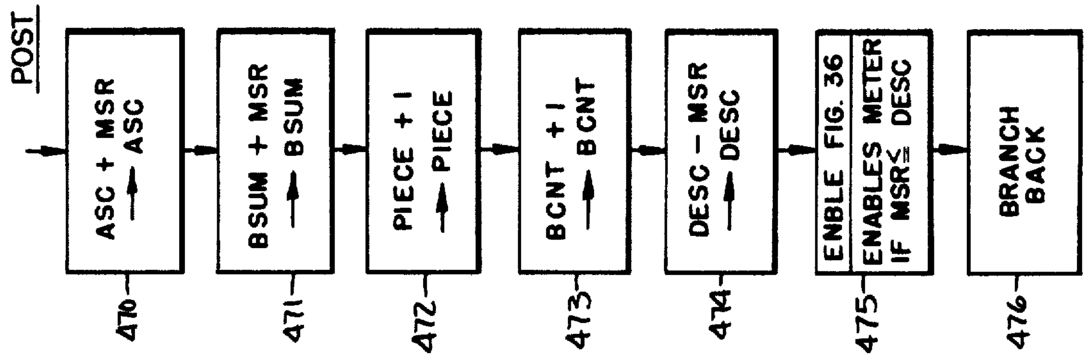
Figure 29:
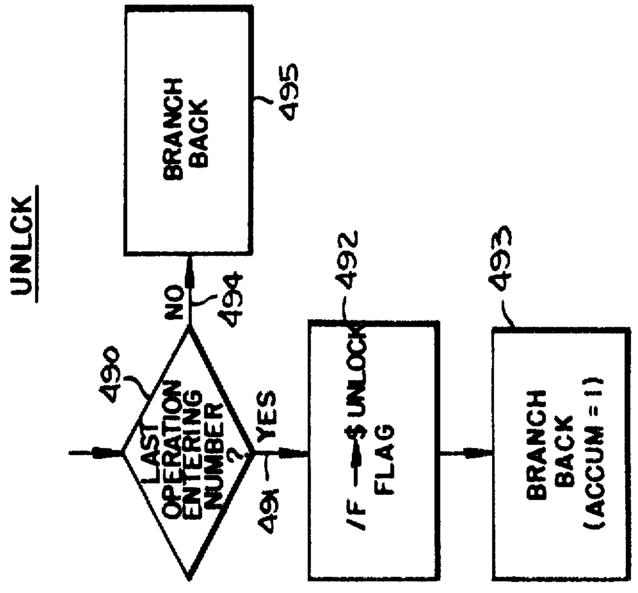
Figures 32, 33:
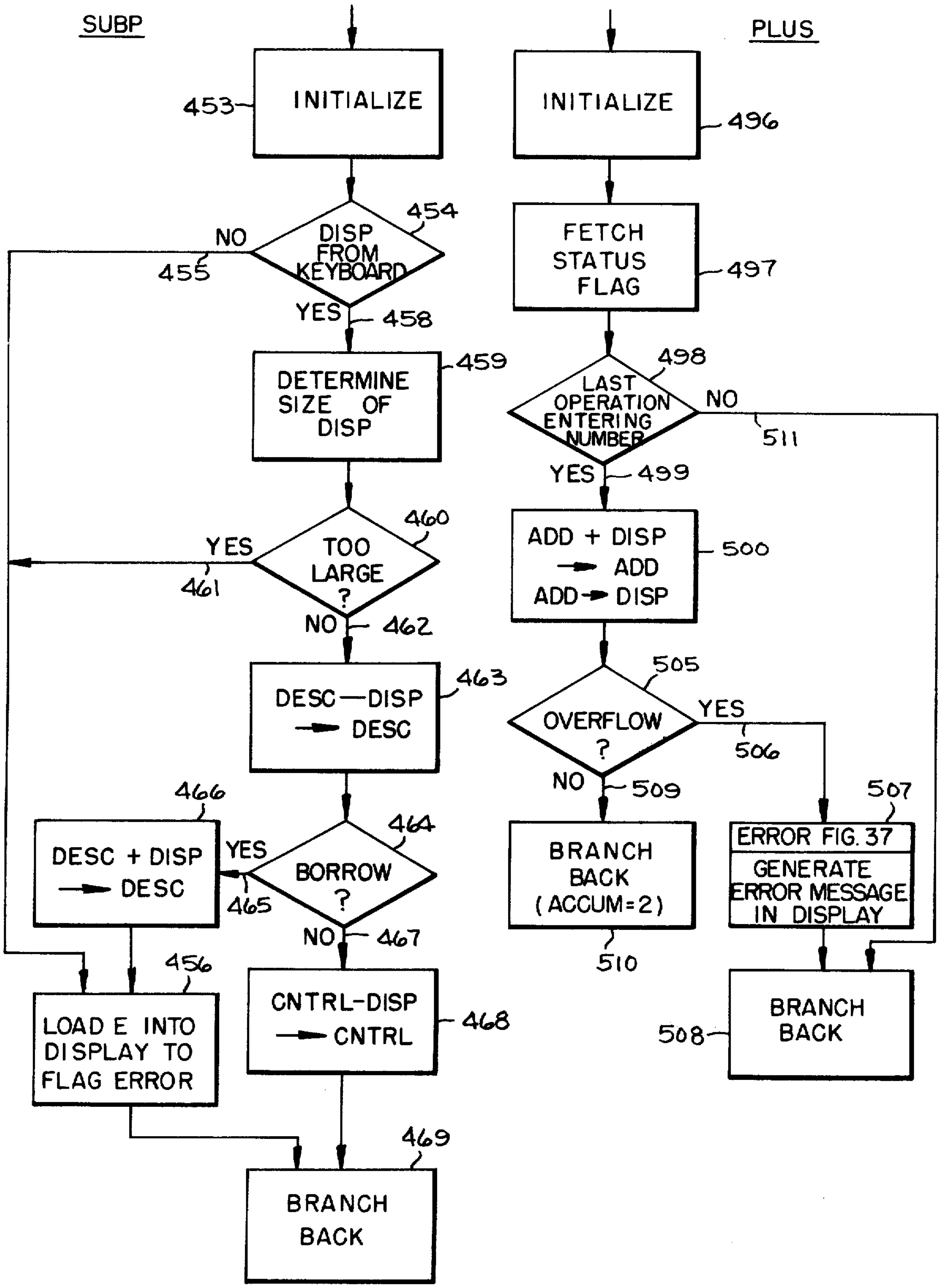
Figures 34, 35, 36:
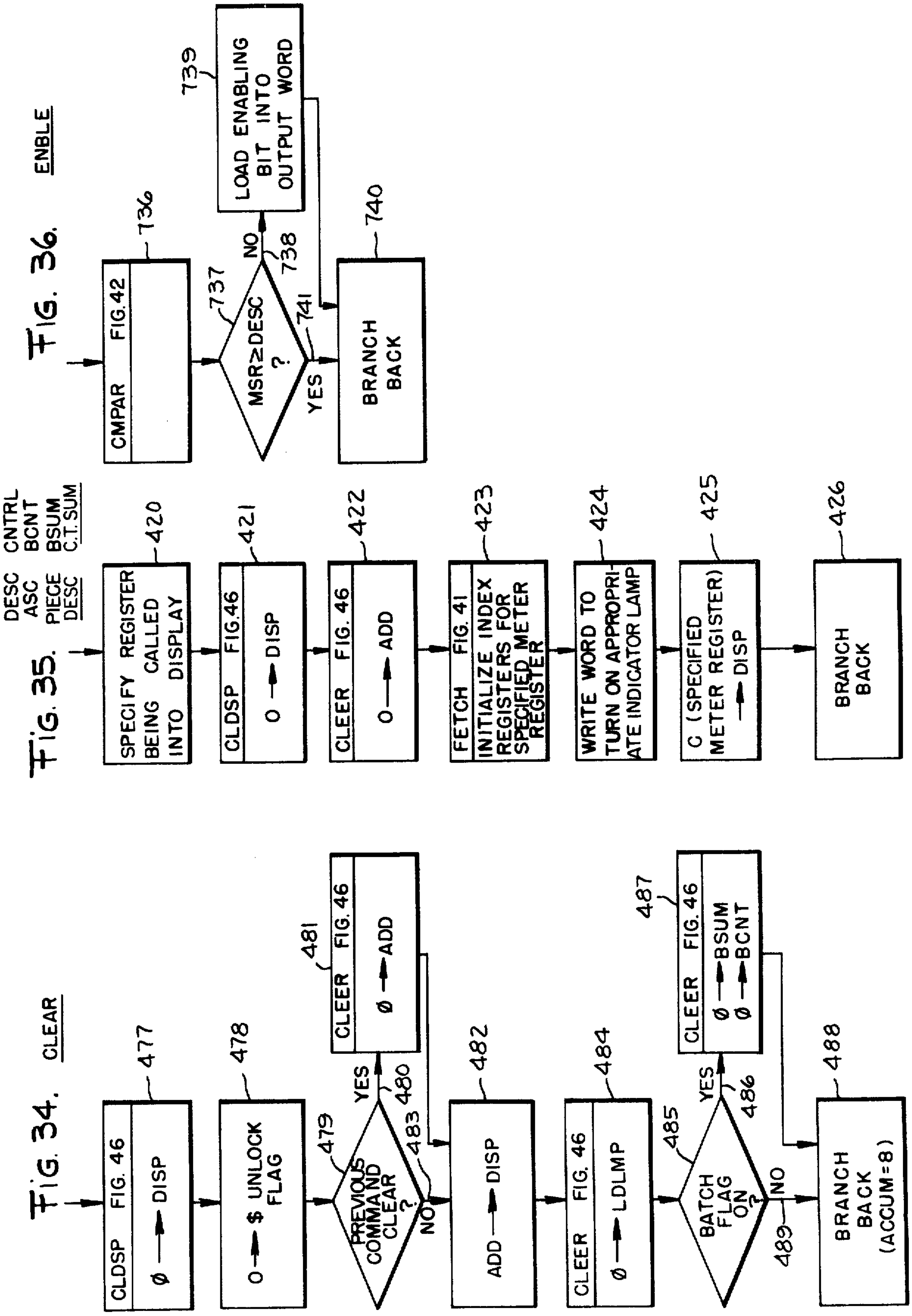
Figure 37:
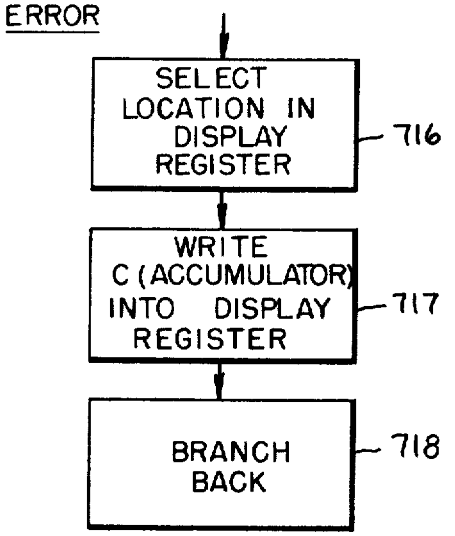
Figure 39:
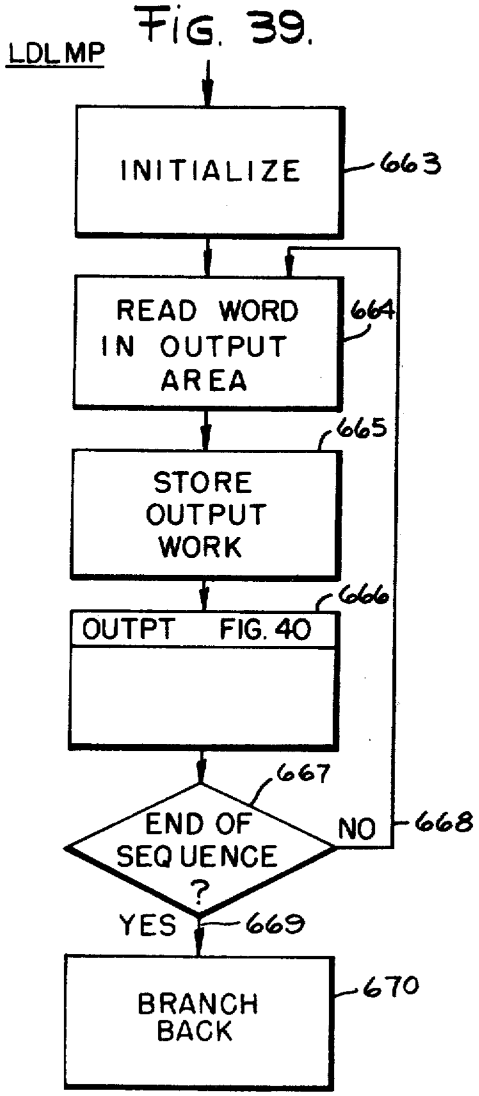
Figure 40:
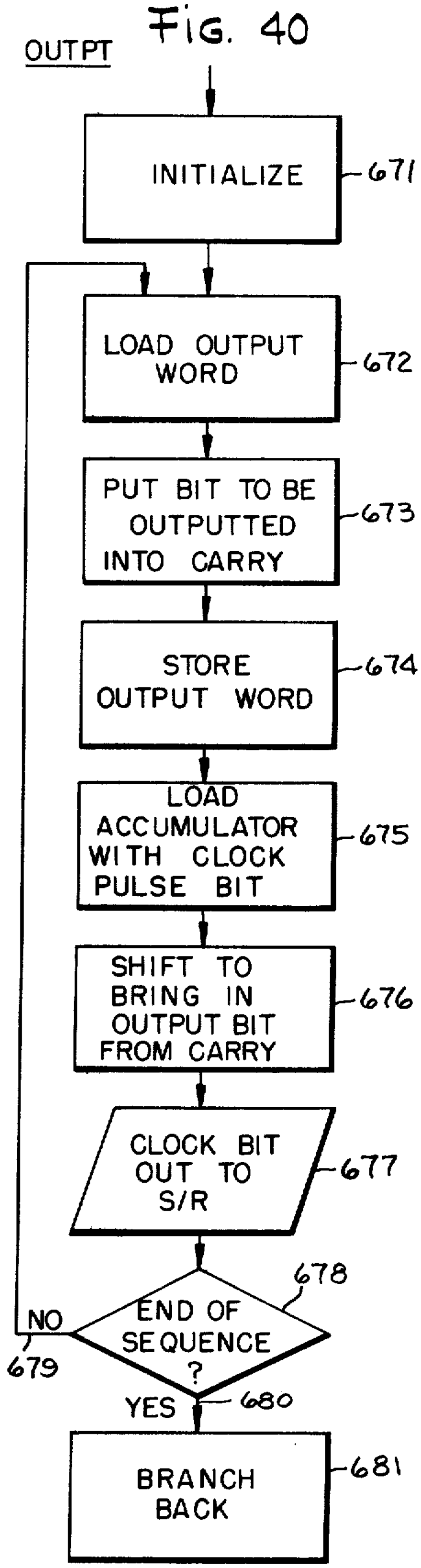
Figure 43:
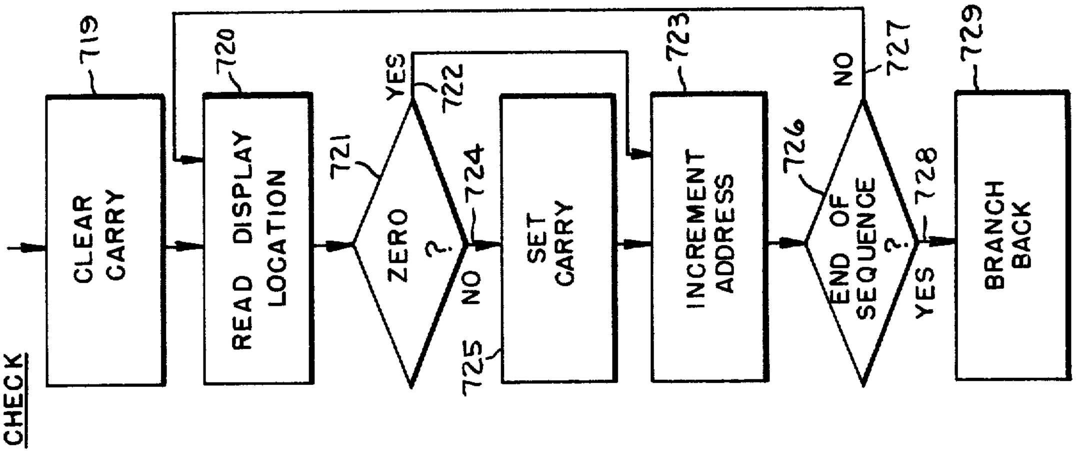
Figure 42:
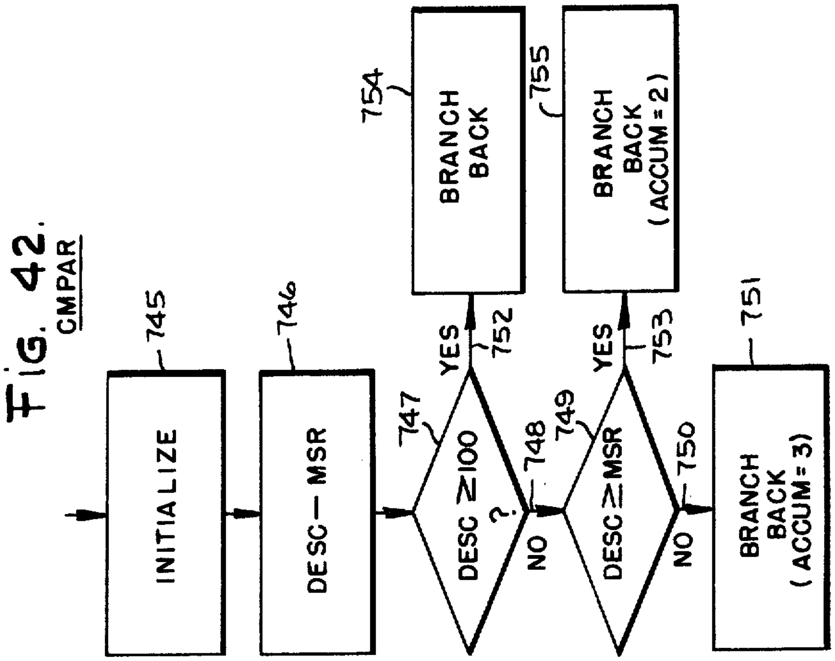
Figure 41:
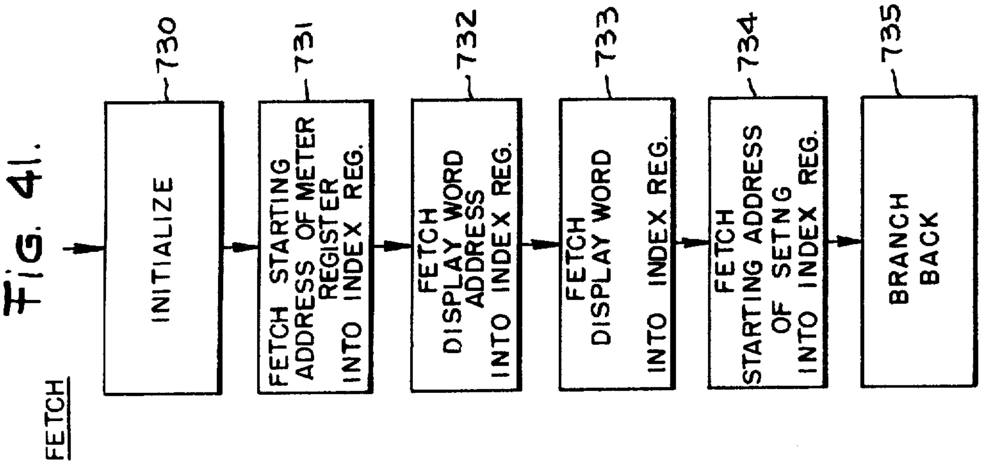
Figure 46:
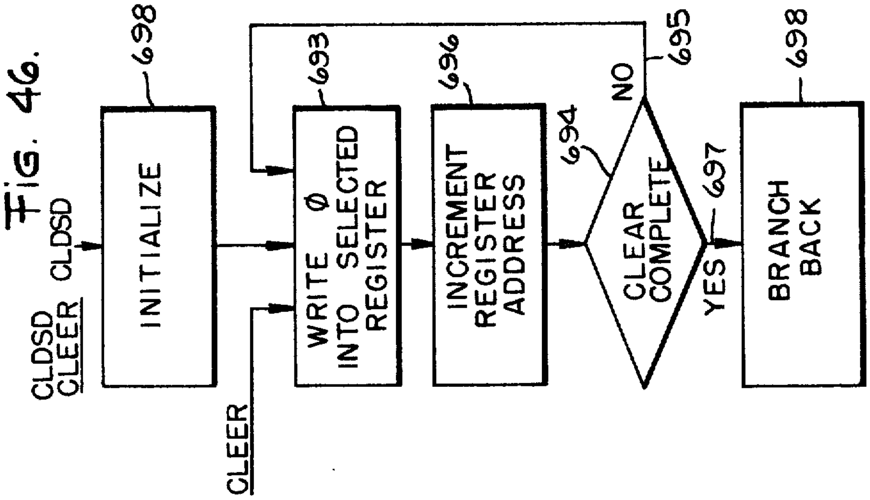
Figure 45:
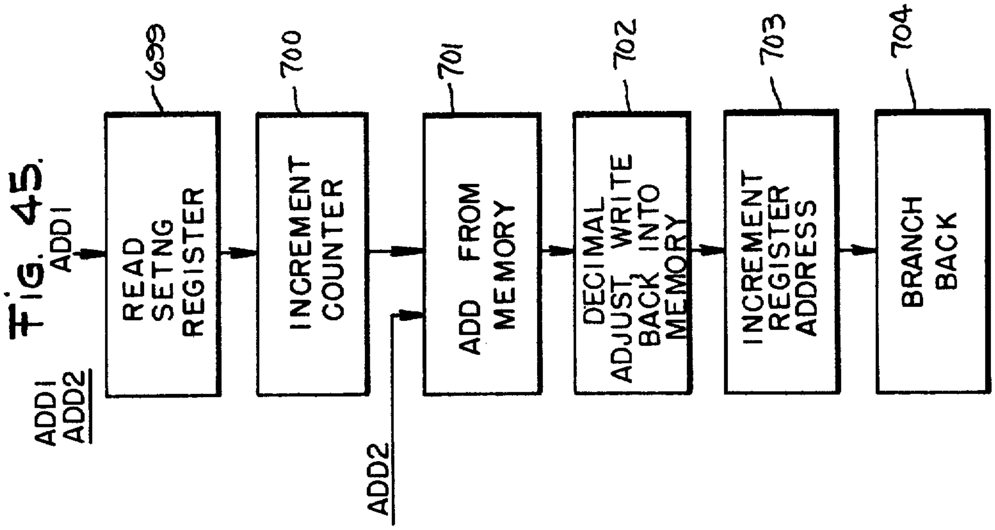
Figure 44:
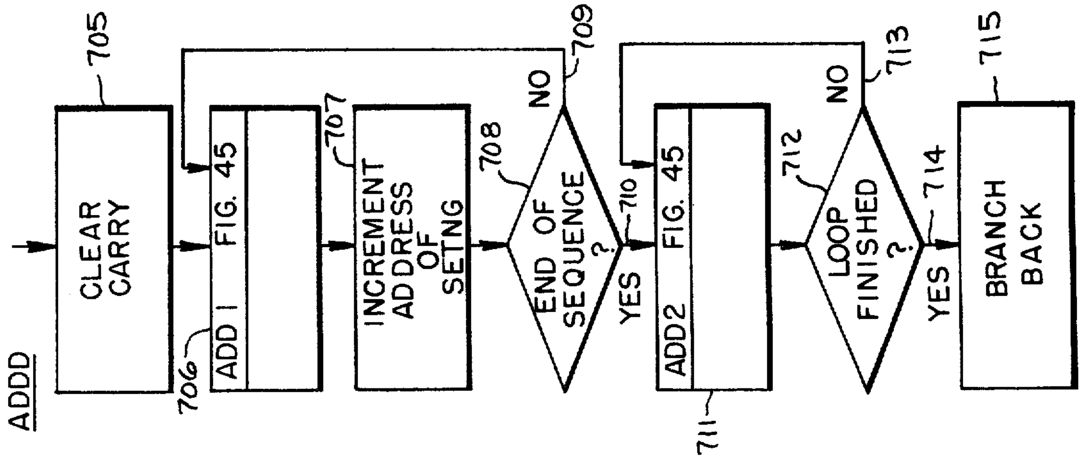
Figure 47:
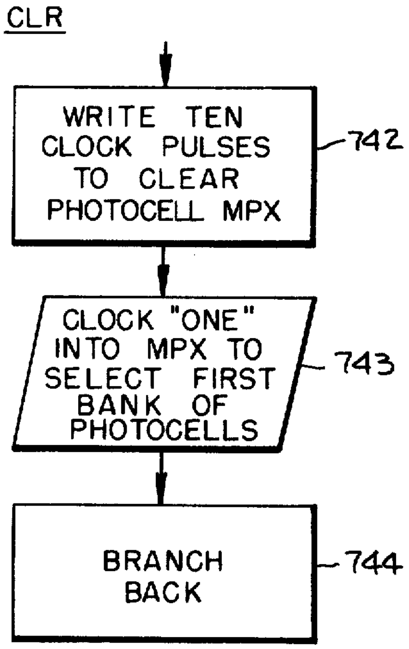
Figure 48:
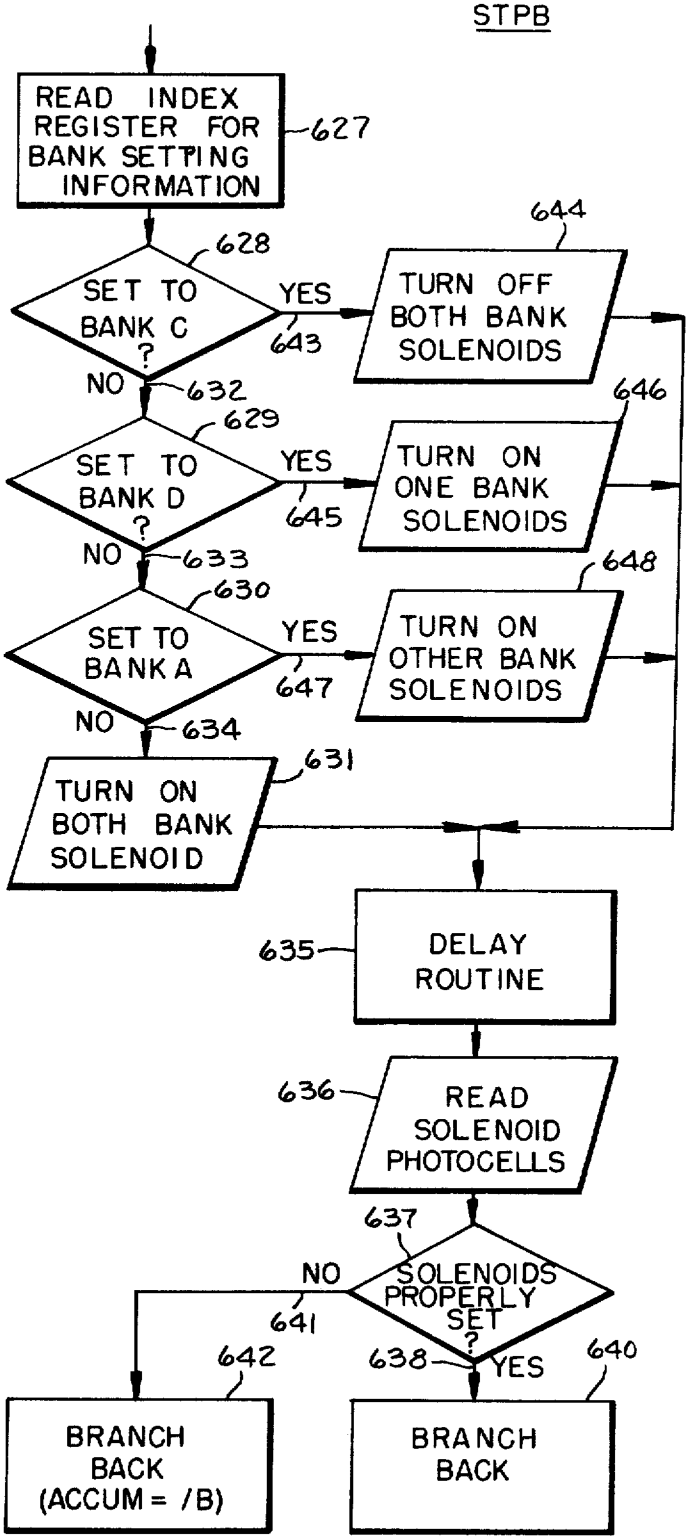
Figure 49:
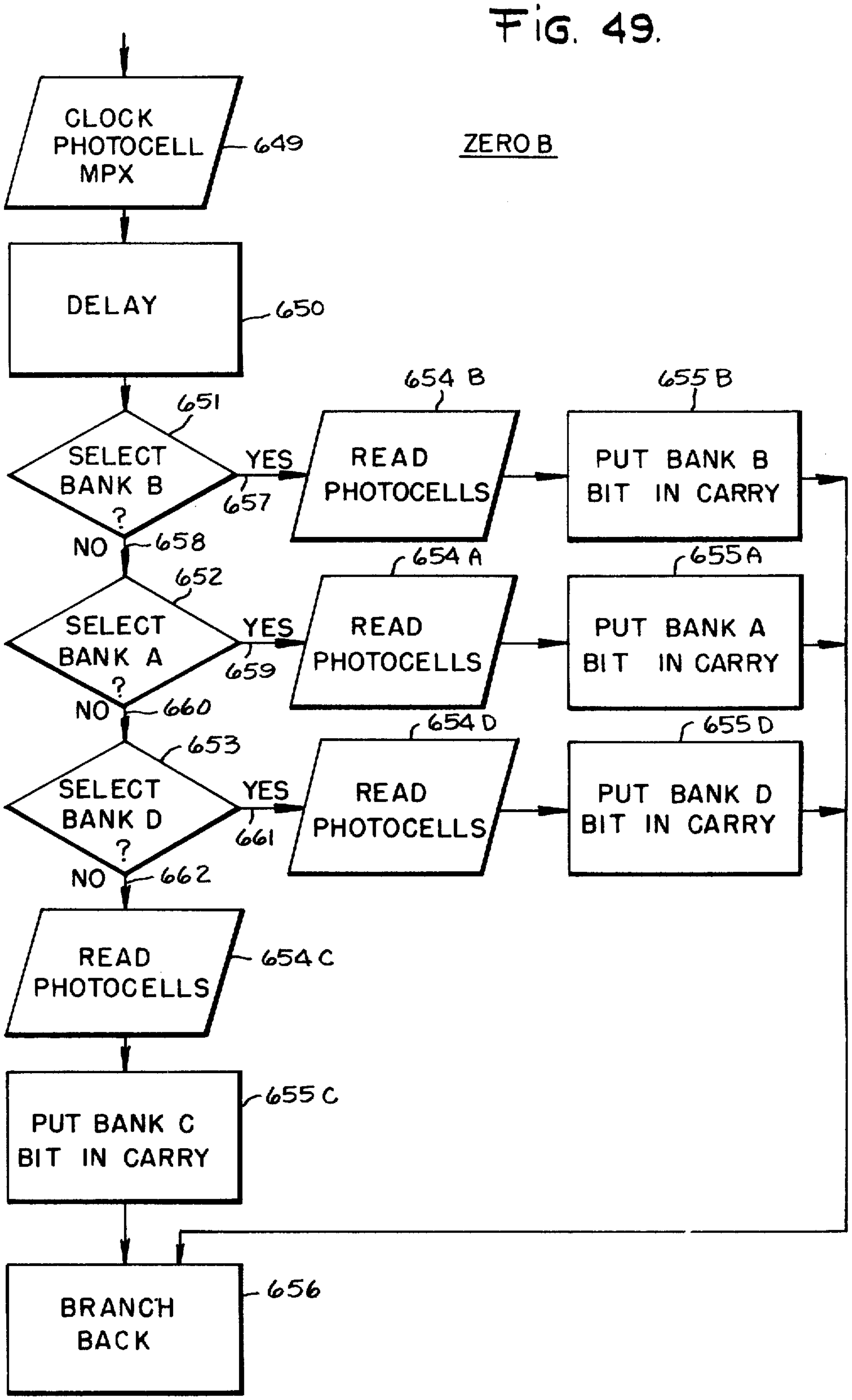
Figure 50:
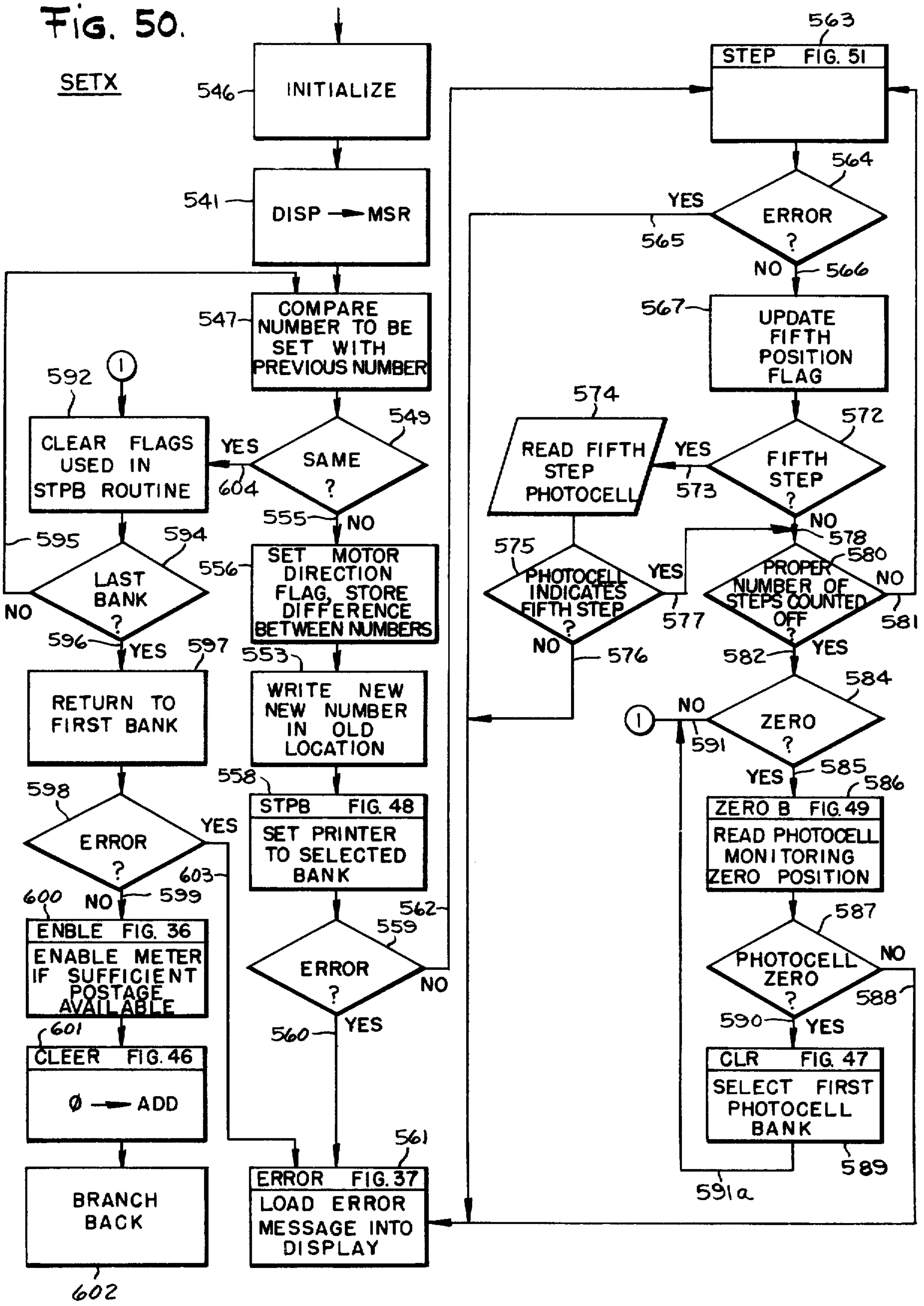
Figure 51:
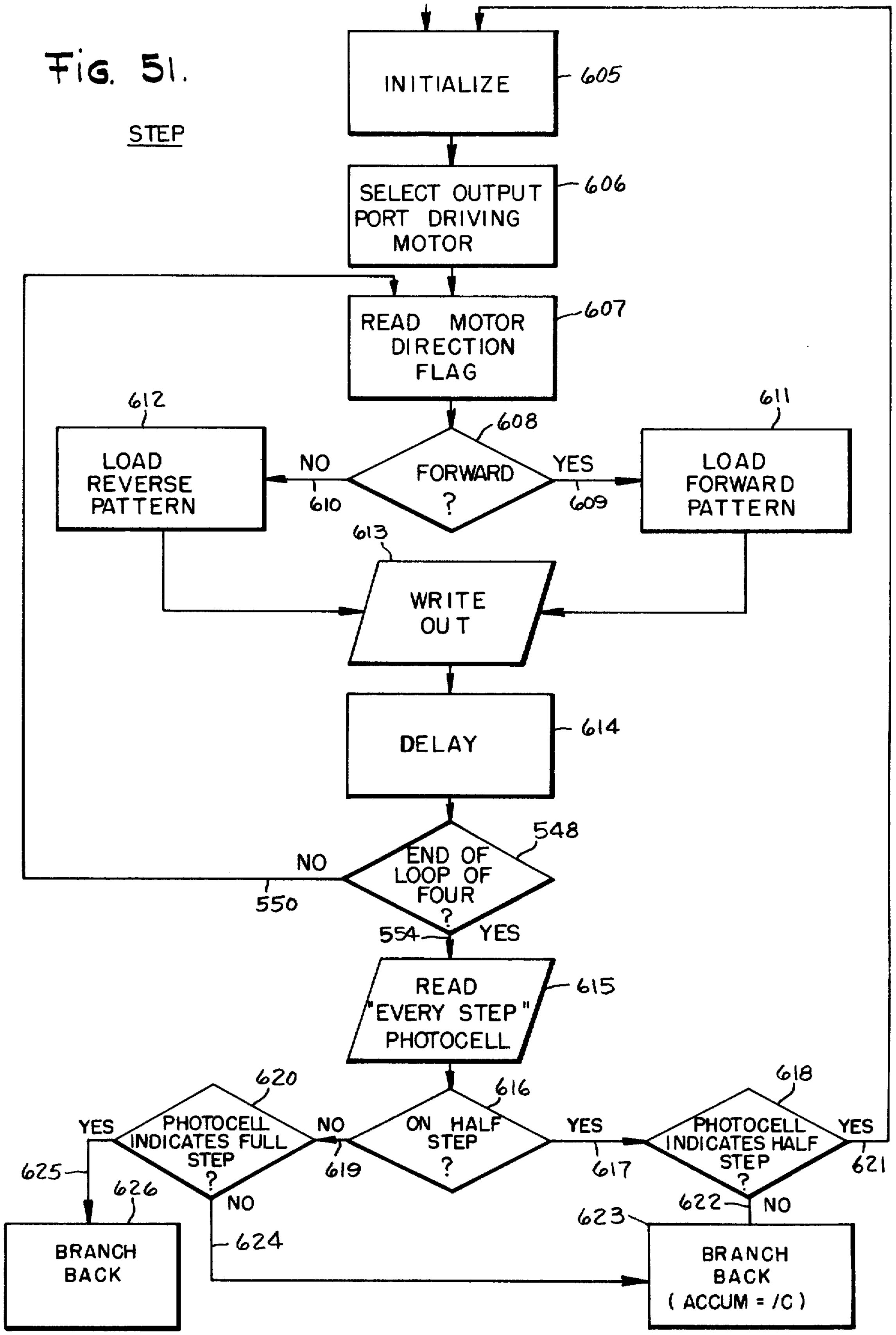

FIG. 17 is an electrical schematic of the circuitry associated with shift registers (1)21 and (2)22 of FIG. 1*d*, for controlling the indicator lamps of FIG. 16;

FIG. 18 is an electrical schematic of the decimal point circuitry and the decoder driver circuitry for the display of FIGS. 1*b*, 1*c* and 16;

FIG. 19 is an electrical schematic for the meter monitoring photocells, the stepper motor coil drivers, and the print sensing photocell of the setting and printing mechanism of FIG. 3;

FIGS. 20 and 21 show a generalized overall operation for the system of FIGS. 1*d* and 2, in a flow chart form;

FIG. 21*a* shows a flow chart for the subroutine CHCK for the system of FIGS. 1*d* and 2;

FIG. 22 depicts a flow chart for the subroutine INRAM for the system of FIGS. 1*d* and 2;

FIG. 23 illustrates a flow chart for the subroutine DOWN for the system of FIGS. 1*d* and 2;

FIG. 24 shows a flow chart for the HOME subroutine for the system of FIGS. 1*d* and 2;

FIG. 25 shows a flow chart for the SCAN subroutine for the system of FIGS. 1*d* and 2;

FIG. 26 depicts the chart for the subroutine FCTN for the system of FIGS. 1*d* and 2;

FIG. 27 illustrates the flow chart for the digits subroutine for entering numbers into the display for the system of FIGS. 1*d* and 2;

FIG. 28 shows the flow chart for the subroutine SET for the system of FIGS. 1*d* and 2;

FIG. 29 depicts the flow chart for the subroutine UNLCK for the system of FIGS. 1*d* and 2;

FIG. 30 illustrates the flow chart for the subroutine POST for the system of FIGS. 1*d* and 2;

FIG. 31 shows the flow chart for the subroutine ADP for the system of FIGS. 1*d* and 2;

FIG. 32 depicts the flow chart for the subroutine SUBP for the system of FIGS. 1*d* and 2;

FIG. 33 illustrates the flow chart for the subroutine PLUS for the system of FIGS. 1*d* and 2;

FIG. 34 shows the flow chart for the subroutine CLEAR for the system of FIGS. 1*d* and 2;

FIG. 35 depicts a flow chart for a subroutine for calling register contents into the display for the system of FIGS. 1*d* and 2;

FIG. 36 illustrates a flow chart for the subroutine ENBLE for the system of FIGS. 1*d* and 2;

FIG. 37 illustrates a flow chart for the subroutine ERROR for the system of FIGS. 1*d* and 2;

FIG. 38 shows a flow chart for the portion of the subroutine SCAN of FIG. 25 referred to as SCANX for the system of FIGS. 1*d* and 2;

FIG. 39 depicts a flow chart for the subroutine LDLMP for the system of FIGS. 1*d* and 2;

FIG. 40 illustrates a flow chart for the subroutine OUTPT for the system of FIGS. 1*d* and 2;

FIG. 41 shows a flow chart for the subroutine FETCH for the system of FIGS. 1*d* and 2;

FIG. 42 depicts a flow chart for the subroutine CMPAR for the system of FIGS. 1*d* and 2;

FIG. 43 illustrates a flow chart for the subroutine CHECK for the system of FIGS. 1*d* and 2;

FIG. 44 shows a flow chart for the subroutine ADDD for the system of FIGS. 1*d* and 2;

FIG. 45 depicts a flow chart for the subroutine ADD1; ADD2 for the system of FIGS. 1*d* and 2;

FIG. 46 illustrates a flow chart for the subroutine CLDSP;CLEER for the system of FIGS. 1*d* and 2;

FIG. 47 shows a flow chart for the subroutine CLR for the system of FIGS. 1*d* and 2;

FIG. 48 depicts a flow chart for the subroutine STPB for the system of FIGS. 1*d* and 2;

FIG. 49 illustrates a flow chart for the subroutine ZERO B for the system of FIGS. 1*d* and 2;

FIG. 50 shows a flow chart for the subroutine SETX for the system of FIGS. 1*d* and 2; and FIG. 51 depicts a flow chart for the subroutine STEP for the system of FIGS. 1*d* and 2.

Referring now to FIG. 1*a*, the general functional arrangement of the computerized postal meter system of the present invention is shown. The heart of the system is the CPU and it performs two basic functions: performance of calculations based on input data and controlling the flow of data between various memory units. Two basic memory units are employed with the CPU. The first is the permanent memory PM which is a non-alterable memory storing a specific sequence of operations for performing postal data calculations in accordance with certain predetermined inputs as well as performing other routines for operating the system. The second memory unit is a temporary memory TM which interacts with the CPU for forming a temporary storage, holding and forwarding working data in accordance with the calculations being performed by the CPU. An additional memory component NVM is also coupled to the CPU and performs a storage function which is very significant in the system operation of a postal data system. The NVM is a nonvolatile memory which acts to store certain critical information employed in the postal system as part of a predetermined routine activated either upon shut-down or start-up. This routine may be located in the permanent memory and is accessed by appropriate sensing device sensing either of the two stated conditions, shut-down or start-up, for operating the CPU in accordance with that routine. The function of this routine is to take information stored in the temporary memory TM which represents crucial accounting functions such as descending balances or ascending credits and the like and store them in the NVM (nonvolatile memory) wherein they may be held while the machine is de-energized and recalled upon a subsequent start-up. In this manner, the computer system may continually act upon these balances in the temporary memory without fear of loss of this information upon shut-down. Further, the information may be recalled on reactivation by start-up by retrieving it from the nonvolatile memory NVM and feeding it back into the TM via the CPU. The nonvolatile memory is shown as coupled to the CPU and deriving an output therefrom in accordance with the transfer of information from the temporary storage TM under the control of the permanent memory PM through the CPU in accordance with the shut-down routine. The NVM unit is also shown as providing an output line coupled back into the CPU for transferring the data back into and through the CPU and into the temporary memory TM in accordance with the start-up routine under the control of the permanent memory PM.

The system operates in accordance with data applied from an appropriate input means I. This data is fed into the CPU under control of the program in the permanent memory. At any time during the operation of the system, should the contents of the temporary memory storing the appropriate credit debit balances or other accumulations in accordance with the various features of the system be desired to be displayed, an appropriate instruction provided by the input means I causes the CPU to access the desired location TM storing the information requested. The information is is provided through the PCU into the output display unit O. The input and output units may be multiplexed by a multiplex unit MP to and from the CPU.

Under control of the CPU when appropriate postal data information is provided from the input I, and all of the conditions such as limits and the like which may be preset in accordance with the entered data in storage in the temporary memory TM, are satisfied, a postage setting device SP will respond to an appropriate output signal from the CPU enabling a postal printing unit PP. At this point, the system has now accomplished its immediate function of setting the postage printer and enabling the printer to print postage.

The foregoing functional description of the present invention in its embodiment in an LSI micro integrated form will be described in greater detail with reference to FIGS. 1*d* and 2. Before going to this explanation, however, a generalized view of the specific features and operations of the postal system operating in accordance with the present invention will be described.

Referring to FIGS. 1*b* and 1*c*, there is shown a general housing arrangement for the micro computer postage system.

FIG. 1*b* shows a general housing arrangement for the micro computer postage system. A housing 100 contains modular plug-in circuit panels 101 containing the circuitry and the CPU, ROM's, RAM's and shift registers of the system. The keyboard 34 and display 35 are mounted on the common top panel 102 of the housing 100. The setting and printing mechanism (FIG. 3) is contained in a forward section generally shown by arrow 103. An envelope 104 which is to be imprinted with postage is introduced in the slotted portion 105 of meter section 103 after the system is initialized. The amount of postage to be imprinted is then keyed into the keyboard 34 via push buttons 107, the set button 119 is pushed to set the postage into the drum, and the imprint button 108 is depressed. The imprint button 108 may be replaced by a limit switch or optical sensor located in slot 105, which would automatically provide a print signal when an envelope enters slot 105.

FIG. 1*c* is an enlarged view of panel 102 of FIG. 1*b*, which contains the keyboard 34 and display 35 of the postage meter system. The keyboard 34 comprises push buttons 107, as aforementioned, to enter the numerical amount of postage into the system. Push buttons 109, 110, 111, 112, 113 and 114 refer to the electronic registers for batch count, batch amount, piece count, control sum, ascending register, and descending register, respectively. When any one of these buttons are depressed, the numerical section 115 of the display 35 is cleared; the appropriate register is loaded into the display, and the appropriate indicator lamp section 116 of the display is lighted.

The keyboard and display of this invention provides two new registers (more can be added without too much difficulty). Batch count and batch amount registers supply a running account of the total number of pieces of mail processed during any one run or time period, and the total postage expended for this mail. They can be reset to zero by the user. The control sum register is extremely useful in that it provides a check upon the descending and ascending registers. The control sum is a running account of the total funds being added into the meter. The control sum must always correspond with the summed readings of the ascending and descending registers. The control sum is the total amount of postage ever put into the machine, and is alterable only when adding funds to the meter. Generally mechanical meters are not resettable by the user, but only by Postal authorities. However, with electronic postage system, a remote resetting capability may be programmed into the meter. One such remote resetting scheme which can be programmed into this system is shown in U.S. Pat. No. 3,792,446 filed Feb. 12, 1974.

The piece count register differs from the batch count in that it is not resettable by the user, and is used to indicate the total number of postage printings (pieces of mail) the machine has experienced. This information is useful to ascertain the life of the machine, and to gage when the system may require servicing and maintenance. The ascending and descending registers operate in normal fashion as might be expected from a standard postage meter. The ascending register giving a running total of the printed postage, and the descending register informing the operator of the amount of postage funds still remaining in the postage system.

The ± key (push button 117) provides the function of addition for adding in special charges to the postage such as special delivery, certification, etc.

The clear key 118 clears the numeric display 115, and also sets the batch registers to zero if displayed at the time the clear key is actuated.

The set button 119 is depressed after the postage required to mail a letter is keyed in by buttons 107. The set button 119 causes the print wheels in the printing drum 42 of FIG. 3 to set to the desired postage.

The $ unlock key 120 is a precautionary button which must be depressed by the operator in order to set postage equal to, or in excess of, a dollar. This extra physical step acts to prevent costly postage printing mistakes.

At the rear of the postage meter housing 120 (FIG. 1*b*) is a hinged security door or plate 125 having a latch 124. This latch secures the door 125 to the housing 120 by means of a wired lead seal 121. Postal authorities are the only ones empowered to open the seal 121, and access the contents behind door 125. The dorr 125 protects two switches 122 and 123, respectively (shown in phantom). Switch 122 empowers the microprocessor to call into operation the ADP routine of FIG. 31. The ADP subroutine is that part of the computer program which provides for the entering of postage funds into the system. Postage funds are entered into the system by first keying-in the amount of postage using the keyboard buttons 107. This amount of postage is displayed, and then added to the descending and control sum registers of the postage meter system by opening the security door 125 and pressing button 122. This button initiates a jump in the postage meter program to the ADP subroutine as aforementioned. After the ADP routine is executed, the door 125 is again secured by seal 121.

Switch 123 is provided for removing funds from the descending and control sum registers in the event a mistake in adding funds has occurred. Switch 123 initiates a jump to the subroutine SUBP of FIG. 32.

The need to add funds to the meter system is signalled by indicator lamp 126.

A check date reminder is provided by indicator 127, each time the postage meter system is turned on.

A meter enabled indicator 128 lights when (a) the printing drum 42 (FIG. 3) is properly set with postage; (b) the postage to be imprinted is displayed; and (c) sufficient funds are available to imprint the postage desired.

Indicator lamp 129 signals the operator to call the Pitney Bowes Service Department. This indicator lights when there is something wrong in the system, e.g., the sum of the ascending and descending registers do not check with the control sum.

Indicator lamp 130 signals the operator that the postage to be set is over or equal to $1.00, and in order for the postage to be set, the $ unlock button 120 must be pressed prior to the set button 119.

The indicator light 131 shows that the ascending register contents are being displayed in display section 115.

The indicator lamp 132 lights when the contents of the descending register are being displayed in display section 115.

The piece count indicator lamp 133 lights when the piece count is being displayed in display section 115.

The batch amount 134 and the batch count 135 indicators light when the batch registers are being displayed. The batch registers are newly added registers to the normal postage meter. The data shown in the display 115 for the batch count is a whole number (no decimal point) since the information is not dollars and cents data. The piece count information is similarly displayed without the decimal point. The control sum indicator 136 lights when the control sum register is being displayed in display section 115.

The low postage < $100.00 indicator 137 lights to tell the operator that the remaining funds in the descending register are currently below a hundred dollars. This alerts the operator that some time soon, he will be required to recharge the "meter".

In several places throughout this description, components have been written with a dual numbered designation, such as RAM(2)18. The number in parenthesis designates the order in the component series, i.e., using the above example, RAM18 is the second RAM in the series of RAMS.

Now referring to FIGS. **1*d* and 2, a block diagram of the LSI integrated form of the micro computerized postage meter of this invention is shown. The system comprises a MCS-4 micro computer set, which is a product of Intel Corporation, Santa Clara, Calif. The micro computerized set comprises a central processor unit (CPU), 10 which is connected to a number of read only memory ROM) components 11, 12, 13, 14 and 15, respectively, and a number of random access memory (RAM) components 16, 17, 18 and 19, respectively. A plurality of shift registers (S/R's) 20, 21, 22, 23 and 24 are respectively connected into the system through output ports 25 and 27 located on the RAM chips 16 and 18, respectively. The output ports on the RAMs have four output lines [8 4 2 1] as shown. The ROMs 11, 12, 13, 14 and 15 have input-output ports (I/O's) 29, 30, 31, 32 and 33 respectively, of four-bit capacity [8 4 2 1] as shown. It should be noted that although the input/output ports are physically located on these chips, they electrically communicate separately with the CPU 10.**

The shift registers 20, 21, 22, 23 and 24 respectively, provide port expansion for the postage meter system. In addition, shift registers 20 provides a multiplexing capability for operating a keyboard 34, and a numeric display 115. Shift register 23 multiplex the inputs of the meter setting feed-back photocells 36 to input port 32. A shift register 37 (4 × 128 COS/MOS S/R) with a hold-up battery provides permanent register information to the working memory which is allocated to RAM 16. The input port 31 receives the register information from the non-volatile memory 37 and channels this information to RAM 16 via the CPU 10. Each 4-bit memory word is clocked in sequence from the non-volatile shift register 37 to the working memory in RAM 16 via the CPU, until the shift register memory 37 has been completely shifted.

The numeric display 115 (FIG. 2) is controlled by the decoder/driver 46, which is connected into the system via output port 26. Output line 8 (output port 25) on RAM chip 16 provides a blank-unblank control over the decoder/driver 46 to eliminate leading zeros in the display 35, and to provide a blanking control signal for the particular display of this system (Burroughs Panaplex).

The inputs from the keyboard 34 are fed to the system via port 29. As aforementioned, the inputs from photocells 36 are directed to port 32. The photocells 36 provide feed-back information from the postage meter setting mechanism shown in FIG. 3.

The micro computer system 40 of this invention is powered from two (+5 and −10 volt) power supplies 38 as shown in FIG. 2. A power sensing circuit 39 is interconnected into the micro computer shown in such fashion, so as to allow the microprocessor system to detect a power failure. In such a case, the microprocessor calls a routine which transfers working memory to non-volatile memory, and protects it by disabling the memory via bit 8, port 27. A clock 41 serves to correctly phase the operations of the micro computer system 40. Two non-overlapping clock phases $\phi_1$ and $\phi_2$ are supplied to the central processor unit and random access and read only memory chips.

The central processor generates a SYNC signal every eight clock periods as shown in the Intel Users Manula for the MCS-4[R] micro computer set, copyright 1972, FIG. 2 on page 6 thereof. The SYNC signal marks the beginning of each instruction cycle. The RAM's and the ROM's will generate internal timing using SYNC, and $\phi_1$ and $\phi_2$. The shift registers (S/R's) are static shift registers and do not use these clock pulses for their operation.

The heart of any postage meter system is of course the printing means. With the use of electronics, accounting and mechanical registers and setting actuators become superfluous, since all the register information is electronically stored, and the setting of the meter banks is electromechanically controlled.

One of the ways the present micro computer system can print postage is by using a modified Model 5300 postage meter, manufactured by the assignee of this invention, Pitney-Bowes, Incorporated, Stamford, Connecticut. The modified meter only contains the previous printing drum 42 and the print wheel driving racks 43 as shown in FIG. 3; the mechanical registers and actuator assemblies having been removed. The print wheels within drum 42 (not shown) of the modified meter are set by a mechanism driven by a stepper motor 50 and a pair of solenoids 60 and 70 (FIGS. 2 and 3). The motor and solenoids are powered by a −24 volt power supply 44 shown in block diagram in FIG. 2. The indicator lamps 116 light up various display messages shown in FIG. 1*b*. These indicator lamps are likewise powered by the power supply 44.

Output port 28 channels control signals to the drivers 47 of stepper motor 50. The output lines 0, 1 of the shift register 24 channel control signals to the setting mechanism solenoids 60 and 70, respectively via drivers 48. The twenty output lines of shift registers 21 and 22 operate indicator lamps 116 via lamp drivers 49.

The meter setting and printing mychansim of this postage system will be described with reference to FIGS. 3, 4*a*, 4*b* and 5. A stepper motor 50 drives an upper and lower set of postage wheel driving racks 43 (four in all) via a pair of upper and lower nested shafts (four shafts in all) 52*a*, 52*b*, 52*c* and 52*d* respectively (FIG. 4*a*). Upper shafts 52*a*, 52*b* and lower shafts 52*c*, 52*d* are driven by a master drive gear 51, which is operatively rotatable in a clockwise and counterclockwise direction (arrows 55) by means of a stepper motor 50.

The printing drum 42 has four print wheels (not shown) to provide a postage impression to the maximum sum of $99.99. Each print wheel provides a separate digit of this sum, and is settable from "0" through "9". The print wheels are sequentially set by means of one of the four driving racks 43*a*, 43*b*, 43*c* and 43*d*, respectively. The driving racks are slidably movable (arrows 56 of FIG. 3) within the drum shaft 57.

The upper racks 43*a* and 43*b* are controlled by pinion gears 58*a* and 58*b*, respectively, and the lower racks 43*c* and 43*d* are controlled by pinion gears 58*c* and 58*d*, respectively (FIG. 4*a*). The pinion gear 58*a* is affixed to shaft 52*a*; the pinion gear 58*b* is affixed to shaft 52*b*; the pinion gear 58*c* is affixed to shaft 52*c*; and pinion gear 58*d* is affixed to shaft 52*d*. Nested shafts 52*a*, 52*b* and 52*c*, 52*d*, are respectively rotated (arrows 59) by means of respective spur gears 53*a*, 53*b* (FIGS. 3, 4*a*, 4*b* and 5) and respective spur gears 53*c*, 53*d* (FIG. 4*a*) affixed to the shafts at the stepper motor end thereof.

The master driving gear 51 engages each of the gears 53*a*, 53*b*, 53*c*, and 53*d* in the sequential order: 53*b*, 53*a*, 53*d*, 53*c*; with "53*b*" corresponding to the "tens of dollars" print wheel, and "53*c*" corresponding to the "unit cents" print wheel. The master gear 51 is sequentially slidably positioned (arrows 65) in rotational contact opposite each of the spur gears 53*a*–53*d* by sliding the yoke 63 over shaft 62. The master gear 51 is rotatably mounted within slot 64 in yoke 63, and is rotatably driven (arrows 55) by the stepper motor 50 via the motor shaft 50*a* and splined shaft 62. The yoke 63 is not rotatably engaged by the splined shaft 62 due to the sleeve bushing 66 which separates the yoke 63 from the shaft 62. The yoke 63 and master gear 52 are guided and supported by an additional smooth shaft 61, which nests within slot 67 of yoke 63.

In order that the teeth of the master gear 51 properly align with the teeth of the several spur gears 53*a*, 53*b*, 53*c* and 53*d*, a toothed section 69 of each spur gear is locked into place by a pair of upper and lower tooth profiles 68 and 68', respectively located on upper and lower surfaces of the yoke 63 as shown in FIG. 4*b* and 5.

As the yoke 63 and the gear 51 slide (arrow 65) over the splined shaft 62, the upper and lower laterally extending tooth projections 68 and 68' hold the spur gears 53*a*, 53*b*, 53*c* and 53*d* in place against rotational misalignment. Each of the gears 53*a*, 53*b*, 53*c* and 53*d*, respectively are only free to turn, when the master gear 51 is directly intermeshed therewith.

The sliding movement (arrows 65) of the gear 51 and yoke 63 is controlled by toggle pin 71, which nests within groove 72 of the yoke. The toggle pin 71 pushes against the yoke 63, when the pivotable link 73 to which it is attached, is made to pivot (arrows 74) about a center shaft 75. The link 73 is controlled by two solenoids 60 and 70, respectively, acting through pivot arms 76, 86 and 77, 87 respectively. The solenoids 60 and 70 pull upon their respective pivot arms 76 and 77 via pull rods 78 and 79, which are movably pinned to these arms by pins 81 and 82, respectively. When the pull rod 79 pulls upon arm 77, it is caused to pivot (arrows 80) about shaft 83, which is rotatably affixed to arm 77. When this occurs, arm 87 is caused to be pivoted (arrow 84) against the biasing action of spring 88. This in turn, results in pulling pivot arm 73 forward (arrow 89) via shaft 90. This causes the pivot arm 73 to pivot about center shaft 75, resulting in moving toggle pin rearwardly (arrow 91).

Likewise, when solenoid 60 pulls upon arm 76 via rod 78, arm 76 causes shaft 92 to turn (arrow 93) against the biasing of spring 94. This in turn, causes arm 86 to pivot (arm 95) about shaft 92. In pivoting, the arm 86 causes the center shaft 75 to move rearwardly (arrow 96). This in turn, forces the toggle pin 71 to move rearwardly (arrow 91).

There are four combined solenoid pull positions corresponding to the four separate mating positions between main gear 51 and each respective spur gear 53*a*, 53*b*, 53*c* and 53*d*; (a) both solenoids are not pulled-position 53*c*; (b) both solenoids are pulled-position 53*b*; (c) solenoid 70 is pulled and solenoid 60 is not pulled-position 53*a*; and (d) solenoid 70 is not pulled and solenoid 60 is pulled-position 53*d*.

The setting mechanism operation is as follows: (1) both solenoids 60 and 70 are pulled; (2) setting spur gear 53*b* via main gear 51 and stepper motor 50; (3) de-energizing solenoid 60 allowing pivot arm 76 to spring back under the action of spring 94; (4) setting spur gear 53*a* via main gear 51; (5) energizing solenoid 60 and de-energizing solenoid 70, allowing pivot arm 87 to spring back under the action of spring 88, and pivot arm 86 to pivot against spring 94; (6) setting spur gear 53*d* via main gear 51; (7) de-energizing solenoid 60 allowing pivot arm 76 to spring back under the biasing of spring 94; and (8) setting spur gear 53*c* via main gear 51.

After the spur gears are set to individual postage value positions, causing the racks 43 and the print wheels (not shown) to assume postage value positions, the drum 42 is rotated via shaft 57 (arrow 97) to imprint the set postage.

The home position of the drum 42 is monitored by a slotted disc 98 affixed to shaft 57. When slot 100 of disc 98 moves through the optical read-out well 99, the print cycle is detected.

All optical read-out wells of the setting mechanism as will be hereinafter described, comprise a light emitting diode (LED) and a phototransistor for receiving the light emitted by the LED.

The slide positions of gear 51 and yoke 63 (arrows 65) are monitored by determining the pivot position of pivot arms 86 and 77, respectively. Pivot arm 86 has a finger 101 which will pivot in and out of well 102, when solenoid 60 is actuated and de-actuated. Pivot arm 77 has a finger 103 which pivots in and out of well 104 when solenoid 70 is actuated and de-actuated.

The home positions of shafts **52*a* and 52*b* are monitored by slotted discs 105*a* and 105*b*, respectively (FIGS. 3 and 4*a*). When slot 106*a* of disc 105*a* is in well 107*a*, shaft 52*a* is at zero. Similarly, when slot 106*b* of disc 105*b* is in well 107*b*, shaft 52*b* is at zero. Shafts 52*c* and 52*d* are respectively "zero" monitored via respective discs 105*c* and 105*d*, slots 106*c* and 106*d*, and wells 107*c* and 107*d* (FIG. 4*a***).

Rotation of the stepper motor shaft **50*a*, splined shaft 62 and gear 51 is monitored via gears 108 and 108*a*, slotted monitoring wheel 109 and monitoring well 110. When stepper motor shaft 50*a* turns splined shaft 62 and main gear 51, a gear 108 attached to shaft 50*a* is also made to turn. Gear 108 intermeshes with gear 108*a* carried by the slotted monitoring wheel 109, causing wheel 109 to turn in correspondence with shaft 50*a*. Every fifth slot 111 on the monitoring wheel 109 is exra long to provide a standard for synchronization. Each slot on wheel 109 corresponds to a change of one unit of postage value. The slotted wheel 109 is optically monitored by well 110. Well 110 has two photosensors, 110*a* and 110*b*, respectively, as shown in FIG. 4*a*. Photosensor 110*a* monitors every step of the stepper wheel 109 and sensor 110*b*** monitors every fifth step.

In summary, the setting of the postage printer is done by selecting the desired bank with the solenoids and driving the stepper motor in the proper sequence under program control. The results of each step is verified by the micro computer via the monitoring photosensors.

BRIEF SUMMARY OF THE OPERATION OF THE POSTAGE METER

The operation of the postage meter can be briefly summarized as follows: With no power applied to the microprocessor, a de-energized "enable" solenoid (not shown) mechanically locks up the printing mechanism of FIGS. 3–5. When power is applied to the system, (turning on the meter), voltage sensing circuits monitoring logic supply voltage (FIGS. **12*a* and 12*b*) generate a general system reset pulse, when the logic supplies reach operating levels. This pulse initializes the microprocessor system, which then starts executing th program shown on page 66 from address ϕϕϕ. The nonvolatile memory 37 of FIG. 2, is loaded into working storage in RAM, the printing mechanism is set to zero, the descending register is loaded into the numeric display 115 of FIGS. 1*b* and 1*c* to inform the operator how much funds are available, and a "check date" reminder 127 is turned on. The system then loops in a SCAN routine (FIGS. 25 and 25*a*) which multiplexes the display and searches for keyboard 34** inputs. The meter remains in this routine until a keyboard input is detected at which time the program branches to execute the routine called for by the key. The program then returns to the SCAN routine.

The postage amount to be printed is set by entering the number into the display via keyboard 34 and operating the SET button 119 (amounts $1.00 or more require the pressing of the $ UNLOCK button 120 before pressing SET). If sufficient funds are available in the descending register to print the amount of postage the meter is set to, the "enable" solenoid is set (enables printing mechanism). There are two ways of tripping the print mechanism: (1) feeding a letter into the meter (2) operating the postage request lever 108. When tripped, the amount of postage shown in the display is printed. The operation of the print mechanism generates a signal to the SCAN routine which branches to a routine which updates the meter registers and checks to see if sufficient postage is available for again printing the postage amount the meter is set to. If available, the print mechanism remains enabled, if not, it is disabled.

If in the course of running postage through the meter, the sequence is interrupted, as by calling register contents into the display, the printing mechanism is disabled until a postage amount is again put back into the display. This can be done by depressing the SET button 119, which recalls the postage amount the meter is set to into the display, when operated after a non-numeric (not 0–9) key or by entering a new number and depressing the SET button which sets the meter printing mechanism to the new number.

Provision is made for entering funds into the meter (incrementing descending register and control sum) by means of two switches (+) 122 and (−) 123 located in an area protected by a sealed access door 125 (FIG. **1*b*). The appropriate postal authorities can enter or deduct any amount of postage (limited only by the size of the registers) by entering the desired amount into the numeric display 115 via keyboard 34,** and then operating the (+) or (−) switches. After recharging the meter, the authorities would then reseal the access door.

Within the SCAN routine, periodic checks of the logic power supplies are made to determine when to shut down the meter. When the voltage sensors (see FIGS. **12*a* and 12*b*) detect the voltage falling below a preset level, there is a certain minimal amount of time available (even with complete external power removed) in which to complete any routine in progress, sense the low voltage condition, disable the printing mechanism, and transfer register contents from working memory to the nonvolatile memory. This sequence is entered in shut-down and low line voltage situations where there isn't sufficient voltage to guarantee proper operation. The main program can only be re-entered through a complete power-up cycle described previously. Each RAM chip of this particular system (MCS-4) also provides an output port (for example, port 25 of FIG. 6) for providing the system with communication capability with peripheral devices. As aforementioned, these ports have four [8 4 2 1**] output lines.

The RAM chip 16 shown in FIG. 6 allocates the first 6 locations (0 through 5) in the first bank (200) for the descending register 815. The six locations will provide for a maximum dollar allocation of $9,999.99 (six digits). In other words, the postage meter system can be funded to a maximum of $9,999.99.

The allocation for the piece counter 817 (201) provides 7 locations, which on a piece count basis will provide a total of 9,999,999 pieces. The capacity of the piece counter must necessarily be large, since it is the total running account fo each and every piece of mail that is processed over the life of the machine.

Similarly, the control sum register 818 (202, locations 0 through 9) and the ascending register 816 (200, locations 6 through F) provide a very large capacity (a dollar total of $99,999,999.99) because these sums are continuously increasing for the life of the system.

Batch Sum 819 (201, location A through F) and Batch Counter 820 (202, location A through F) have capacities equal to the capacity funding of the descending register, since in any batch run one can never spend more in a pre-funded system than the available funds stored.

The locations 0 through 3 and C through F of bank 203 are reserved for registers which are used to control the setting of the printer mechanism from a previous meter setting ("number meter set to" (SETNG) register 211) to a new meter setting ("meter setting" register (MSR) 307).

These registers only require four word lines, since the printing mechanism of this invention as shown in FIGS. 3 through 5, has a maximum setting of $99.99. Naturally, if the printer had only a three bank setting ($9.99), only three word spaces would be needed in these particular registers.

Status flag 821 is used in the programming to monitor stepper motor 50 (FIG. 3). Status flags 822, 823, and 824, respectively are used in the programming to monitor the setting of the printer banks (FIG. 3).

FIG. 7 shows the memory allocation provided by RAM chip 17. Bank (204) contains storage for an addition register 210 in locations 7 through F. The addition register is for the purpose of temporary storage and for adding to the regular postage to be printed, an increment of additional or special charges, i.e., insurance, certification, special delivery, etc. For example, suppose it was desired to add 50 cents additional postage to the regular postage amount of 10 cents. First, the numbers one and zero (ten cents) would be entered into the numeric display 115 by means of keys 107 of the keyboard. Next, the button 117 is depressed, which transfers the 10 cents from the display to the additions register 210. A five and a zero (50 cents) are then keyed in, and appear in the display. The button 117 is again depressed to add the 50 cents to the additions register 210, and the display providing a total of 60 cents stored in the additions register. The set button 119 is then depressed to set the meter to sixty cents.

FIG. 8 depicts the memory allocation in RAM chip 18. Bank 205 (location B through F) contains the lamp output area 206 shown in more detail in FIG. 8*a*. Bank (207) has locations 7 through F allocated for the images of the display contents 208. The numeric words from this storage space appear in display section 115 (FIG. 5*a*). Lamp output register 206 (spaces B through F) in bank (205) applies to the display section 116.

Storage space 212 (space 6 of bank 207) is allocated for placement of a new digit word prior to its being entered into display contents 208. The purpose of this storage space is that it serves to provide a means to clear display contents 208, if the previous operation was not one which allowed for entering a number into display contents 208. In other words, the new digit space is an intermediary storage facility for storing a new display digit, until it is determined where in the sequence of events is the information being entered to the display.

The word spaces in banks (205) and (207) of FIG. 8, corresponding to "batch flag" 305 (bank 205, status location 0); "status flag" 311 (bank 207, status location 0); and "$ unlock flag" 309 (bank 207, status location 2) are used in the programming to indicate a particular operation condition. These indicators will be further discussed hereinafter.

RAM chip 19 is illustrated in FIG. 9. The status words 215 and 216, respectively, of bank 214 are used in the operational control of the setting and printing mechanism of FIG. 3.

FIG. 10 shows the various input ports of the ROM's.

FIG. 11 is an electrical schematic diagram of the non-volatile memory circuitry 37 shown in block diagram in FIG. 2. The non-volatile memory consists of two dual 128 bit static shift register 140 and 141, respectively, as shown. These shift registers are of the complementary MOS (CMOS) type. CMOS was chosen because of its very low power consumption in the quiescent state. This allows for powering the memory by means of a battery 143, which will maintain the integrity of the memory for extended periods of time, i.e., the memory will not be erased. The particular shift register components (SCL 5172) were manufactured by Solid State Scientific, Inc. of Montgomeryville, Pennsylvania 18936. These components have been presently discontinued, but there are many other similar components currently on the market, e.g., RCA's CD 4031 AE and Motorola's MC 14157CL.

In their power off state, the shift registers 140 and 141, as well as the transmission gates 142 and 143, respectively, the NOR gates 144 and 145, respectively, and the flip flop 146 all operate from the power supplied by battery 143. Flip flop 146 is in the low logic state ($Q=0$; $\bar{Q}=1$) at this time, which disables gates 142, 143, 144 and 145. Transmission gates 142 and 143 effectively disconnect the battery operated circuitry outputs from the microprocessor system. This prevents excessive battery current required to supply the low impedance inputs of the ROM(2)13 and load resistors 13*a* during the power off condition. Thus, battery life is extended considerably. The inputs to the shift registers 140 and 141 are of characteristically high impedance (CMOS) and therefore, do not require this form of isolation. Gates 144 and 145 are disabled by flip flop 146 in the "power-down" and transition states. This inhibits spurious signals on lines 147 (clock signal line) and the memory disable line 148. This is necessary, because during "power-up" and "power-down" sequences, there may be spurious signals on the output port 27 (FIG. 1*d* supplying the control signals. This is so, because at this time the power signals are non-zero, but have not as yet reached their specified operating values. During "power-up" and "power-down" the microprocessor is not functioning predictably and memory must therefore be protected, which is accomplished by gates 144 and 145.

During "power-up", transistor 149, which is initially off, remains off until line 150 is connected to ground. This occurs when optical switches 152 and 153 (FIGS. 12*a* and 12*b*, respectively) turn on. Optical switches 152 and 153 are part of the −10-volt and +5-volt power supply monitoring circuits, and turn on when the −10 volt and +5 volt supplies respectively reach their operating values. Both of these power supplies are necessary for the proper operation of the microprocessor system.

As power begins to come on, diode 155 through which battery current flows, turns off and diode 156 turns on. This switches the memory over to the main power supply. The reverse procedure is experienced during shut-down. When line 150 becomes low, transistor 149 turns on, causing connection point 154 to go high. This in turn causes the Q output of the fip flop 146 to go high via line 157. This enables gates 142, 143, 144 and 145 resulting in making the memory fully operative with the microprocessor system.

During start-up, a reset signal to the microprocessor is generated by the circuit of FIG. 13. The reset signal initializes the central processor unit (CPU 10 of FIG. 1*d*), and starts the program of the system executing from location/φφφ in ROM. The beginning portion of the program contains initialization procedures which are only executed once during the start-up sequence. Included in this start-up sequence, is a subroutine INRAM described with reference to FIG. 22. This subroutine transfers the contents in the shift registers 140 and 141 to the working area (RAM) of the microprocessor system. Data from these non-volatile shift registers 140 and 141, comprising "postage meter register" data, is read into the microprocessor system through ROM input port (2) 31 as shown in FIGS. 1*d* and 10. Each sequential word of data in the shift register memory is accessed by writing out a clock pulse to shift registers 140 and 141 via bit 8 of output port 27 as shown in FIGS. 1*d* and 8. After all of the 128 words of the shift register memory are loaded into RAM, the non-volatile memory remains idle until a shutdown sequence (subroutine DOWN of FIG. 23) is initiated. The shutdown sequence will result if either or both of the power supplies (+5 volt and −10 volt) begin to turn off. The optical switches 152 and 153 (FIGS. 12*a* and 12*b*) then turn off, thereby turning off transistor 149. This in turn causes connection point 154 to go low. In addition, the voltage on line 158 goes low. The line 158 is connected to the test input on the CPU 10. This test input is read periodically during program execution, and when it is read as a logical low, the program branches to the DOWN subroutine (FIG. 23). The "postage meter register" data in RAM is now read, and then written out to the shift register memory via output port 26 of FIG. 7. This "postage meter register" data may have changed in the hiatus between initialization and shutdown due to the entering of new postage. After the data word information is written out to CMOS shift register memory, a clock pulse is written out via bit 8 output port 27 of FIG. 7. This enters the data word into the non-volatile memory, and then the next sequential word is accessed in RAM memory. The sequence of accessing and writing of the sequential data words continues until the entire contents of RAM memory has been transferred back into the shift registers (non-volatile memory). After the transfer has been completed, a memory disable signal is written out to the flip flop 146 via bit 4 of output port 27 and line 148. This causes the "Q" of the flip flop to go to zero, which disables the memory. To reinitiate the memory system, both optical sensors 152 and 153 must turn on to start the sequence again.

It should be noted, that the above scheme of transferring the contents of memory need not be required, where the "working" memory areas are themselves indistructable. For example, the RAM memory may be furnished with a hold-up battery, thus eliminating the need for the CMOS shift register memory. "Working" storage may also comprise a core memory or other similar non-volatile storage components, such as a plated wire memory, a magnetic domain memory, a MNOS memory, etc.

FIG. 12*a* shows the electrical schematic for the −10 volt supply monitoring circuit. The −10 volt supply is monitored by a voltage regulator IC 159, connected to form a voltage sensing circuit. The input voltage applied to line 160 powers this circuit. The circuit contains an internal zener reference diode. The input voltage is compared against this reference, and when it exceeds a predetermined value set by the potentiometer 161, the output switches on. This causes the LED 162 of the optical switch 152 to energize. This turns on the phototransistor 163 of the optical switch 152, which provides the part of aforementioned input to the memory circuit of FIG. 11, and also provides an input to the reset circuitry of FIG. 13. The optical switch 152 is made by the Monsanto company, and has a part No. MCT-2. The IC regulator 159 is a standard part No. 723, manufactured by Teledyne, Signetics, Motorola, etc.

FIG. 12*b* depicts the electrical schematic for the +5 volt supply monitoring circuit. This circuit performs a similar function as that shown in FIG. 12*a*. The external zener diode 164 is used as a reference. A differential amplifier 165 (RCA, CA3046) compares the input voltage supplied on line 166, against the reference. When the input exceeds a predetermined value set by the potentiometer 167, the LED 168 of the optical switch 153 turns on. This causes the phototransistor 169 of the optical switch to supply an output to the memory circuit of FIG. 11, and also to the reset circuitry of FIG. 13. In the circuit of FIG. 12*b*, a 723 IC is not used because the voltages being monitored are not sufficiently large to properly bias the circuit.

The monitoring circuits shown, are respectively connected across the filter capacitors 170 and 171 of the power supplies. The monitoring circuits are set to switch as a threshold several volts greater than the output voltage on lines 174 and 175, respectively. If power is lost from the AC line supplying power to the rectifiers, and the load connected to the output voltage lines 174 and 175 remains constant, the filter capacitors 170 and 171, will respectively discharge in a nearly linear fashion until the respective regulators 172 and 173 start failing to regulate due to the insufficient supply voltage.

When the rectified voltage drops below the sensing voltage threshold set by the potentiometers 161 and 167, respectively, of FIGS. 12*a* and 12*b*, the optical switches 152 and 153 (FIGS. 12*a* and 12*b*) turn off. This in turn generates a signal sensed on the CPU test line, which initiates the aforementioned shutdown routine.

As long as the maximum time to detect the shutdown signal and the time to transfer the register contents from working RAM memory to the non-volatile memory, does not exceed 20 milliseconds, there will be sufficient memory, to preserve the emory, and operate the microprocessor in a defined mode. The time parameter is a function of the filter capacitors, load, sensing voltage, and output voltage. The 20 millisecond value has been obtained by choosing the worse load condition for the system.

The reset circuitry of FIG. 13, comprises a one shot 178 set to provide a guaranteed minimum width pulse. The input to the one-shot 178 is from the outputs of the power supply monitoring circuits of FIGS. 12*a* and 12*b*, respectively.

FIG. 14*c* illustrates the power supply circuitry (−24 volts) used to operate the stepping motor 50, the solenoids 60 and 70 of FIG. 3, and the message display lamps of section 116 of FIG. 1*c*. The zener diode 179 regulates the voltage outputted on the line 180.

FIG. 15 shows the circuitry associated with the multiplexing shift register (φ) 20 of FIG. 1*d*. This shift register is a 10 bit serial-in/parallel-out S/R, which is used in this postage system to multiplex both the display and the keyboard (see FIGS. 1*d*, 1*b* and 16). The multiplexing is accomplished by entering a logic "1" into the shift register, and shifting it through, thus enabling the outputs one at a time. Nine of the outputs as shown in FIG. 15, are connected to anode drivers 181, which operate the Panaplex display in a multiplexed mode. The Panaplex[R] display of FIG. 16 is manufactured by the Burroughs Corp. The anode drivers 181 are of a common, well known type, similar to those described in the technical brochure (advance copy) put out by the Sperry Information Displays Division, Scottsdale, Arizona, entitled: "Multiplexing Sperry SP-700 Series Information Displays", Page 28.

FIG. 16 illustrates the electrical schematic for the keyboard and the display (sections 115 and 116) of FIG. 1*c*. Section 115 of the display is shown at the top of FIG. 16, and represents the aforementioned gas discharge Panaplexdisplay. Below the gas discharge display, are shown the indicator lamps, (section 116) which are powered by the voltage supply of FIG. 14*c*, and are controlled by the shift register and switching circuitry shown in FIG. 17. The 300 ohm resistors in the lamp circuit are used to limit the current to the lamps (the lamps are 12 volt lamps). The electrical schematic for the keyboard 34 is shown below the lamp circuitry. The four horizontal (row word) lines, and ten vertical (column word) lines intersect to provide a select position. The "row word" lines are connected to the ROM input port 29 (FIG. 1*d*), and seven (all ten vertical lines are not used) "column word" lines are connected to the shift register 20 of FIGS. 1*d*, and 15. A discussion on multiplexing a keyboard using an Intel shift register (4003) and microprocessor (4001) can be found on pages 51–52 of the Intel Users Manual for the MCS-4[R] Micro-Computer Set, the February 1973 edition (Revision 4).

FIG. 17 depicts the electrical schematic for the shift register circuitry controlling the indicator lamps of FIG. 16. Shift register 21 and 22 (see FIG. 1*d*) are 10 bit serial-in/parallel-out S/R's which are utilized as port expanders. A bit pattern corresponding to the particular indicator lamps to be turned on, is transferred to the shift registers 21 and 22 in a serial manner from register 206, RAM (2)18, (please refer to subroutine LDLMP of FIG. 39). The shift registers 21 and 22 provide logic "1" outputs to respective transistors 182 (typical) which act as switches, which in turn light their associated lamp (FIG. 16).

FIG. 18 illustrates the decimal point circuitry which turns on the decimal point separating the "dollars" and "cents" in the numeric display 115. The decimal point is inhibited from appearing in the display, (lines 184 and 185, respectively) when the "piece count" or the "batch count" is being displayed. The digit to be displayed is written out in BCD form on RAM output port 26 (FIG. 1*d*) to the decoder driver 183 as shown. The output of the decoder driver 183 is decoded for the seven segment display shown in FIG. 16 (top). The decoder driver 183 (DD 700) is manufactured by Sperry Rand (SP-700 Technical Bulletin, October 1971).

The blanking feature incorporated into the decoder driver 183 is driven by RAM output port 25 (FIG. 1*d*) bit 8. Besides suppressing leading zeros, this blanking is also used in the multiplexing process. A discussion of blanking requirements for multiplexed gas discharged displays can be found on page 5 of the aforementioned brochure: "Multiplexing Sperry SP-700 Series Information Displays".

The resistor 186 is a current limiting resistor used in the power supply for the stepping motor. Resistors 187 and 188 are current limiting resistors used in the power supply to the LED's of the optical switches 190, 191, 192, 193 and 194, 195, 196, 197, respectively (FIG. 19).

FIG. 19 shows the electrical schematics for the meter monitoring photocells, the stepper motor coil drivers, and the print sensing photocell. The print sense photocell 189 of well 99 in FIG. 3 is shown in electrical schematic at the bottom of FIG. 19. This photocell detects the completed rotation of the printing drum 42 (FIG. 3). When this photocell senses that postage has been printed, the program branches to a routine that updates all the "postage meter" registers by the amount of postage to which the meter was set. This photocell is multiplexed into the "meter" along with keys of the keyboard 34 (FIG. 1*b* and 1*c*).

The optical switches 190 through 197, which monitor the mechanical functions of the "meter" are mutiplexed into the input port 32 by shift register (3)23 (FIG. 1*d*).

RAM output port 28 (FIG. 1*d*) is used to drive the stepping motor 50 (FIG. 3). This output port is connected to an RCA CD4050 buffer, which in turn drives darlington transistor switches 250, 251, 252 and 253, respectively via lines 254, 255, 256 and 257, respectively. The motor 50 is powered by the −24 volt supply of FIG. 14*c*. The stepping motor 50 (FIG. 3) is a RAPID-SYN, Model 23D-6102A, manufactured by Computer Devices Corporation, Santa Fe Springs, California. The characteristics of the motor (specifications, switching, sequence, schematic, etc.) are given in bulletin C and D, Pages 6-73.

The respective darlington transistor switches 258 and 259 are used to energize the bank select solenoids 60 and 70 of FIG. 3. These switches receive their inputs from shift register (4)24 of FIG. 1*d*, via lines 262 and 263, respectively.

The darlington transistor switch 260 is used to energize the "meter enable" solenoid (not shown), which is used to free shaft 57 (FIG. 3) for rotation. The switch is inputted on line 264 (FIGS. 17, 19), by the signal used to power the "meter enabled" lamp of the display (FIG. 16).

All the connections not specifically mentioned, and which are relevant to the circuitry depicted in FIGS. 11 through 19, are shown by pin connection numbers as illustrated.

Operation of the System

The operation of this computerized postage meter system will be explained with reference to the flow charts shown in FIGS. 20 to 51, and the associated program appended to this specification.

While the above program has been of necessity written about the particular meter setting mechanism shown in FIGS. 3, 4*a*, 4*b* and 5, it should be understood that the essence, spirit, scope, and limits of this invention are considered to be of a broader character. In other words, the present computerized postage meter system could have been easily programmed about a jet printing postage apparatus of the type shown and described in copending application, Ser. No. 433,805, filed Jan. 16, 1974. Also, it is to be understood that many other high speed printing apparatuses can be made compatible with the present computerized system. Other such apparatuses include matrix and line printers.

With all such printing devices, the basic safeguards regarding postal security must of necessity be maintained, such as securing the printer against physical and electronic tampering.

Referring to FIG. 20, a generalized overall representation of the operation of this postage meter system is shown in flow chart form. The system is first given power as shown per block 300. When the system is powered, a general system reset pulse initializes the microprocessor system. This causes the CPU registers, RAM memory, and I/O ports to be cleared, and starts the postage meter program executing from address φφφ.

The postage meter system operation is set in motion by recalling postage meter register data from the non-volatile memory and placing this data in the working area of RAM. Also, when the postage meter system starts its operation, the printer banks of the printing and setting mechanism of FIGS. 3, 4*a*, 4*b* and 5 are all set to zero. These are some of the major procedures represented by "initialization" block 301. In addition to these procedures, other functions are also performed, as will be explained hereinafter will reference to FIGS. 21 and 21*a*.

After "initialization", the system enters a SCAN routine shown in the general sense by blocks 302, 303 and 308 and in more detail hereinafter, by the flow chart of FIG. 25. The SCAN routine consumes the greatest portion of postage meter operation time. The principle function of the SCAN routine is to search for a depressed key on the keyboard 34 and multiplex the numeric display 115 of FIGS. 1*b* and 1*c* (block 302). Once having found a validly depressed key (block 308), the SCAN routine will branch to the appropriate subroutine corresponding to the function called for by that particular key. The SCAN routine will generate an address to a "look-up" table where the particular address of the subroutine corresponding to the key is stored. This stored address is transferred to register pair 6 in the CPU. The subroutine FCTN (which is a jump to the address in register pair 6) is then executed.

After a particular key is serviced (block 310), the SCAN routine is re-entered to re-inspect the keyboard for new and subsequent inputs.

During the course of the SCAN routine, a periodic check is made as to the power condition of the system (block 303). In case of a power failure, the postage meter system must be able to complete any on-going operations, and to retransfer the contents of working memory (RAM contents) back into non-volatile storage (block 304). The "powering down" and "save memory " sequences will be more fully explained hereinafter, with reference to the DOWN subroutine of FIG. 23. When there is a "power-down", a trap (block 306) is entered, and the program cannot re-enter the SCAN routine except by the initation of a complete "power-up" sequence.

The meter initialization sequence block 301 is shown in more detail with reference to FIG. 21. The information in the non-volatile memory is transferred into working memory (RAM) via subroutine INRAM (block 312) which will be described in more detail with reference to FIG. 22. All four imprint wheels are then set to zero as per block 313 using the subroutine HOME of FIG. 24. Descending register contents are then loaded into the numeric display (block 314) and the check data reminder indicator lamp is lighted (block 316). The descending register contents are displayed at start-up to inform the operator how much funds are available for printing postage. The check date reminder, reminds the operator to set the date on the postage printing mechanism. The system then goes into the SCAN routine as previously mentioned.

An important part of the initialization procedure is the subroutine CHCK (block 315) shown in more detail in FIG. 21*a* (see Program address/4A3). Subroutine CHCK is used to detect errors that cause noncorrespondence in the meter funding registers. If the sum of the descending and ascending registers minus the control sum register does not equal zero (block 801), the CHCK routine turns the "call PB service" indicator lamp on (block 804), and disables the meter from printing postage. If the registers properly correspond (block 802) the subroutine will branch back via line 803. This subroutine is very novel with regards to postage meter operation, since this is the first time a postage meter has had the capability of monitoring its own funding registers.

FIG. 22 depicts the flow chart for subroutine INRAM, which can be found in the appended program at the instruction address/142.

The subroutine INRAM transfers data from the non-volatile shift register memory into working area in RAM.

CPU index registers are initialized (block 317) to specify input and output ports operatively connected to the shift register memory, and to specify RAM memory locations where this data is to be stored. The output of the shift register memory is read through an input port (block 318), written into RAM (block 319) and written out on an output port to the shift register memory (block 320). The shift register is then clocked (block 321) to access the next memory word. The index register specifying RAM address is incremented (block 322) in preparation for storing the next word. A counter is checked to see if transfer of data is complete (block 323). If not, a branch is made back into the program (line 325) to pick up the next sequential word. When transfer of data is complete, the INRAM subroutine branches back via block 324.

FIG. 23 illustrates the flow chart for the subroutine DOWN, which can be found in the appended program at the instruction address/15A. As aforementioned, the DOWN subroutine is a procedure for saving the contents of the memory (transfer RAM contents to the non-volatile memory) in the event of a power failure and normal turn off.

This routine is entered from the SCAN routine only when an impending power failure has been detected.

CPU index registers are initialized (block 327) to specify location of working area in RAM, and to specify input and output ports connected with the shift register memory. A data word from RAM is read (block 328), then written out to the shift register memory (block 329). A clock pulse to the shift register (block 330) enters the data into memory. The RAM address is incremented (block 331) and a test made on a counter to determine if everything has been transferred (block 332). If not, the program loops back (line 333) to transfer another data word to the shift register. When the transfer of data has been completed, the loop is terminated via (line 334) and a "turn off" signal is written to the shift register memory (block 335). The program then loops in a trap (336). A complete "power-up" sequence is needed to get back into the program.

The subroutine HOME is flow charted as shown in FIG. 24, and has a program address/174.

The HOME routine is part of the aforementioned initialization procedure for the meter. It sets the print wheels to zero to establish a reference for subsequent setting operations. The only position of the print wheels that can be directly read by the system is the $\phi$ (zero) position. This position is determined by monitoring the wells 107*a, b, c, d*, respectively, by detecting the slot (zero position) in slotted wheels 105*a, b, c, d*, respectively (FIG. 4*a*).

An index register is initialized (block 337) to specify the location of the Meter Setting Register 307, FIG. 6. Subroutine CLR of FIG. 47 selects the first set of photocells (block 338). The Meter Setting Register 307 is cleared (block 339) and the every step photocell 110a of FIG. 4*a* is read (block 340). If on a print step, (block 341) the program Proceeds (via line 342) to select the printer band (block 343). Monitoring wells (102 and 103, respectively monitoring the solenoids 60 and 70, of FIG. 3) are read and checked against the selected bank (block 344). If no contradiction exists, the following operation (via line 345) is selecting the next photocell bank and reading the monitoring well (107*a, b, c, d*, respectively of FIG. 4) corresponding to that bank to determine if the respective slotted disc (105*a, b, c, d*, respectively of FIG. 4*a*) indicates the selected print wheel is at the zero position (block 346). The CLR routine (block 347) is again used to select the first photocell bank. If the print wheel corresponding to the selected printer bank is not at zero (block 348), the print wheel is given one full printer step (block 354) corresponding to changing the setting of the print wheel by one unit towards zero. If no error is flagged in the step routine, the loop is re-entered via line 355 to again check for the zero position of the print wheel. This procedure is used to determine if the wheel needs another print step to reach zero. The loop is terminated via line 349, when the selected print wheel is at zero. If all four printer banks have not yet been set to zero, block 351 is exited via line 352 to block 343 where the next printer bank is selected. Setting the next print wheel to zero is done in the aforementioned manner. When all printer banks have been set to zero, the fifth position photocell (110*b* of FIG. 4*a*) is read (block 354). It should indicate a fifth position slot. If this is so, the HOME subroutine is terminated via line 356 through a branch back (block 360). Should any error be flagged, such as a photocell not indicating a mechanical response to a given signal, the error routine (block 359) is called via lines 364, 368, and 358, respectively.

If reading the every step photocell (block 341) at the beginning of the routine, does not show the printer to be at a full printer step, half a print step is generated (block 362) to align the main gear 51 with the tooth profiles 68, 68' on the yoke 63 of FIG. 4*b*. This procedure frees the yoke, so that it can move to select the printer banks.

FIG. 25 illustrates the SCAN routine having a program address of/0ID. The primary purpose of the SCAN routine is to process keyboard inputs to the meter. The routine rejects multiple key depressions and debounces the key input. When a single key depression is read for four successive scans, the routine generates an address in a look-up table where the address of the routine corresponding to that particular key is stored. The routine contains operations preparatory to, and following, the servicing of the key via FCTN (FIG. 26). A secondary function of the SCAN routine is multiplexing the numeric display 115 of FIGS. *ib* and 1*c*.

Index registers are initialized (block 369) to specify display address, length of various counting loops and I/O ports. Display blanking is determined (block 370) by examining the most significant digits of the display for leading zeros and storing an indicator. A bit is loaded into the multiplexer shift register 20 of FIG. 15 to start the multiplexer (block 371). A display character is read from the display register in RAM and written out to the decoder driver 183 (FIG. 18). The display is unblanked, if the character is not a leading zero. The keyboard input is then read and processed as per block 373 (see FIG. 38 for a detailed description). A delay routine (block 382) is entered to allow sufficient time for display. A check (block 384) is made to determine if the "power-down" sequence should be initiated. If not, the display is blanked and the multiplexer clocked to select the next display digit and set of keyboard inputs (block 388). A check (block 389) is made to see if the loop has been completed. If not, the loop is re-entered via line 390, the next display digit is written out, and the next set of keyboard inputs is read in. Upon completion of the loop, a check is made (line 391) to see if a valid key depression had been sensed (block 392). If so, a batch indicator 305 (FIG. 8) is stored (block 396) (this indicator shows if the last operation had been calling a batch register into the display - this indicator is used in the CLEAR routine of FIG. 34). An address of a location in a look-up table is generated from the "ROW" and "COLUMN" words.* The LDLMP register 206 of FIG. 8 is cleared (block 397), because a routine called by the selected key may require that different indicator lamps be selected. A branch to the keyboard function is made in block 398. Upon return to the SCAN routine, the accumulator contents are stored in the status flag 311 of FIG. 8 (block 399), which is used to identify the last performed operation. This is necessary, because some keyboard functions are dependent on the previous function performed. The descending register is compared to the meter setting register 307 of FIG. 6 (block 400) to generate the "low postage" and "no postage" indications on the indicator panel 116 of FIG. 1*c*.

*The "Row work" is the information read into the input port 29 from the keyboard 34. The "Column word" identifies active multiplex output, i.e. the bank of keys selected by the multiplexer. (Also refer to duscussion with respect to FIG. 16.)

The meter checks its funding registers (block 401) as per the CHCK routine of FIG. 21*a*. The selected lamps are then turned on (402) and the beginning of the SCAN routine re-entered via line 403. If a valid key had not been read after reading the last bank of keys, re-entry would have been make from decision block 392 via line 393. If a "power down" condition would have been sensed in block 384, a branch via line 385 would have been made to the DOWN routine of block 386.

FIG. 26 is a chart of the subroutines called for through FTCN (program address/2C1). FCTN is a generalized entry point into the subroutines called by the keys. When a valid key is detected, an address in a look-up table in ROM is generated from the "ROW" and "COLUMN" words. This location contains the address of the subroutine corresponding to the key. FCTN jumps to this address and executes the specified subroutine. The chart in FIG. 26 specifies all the keys and the labels of the subroutines called.

FIG. 27 illustrates a subroutine for entering numbers into the display register from the keyboard. Each of the multiple entry points correspond to a particular digit.

Upon entry to this routine, a number is generated corresponding to the entry point, and thus to the particular key calling the routine (block 427). This number is temporarily stored (block 428) while the status flag 311 (FIG. 8) is checked to determine if the previous keyboard operation was entering a digit (block 429). If not, the display is cleared (block 431) before continuing. The contents of the display are shifted left (block 432) and the new number entered on the right. The UNLOCK flag 309 (FIG. 8) is set to zero (block 434), and a branch back with ACC=1 is initiated (block 435). The 1 is used to flag this operation in the status flag 311.

FIG. 28 shows the subroutine SET having a program address/2C5. The SET routine has basically two modes of operation: (1) it sets the meter print wheels to the value entered into the display via the keyboard, and (2) if the display contents are not from the keyboard, the last setting value is recalled. This value is displayed and the meter enabled, if sufficient postage is available for printing the amount of the setting.

Index registers are initialized (block 513) to set up the CHECK routine (block 514). The CHECK routine examines the contents of the display for $1.00 or more. The status flag 311 (FIG. 8) is next examined to determine if numerical entry from the keyboard is in the display (block 515). If so, the CHECK routine then looks for a value of $100.00 in the display (block 518). If the value is both less than $100.00 (block 519) and less then $1.00 (block 525) the routine proceeds to set the meter (block 533), enable the meter (block 534), clear the ADD register 210 of FIG. 7 (block 539) and branch back (block 540). If $1.00 or more is in the display, the UNLOCK flag 309 of FIG. 8 is checked. If flagged, setting the meter would continue as before via line 532. If the $ UNLOCK has not been flagged, an indicator light showing "$ UNLCK" would go on (block 529) and a branch back would be (block 530) made without ever setting the meter. If the amount in the display is greater than $99.99 an error would be indicated (block 522), because the meter, being a four bank meter, cannot set to a value that is higher than $99.99.

The second mode of operation occurs where the contents of the display have not been entered by the keyboard (block 516). In that case, the display is cleared (block 536), the meter setting put into the display (block 537), and the meter is enabled if sufficient postage is available in the machine (block 534). The ADD register 210 is then cleared (block 539) as before, and the routine branches back (block 540).

FIG. 29 depicts the subroutine UNLCK having a program address/266. The UNLCK routine sets the $ UNLCK flag 309 of FIG. 8, (block 492), if the previous function executed was that of entering a number into the display (block 490). The $ UNLOCK flag is used to enable the printer, if the setting is $1.00 or more of postage. In such a case, there is a branch back with ACC=1 (block 493).

FIG. 30 illustrates the flow chart 30 for the subroutine POST having a program address/297. The POST routine updates the meter registers each time postage is printed. This occurs when the photocell 99 (FIG. 3) detects the slot 100 in the disc 98 mounted on the drum shaft 57. This signifies a drum rotation, and hence, the printing of postage.

The ascending register 816 200 of FIG. 6, and the batch amount register 819, are incremented by the amount in the meter setting register 307 (MSR) (see blocks 470 and 471). The piece count 817 and batch count 820 also of FIG. 6 are incremented by 1 (blocks 472 and 473), and the descending register 815 is decremented by the amount in the meter setting register (block 474). The ENBLE routine (block 475) determines if the printer may be enabled for a subsequent print of the same amount. The routine is then terminated (block 476).

FIG. 31 shows the flow chart for the subroutine ADP having a program address/400. The aroutien ADP is a means for entering funds into the meter. The amount to be metered is first inputted via the keyboard. The "+" switch 122 (FIG. 1*b*) is then depressed to call the ADP function.

Index registers are initialized (block 436) to specify pertinent meter registers. If the display contents had been entered via the keyboard (block 437), and were not larger than the total capacity of the descending register 815 (blocks 441 and 442), the display contents are added to the descending register and the results placed in the descending register (block 445). If no overflow occurs (block 446), then the display contents and control sum 818 are added together and placed in the control sum (block 451). A branch back is executed (block 450). If, however, an overflow had been generated (block 446), there would be a branching to block 448 via line 447. The display register would be subtracted from the descending register to restore the original amount, and an error would be flagged (block 439) before branching back. If an error had been detected earlier, (display not from keyboard block 437); or display contents too large (block 442) the error routine (block 439) would have been called via lines 438 and 443, respectively. The routine would then be terminated as before (block 450).

FIG. 32 depicts the flow chart for the subroutine SUBP having a program address/450. The routine SUBP is a means for taking funds out of the meter. The amount to be taken out is entered via the keyboard. Next, switch 123 (FIG. 1*b*) is depressed to call the SUBP routine. Its operation is analagous to that of the aforementioned ADP routine of FIG. 31.

Index registers are initialized (block 453) to specify the pertinent meter registers. If the display contents are from the keyboard, (block 454) and not too large (blocks 459 and 460) the display contents are subtracted from the descending register and the result is placed in the descending register (block 463). If a borrow is not generated, then the control sum is decremented by the amount in the display (block 468) and a branch back is executed (block 469). Had a borrow been generated, the descending register would have been incremented by the display contents (block 466 via line 465) and an error message would have been flagged (block 456). The error message is also flagged, if the display contents had not been from the keyboard, or if these contents were too large (see lines 455 and 461).

FIG. 33 illustrates the flow chart for the PLUS subroutine having a program address/27B. The PLUS routine adds the contents of the display to the ADD register 210 (FIG. 7), and puts back the result in both the display and the register. This allows chain addition of a series of numbers entered via the keyboard. This routine is summoned when the "±" button 117 is depressed on the keyboard (FIGS. 1*b* and 1*c*). This routine provides the capability of adding ancillary charges to the main postage, such as insurance, special delivery postage, etc.

Index registers are initialized to specify the registers concerned (block 496). The status flag 311 of FIG. 8 (block 497) is fetched to determine if the contents of the diplay are from the numerical entry of the keyboard (block 498). If so, block 500 is entered. The ADD register 210 (FIG. 7) and display (DISP) register 208 (FIG. 8) are added together and the result placed back in both registers. If no overflow occurs (block 505), a branch back is made (block 510). If an overflow has been detected, an error message via line 506 is flagged (block 507) before branching back (block 508). If the PLUS routine had been called without the previous operation having been from the numerical entry of the keyboard, a branch back (block 508) would have been made via line 511 without performing any operation.

FIG. 34 shows the flow chart for the subroutine CLEAR having a program address/23D. The CLEAR routine performs the following functions: (1) clears the display; (2) recalls contents of the "ADD" register 210 (FIG. 7) into the display; (3) clears the "ADD" register 210 on the second successive clear; and (4) clears batch registers 819 and 820 (FIG. 6) if either register is displayed at the time the CLEAR routine is called.

The display register 208 (FIG. 8) and the $ UNLOCK flag 309 (FIG. 8) are cleared (block 477 and 478). The status word 311 (FIG. 8) is checked (block 479) to see if the previous operation had been the CLEAR routine. If not, block 482 is entered. Contents of the "ADD" register 210 are transferred to the display (DISP) register 208 (contents of the "ADD" register are nonzero only when in the process of adding up a series of numbers) using the ± key 117 of FIG. 1*c*. The effect of the clear key 118 in this case, is to clear a keyboard entry and recall into the numeric display 115, the subtotal up to that point. The addition process may be continued upon entry of the next number. The "LDLMP" area 206 (FIGS. 8 and 8*a*) is cleared (block 484). The batch flag 305 is checked (block 485) to see if the previous keyboard operation was calling either of the two batch registers into the display (batch sum or batch count). If not, a branch to the main program is made (block 488). If so, line 486 is taken to block 487. The batch registers are cleared before returning to the main program (block 488).

If the previous keyboard operation had been CLEAR as per decision block 479, the "ADD" register 210 would have been cleared via line 480 to block 481, before entering block 482.

FIG. 35 shows a subroutine for calling register contents into the numeric display 115 of FIGS. 1*b* and 1*c*. This routine has six entry points corresponding to six meter registers which can be called into the display. Its purpose is to load the display with the contents of the specified meter register, and to turn on the indicator lamp corresponding to the selected register.

The meter register being called is specified by the entry point into the routine (block 420). Both the display (DISP) and addition (ADD) registers 208 and 210, respectively (FIGS. 8 and 7) are cleared (blocks 421 and 422). Then the FETCH routine of FIG. 41 is called. This initializes index registers to specify the meter register being called. The indicator lamp corresponding to the specified meter register is selected by writing a bit in the appropriate word in the LDLMP area 206 of RAM(2)18 (block 424). The contents of the specified register are then written into the display register 208 (block 425), and a branch back initiated via block 426.

FIG. 36 illustrates the flow chart for the subroutine ENBLE having a program address/100. The subroutine ENBLE generates the signal for the printer enabling solenoid. The ENBLE routine first calls CMPAR (block 736) which compares the meter setting register 307 of FIG. 6 against the descending register 815 (block 737). If the descending register is greater than or equal to the meter setting, an enabling bit is put into the LDLMP area 206 (block 739) (see FIG. 8*a*, word 8D, bit 4) before branching back (block 740). Otherwise, a branch back is made directly from block 737 via line 741.

FIG. 37 relates to a flow chart for the ERROR subroutine having a program address/133. The ERROR routine is used to flag certain errors. The error message is contained in the accumulator at the time the ERROR routine is called. The most significant (leftmost) place in the display register 208 (block 716) is selected and the contents of the accumulator (block 717) is written into the display register before branching back (block 718) to the main program.

FIG. 38 shows a flow chart for the portion of the SCAN routine of FIG. 25 which is referred to as SCANX (see block 373 of FIG. 25). The SCANX procedure is used to debounce the keys and check for a valid key depression. The four input lines from the keyboard matrix (FIG. 16) generate what will be hereinafter referred to as the "ROW" word. A number corresponding to the active output of the multiplexer (FIGS. 15, 16) will be hereinafter referred to as the "COLUMN" word. A nonzero "ROW" word and "COLUMN" word identify a particular activated key in the keyboard matrix. The term "count" word as used herein is defined as the number of times the same key depression has been successively read.

The detailed operation of reading the keyboard follows: If the multiplexer (MPX) has selected an output connected to the keyboard (block 374), the "ROW" word is read (block 376). If not zero (block 377), the keyboard process instruction is used to detect multiple keyboard depressions in the group of four input lines being read. If the "COLUMN" word is the same as that of a previous scan (blocks 406 and 407), and only one key is pressed, (blocks 409 and 410), the last "ROW" word is compared with the present one (block 395). If both are the same, the "COUNT" word is incremented (block 416). Block 392 in the SCAN routine of FIG. 25 uses this number to decide when to branch to a selected routine. If the "COLUMN" (block 407) and "ROW" (block 412) words are not the same as in the previous scan, or more than one key is pressed (block 409), the "COUNT" word is reset to zero (block 381) starting a new count sequence, before a new key will be recognized. If the multiplexer (MPX) is not selecting a group of keys, or if the "ROW" word is zero but the "COLUMN" word is different from that stored from the previous pass, the keyboard processing is bypassed via line 387.

FIG. 39 depicts the flow chart for the LDLMP subroutine having a program address/10A. The LDLMP routine transfers data in the LDLMP register 206 of FIGS. 8 and 8*a* to the shift registers 21 and 22 of FIG. 1*d*. These shift registers drive the 1*d*. display (section 116 of FIG. 1*c*).

Index registers are initialized (block 663) to specify the LDLMP register 206. The first word of the register is read (block 664) and temporarily stored (block 665). The OUTPT routine (block 666) enters the 4 bit word into the shift register in a serial manner. If the last word had not been serviced by the OUTPT routine, the routine jumps back via line 668 and gets the next sequential word in the LDLMP register 206. The routine branches back (block 670) after the last word has been outputted.

FIG. 40 illustrates the flow chart for the subroutine OUTPT having a program address/114. The OUTPT routine is called by the LDLMP routine. Its purpose is to output a 4 bit word in serial manner into a shift register.

First, index registers (for counting and for specifying ports) are initialized (block 671). The output word is loaded into the accumulator (block 672), and then rotated right to store a bit in the carry (block 673). The remaining bits are stored (block 674). A clock pulse bit is loaded into the accumulator (block 675) and rotated left to bring in the bit stored in the carry and to bring the clock pulse bit into position (block 676). The data is then written out to the shift register (block 677). If not at the end of the sequence (block 678) a jump back to block 672 is made via line 679 so as to output the next bit. If the sequence is finished, a branch back is made per block 681.

FIG. 41 shows a flow chart for the subroutine FETCH having a program address/OBE. The FETCH routine is used to initialize CPU index registers with data from a look-up table specifying a particular meter register (block 730). The FETCH routine affords some economy in instruction count.

The accumulator is loaded with a number corresponding to the desired meter register before the call to "FETCH" is made. The FETCH routine first generates from the contents of the accumulator, an address specifying the location of the desired data. Then, the starting address of the selected meter register is loaded into an index register pair (block 731). The lamp display word address is loaded into another index register pair (block 732), and the lamp display word itself is loaded into an index register (block 733). The starting address of SETNG ("number meter set to" register 211 of FIG.

6) is put into yet another index register pair (block 734) before branching back as per block 735.

FIG. 42 depicts a flow chart for the subroutine CMPAR having a program address/09B. Subroutine CMPAR compares the meter setting register 307 (FIG. 6) with the descending register 815 of FIG. 6. There are three conditions which are considered:

1. descending register ≥ $100.00 (block 747 - unconditionally larger than meter setting)
2. $100.00 > descending register meter setting (blocks 747 and 749)
3. meter setting > descending register (block 749)

These conditions are respectively flagged by the contents of the accumulator upon branch back to the main program, i.e. branch back is made with ACC=0, 2, 3, depending upon which one of the aforementioned conditions is observed (see blocks 754, 755 and 751, respectively). The overall objective of this routine is to check the funding available (descending register) as against the called for postage (meter setting register) to be printed. If not enough funds are available to print postage, the printer will not be enabled.

FIG. 43 illustrates the flow chart for the subroutine CHECK having a program address/138. The CHECK routine is used to determine if the contents of a meter register exceeds a specified amount by testing high order digits to see if they are nonzero.

An index register is initialized with an address in the meter register corresponding to the higher order digits being checked, before the CHECK routine is called. The carry is cleared (block 719) and the location specified by the address is read (block 720). If zero (block 721), the address is incremented (block 723), and the next higher order digit is read (block 720 via line 727). Any non-zero digit causes the carry to be set (block 725). Branch back occurs (block 729) at the end of the sequence (block 726). A carry equal to zero indicates that all specified higher order digits were zero. A carry equal to 1 indicates at least one of these digits was nonzero.

FIG. 44 shows a flow chart for the subroutine ADDD having a program address/129. The ADDD routine adds the SETNG register 211 of FIG. 6 to a specified meter register, and writes the result back in the specified meter register. The meter register is specified by the contents of an index register initialized prior to calling the ADDD routine.

The carry (CPU) is cleared (block 705) before calling subroutine ADD1 which adds a SETNG register digit to a meter register digit (block 706). Then, the SETNG address is incremented (block 707), and a test made for the end of the loop (block 708). If the loop has not been completed, the next digits in each register are added together via line 709. At the end of the sequence, ADD2 is entered (block 711). ADD2 propagates the carry through the longer meter register. After completing this (block 712) a branch back to the main routine is made via block 715.

FIG. 45 depicts a flow chart for the subroutine ADD1; ADD2 having program address/120;/123. The ADD1 routine adds a digit from the SETNG register 211 of FIG. 6 to a digit from a meter register, decimal adjusts the result (binary to BCD conversion), and writes it back into the meter register.

A second entry point (ADD2) allows propagation of a carry through a meter register by adding a zero to the digit, decimal adjusting, and writing back in.

This routine adds one pair of digits at a time and is called repeatedly to add two registers together (see subroutine ADDD).

FIG. 46 relates to subroutine CLDSP; CLEER having program address/25E;/260. CLDSP write zeros into the display area. CLEER writes zeros into an area specified by a preset index register.

An index register is initialized to specify the display register (block 698). A zero is written into this location (block 693), the address incremented (block 696) and the next sequential location is cleared (block 694) until the clear operation is complete (loop 695). A branch back (block 698) to the calling routine is made upon completion thereof.

FIG. 47 shows a flow chart for the subroutine CLR having a program address/1B9. Subroutine CLR clears the photocell multiplexer 23 of FIG. 1*d* (block 742) and then selects the first set of photocells (every step, fifth step, solenoid monitoring photocells) as per block 743. Branch back is per block 744.

FIG. 48 shows a flow chart for the subroutine STPB having a program address/300. The STPB routine is called by the SET routine of FIG. 28 to operate setting mechanism solenoids 60 and 70 of FIG. 3. This routine controls the solenoids so as to select a particular printer bank by bringing the master gear drive 51 (FIG. 3) into engagement with one of the respective spur gears 53*a*, 53*b*, 53*c*, 53*d*, (FIG. 3).

An index register used in the SET routine conveys information as to which printing bank is to be selected (block 627). A series of tests (blocks 628, 629, 630, respectively) determine which one of the four printer banks *a*, *b*, *c*, *d*, is selected. If, for example, bank *b* were selected, block 631 would be entered which requires both solenoids to be actuated. This is done by loading the appropriate bits (two 1's in this case) into the shift register (element 24 of FIG. 1*d*). After the solenoids are selected, a delay routine (block 635) provides time for the mechanism of the printer to respond to the electrical signals. Photocells (102 and 103 of FIG. 3) monitoring the position of the solenoids are then read (block 636) and compared with what they are expected to read (block 637). If the reading is in correspondence, a branch back with a zero in the accumulator (block 640) is made. Otherwise, an error is flagged (line 641) by branching back as per block 642 with the accumulator =/B.

A bank "*c*" selection (decision block 628) will require that both solenoids be deactuated (block 644). Banks *d* or *a* will require one or the other of the solenoids to be actuated (blocks 646 or 648).

FIG. 49 illustrates a flow chart for the subroutine ZEROB having a program address/353. Subroutine ZEROB reads photocells 107*a*, *b*, *c*, *d*, of FIG. 4*a*, which detects the zero positions of the print wheels of the printer. The reading from a selected bank is placed into the carry bit of the accumulator.

The second photocell set is selected by clocking the photocell multiplexer (block 649). A slight delay (block 650) allows time for the photocells to respond. A series chain of decision blocks (651, 652 and 653) is entered to determine from preset status characters, which of the photocell readings (banks *a*, *b*, *c* or *d*) is to be selected. If for example, bank *a* were selected, the photocells would be read (block 654 *a*) and the data shifted in the CPU accumulator until the photocell bit corresponding to bank a is in the carry bit (block 655a). A branch back (block 656) then follows.

FIG. 50 relates to the flow chart for subroutine SETX having a program address/37E. The SETX routine is that portion of the SET subroutine of FIG. 28, that performs the detailed setting of the print wheels to the value shown in the display.

Index registers are initialized (block 546) to specify the display register 208 (FIG. 8) address and the meter setting register (MSR) 307 (FIG. 6) address. The contents of the display are transferred to the meter setting register (block 541). The number to be set (MSR) is compared with the previous number i.e., with "number meter set to" register 211 of FIG. 6 (SETNG). This is accomplished digit by digit (block 547). If not the same, the motor direction flag 215 (FIG. 9) is initialized as per block 556 (direction determined by which number is greater [MSR digit or SETNG digit]) and the different between the numbers is stored. The new number (MSR) is then written into the previous number area (SETNG) as per block 553. The printer is set to the appropriate bank for the digit being considered (block 558). If the bank selection mechanism does not respond, photocells detect an error. If not error, line 562 is taken to block 563. One step in the appropriate direction is taken, and a check is made to ascertain if there is a stepping error (block 564). If no error has been flagged, the fifth position flag 216 (FIG. 9) is updated (block 567). If the flag indicates that the photocell (110b of FIG. 4a) should be seeing the fifth position slot, (block 572) the photocell is read (block 574). If it verifies that the motor is on a fifth step (block 575), a check is made to see if the proper number of steps has been counted off (line 577 to block 580). If not, a return via line 587 is taken to block 563 (STEP). The above procedure is then repeated. When the selected print wheel has been fully stepped to its new position, and if the position is zero (block 584), the ZEROB subroutine is called (block 586) to read the zero position photocells. This is to verify if in fact, the selected print wheel is at zero (decision block 587). If so, the photocell multiplexer is restored to selecting the first bank (block 598). THe flags used in the STPB routine are cleared via line 591*a* to block 592. If not the last bank to be set (block 594), a branch back via line 595 is made to compare the next new number digit with the previous number digit. The setting process is then repeated. If any bank does not have to be altered (decision block 549) the setting process for that particular bank is bypassed via line 604. If the last bank had been selected in block 594, the setting mechanism is returned to the (first bank) rest position (block 597). If no error is detected (block 598) in returning to the rest position, the ENBLE routine is called (block 600) which enables the meter if a sufficient amount of postage is available in the descending register. The "ADD" register 210 (FIG. 7) is cleared (block 601), before branching back (block 602). Any error in stepping the motor 50 (FIG. 3) or bank selection causes a branch to the error routine (block 561) which causes an error message to be placed in the display.

FIG. 51 relates to the flow chart for the STEP routine, having a program address/IC7. The STEP subroutine changes the setting of a selected print wheel of the printer of FIG. 3 by one unit. The flag for motor direction is set up before calling the STEP routine. Normally, the motor starts from a STEP reference position. On start-up, the motor word* (1001) is written out which turns the motor and puts the monitoring wheel 109 (FIG. 3) of the motor in either a "STEP" or "HALF-STEP" reference position.

*The bit pattern corresponding to energizing or deenergizing stepper motor coils is referred to as the "motor word". There are eight "motor words" for each step, and four "motor words" for each half-step of the motor. (See APPENDIUM B for a discussion of motor operation.). The "every step" photocell 110*a* of FIGS. 3 and 4*a* sensing the wheel 109 position is read. If it indicates that the motor wheel 109 is on a "HALF-STEP" reference position, the motor is advanced half a step. From that point on, the STEP routine pulses the motor in increments of eight motor words, i.e. from one "STEP" reference position to a succeeding "STEP" reference position.

Index registers are initialized (block 605) to specify look-up table addresses when the motor word pattern for "STEP-UP" and "STEP-DOWN" is stored. The output port to the motor drivers is selected (block 606). A status character 215 of FIG. 9 is read to determine the direction the motor is to be stepped (block 607). The appropriate motor word is loaded (block 611 or 612) then written out (block 613). A delay loop is entered (block 614) to give the motor time to respond. If not at the end of the loop (block 548), a return via line 550 is made to block 607 to get the next bit pattern. (there are four different bit patterns per half-step). After the fourth word is written out, the "every-step" photocell 110*a* of FIG. 4) is read (block 615). On the first pass through this routine, the monitoring wheel should have gone from "STEP" to "HALF-STEP" reference positions. The photocell (block 618) is read to verify that it is on a "HALF-STEP" (photocell should be blocked by a tooth on slotted monitoring wheel 109 [FIG. 31]). If on a half-step, re-entry to block 605 is made via line 621 to re-enter the routine to write out four more words. The monitor wheel should now be on a full "STEP" again. Photocell 110*a* is read (block 620) to verify the full step position. Then there is a branch back (block 626). If at any place the photocell doesn't agree with what it should be, there is a branch back with an error message (1*c*) as per block 623.

APPENDIUM A

Comments on The Postage Meter Program Printout

The representation of some of the instructions has been slightly altered from those representations Intel uses in their Users Manular (copyright March 1972, Rev. 2). Double instructions are printed on two lines, rather than one. The second line contains data or an address associated with the double word instruction. Data, numbers, and addresses are generally given in hexadecimal notation, rather than the decimal and octal notation found in the Users Manual. The following list indicates the format of instructions which differ from the format in the Users Manual. "D" indicates data in hexadecimal notation. "R" represents an index register number in hexadecimal. Reference should be made to the Users Manual for a complete description of the instructions.

| MNEMONIC | Program REPRESENTATION | COMMENTS |
|---|---|---|
| LDM | LDM+D | |
| LD | LD +R | |
| XCH | XCH+R | |
| ADD | ADD+R | |
| SUB | SUB+R | |
| INC | INC+R | |
| BBL | BBL+D | |
| ISZ | ISZ+R | |
| JCN | JCN+TZ | where condition is TEST + 0 |
| | JCN+AZ | where condition is ACCUMULATOR = 0 |
| | JCN+AN | where condition is ACCUMULATOR ≠ 0 |
| | JCN+CZ | where condition is CARRY = 0 |
| | JCN+CN | where condition is CARRY ≠ 0 |
| JIN | JIN+R | R is even, refers to register pair R, R−1 |
| SRC | SRC+R | |
| FIN | FIN+R | |
| FIM | FIM+R | |

INTERPRETATION OF THE COMPUTER PRINTOUT

```
STATEMENT NUMBER          COMMENTS

01116   *SUBROUTINE ADP                    30 JAN 74
01117   *ROUTINE TO ADD POSTAGE TO METER (BOTH
01118   *DESCENDING REGISTER AND CONTROL SUM)
```

```
HEXADECIMAL REPRESENTATION OF INSTRUCTION ADDRESS
MACHINE INSTRUCTION IN HEXADECIMAL
STATEMENT NUMBER
LABEL OF INSTRUCTION
INSTRUCTION IN MNEMONIC FORM
COMMENTS

1400  0  8020  01119  ADP  DC  FIM+/C
1401  0  00B7  01120       DC  /B7
1402  0  802D  01121       DC  SRC+/C
1403  0  80EC  01122       DC  RDC      (B) READ STATUS CHARACTER
1404  0  80F6  01123       DC  RAR      CHECK FOR XXX1
1405  0  801A  01124       DC  JCN+CZ
1406  0  143B  01125       DC  ERRR
1407  0  802E  01126       DC  FIM+/E
```

-continued

| | | | | | | | |
|---|---|---|---|---|---|---|---|
| 1408 | 0 | 0000 | 01127 | | DC | /00 | |
| 1409 | 0 | 806F | 01128 | RTN1 | DC | INC+/F | DETERMINE NUMBER OF CHARACTERS |
| 140A | 0 | 802D | 01129 | | DC | SRC+/C | IN DISPLAY |
| 140B | 0 | 80E9 | 01130 | | DC | RDM | |
| 140C | 0 | 8014 | 01131 | | DC | JCN+AZ | |
| 140D | 0 | 1410 | 01132 | | DC | END | |

APPENDIUM B

Description of the Stepping Motor Operation

The stepping motor 50 (FIG. 3, 4*a*) has four driving coils, two of which are energized at a time. The motor rotates one increment (motor step) when the pattern of energized coils changes. The schematic of the motor driving circuitry is shown in FIG. 19.

In the following table, "1" will represent an energized coil, "$\phi$" will represent a de-energized coil. The stepping sequences are as follows: The "STEP-UP" sequence turns the motor in such a direction as to increase the meter setting, the "STEP-DOWN" sequence decreases the meter setting. The bit pattern corresponding to energized and de-energized coils will be referred to as the "MOTOR WORD".

TABLE

| TIME PERIODS | | MOTOR WORD (STEP-UP) Coil 1 | Coil 2 | Coil 3 | Coil 4 | MOTOR WORD (STEP-DOWN) Coil 1 | Coil 2 | Coil 3 | Coil 4 |
|---|---|---|---|---|---|---|---|---|---|
| One Full Step | $T_0$ (One-Half Step) | 1 | 0 | 0 | 1 | 1 | 0 | 0 | 1 |
| | $T_1$ (One-Half Step) | 0 | 0 | 1 | 1 | 1 | 1 | 0 | 0 |
| | $T_2$ (One-Half Step) | 0 | 1 | 1 | 0 | 0 | 1 | 1 | 0 |
| | $T_3$ (One-Half Step) | 1 | 1 | 0 | 0 | 0 | 0 | 1 | 1 |
| | $T_4$ (One-Half Step) | 1 | 0 | 0 | 1 | 1 | 0 | 0 | 1 |
| | $T_5$ | 0 | 0 | 1 | 1 | 1 | 1 | 0 | 0 |
| | $T_6$ | 0 | 1 | 1 | 0 | 0 | 1 | 1 | 0 |
| | $T_7$ | 1 | 1 | 0 | 0 | 0 | 0 | 1 | 1 |
| | $T_0'$ | 1 | 0 | 0 | 1 | 1 | 0 | 0 | 1 |

($T_0$; $T_0'$) is the "rest" state where the motor remains when it is not being stepped. When stepping, $T_n - T_{n-1} \approx$ delay in the stepping routine (STEP, FIG. 51). The gears coupling the motor to the print wheels are such that a sequence of motor steps as above (from $T_0$ to $T_0'$) will change the meter setting by a single unit in the selected bank. A slotted wheel 109 (FIG. 3) is coupled to the motor such that when the motor is at $T_0$ (or $T_0'$) the photocell 110*a* (FIG. 3) sees a slot, and at the $T_4$ time period the photocell sees a tooth. Thus, in changing the print mechanism by one digit the photocell should see a slot-tooth-slot sequence. This provides a means of monitoring the stepping sequence to verify motor operation.

It will be appreciated by those skilled in the postage meter art, that a new postage meter system has been disclosed herein. As a result of the many new concepts and novelties thereby introduced, it is probable that many modifications of an obvious nature will occur to the skilled practitioner in this art. All such obvious changes are intended to be within the spirit and scope of this invention as presented by the appended claims.

```
// JOB      0001 0002                    0001 0002                    1

LOG DRIVE    CART SPEC    CART AVAIL    PHY DRIVE
  0000          0001          0001         0000
  0001          0002          0002         0001

V2 M09    ACTUAL 16K    CONFIG 16K

*EQUAT(PAPTX,PAPTY)

// ASM
*MACLIB INTAS
*XREF
                           00001           ABS
                           00002           CLEAR
                           00003       *PROGRAM AS OF 30 JAN 1974          EPM-2
                           00004       ****************************************************************
                           00005       * ROM =0 *******************************************************
                           00006       ****************************************************************
                           00007       *** INITIALIZATION                              ********************
1000 0    8000             00008           DC        NOP
1001 0    802E             00009           DC        FIM+/E      SET MOTOR TO FIRST STEP
1002 0    00C0             00010           DC        /C0         RAM 3 PORT USED
1003 0    802F             00011           DC        SRC+/E
1004 0    80D9             00012           DC        LDM+9
1005 0    80E1             00013           DC        WMP         RAM3
1006 0    8050             00014           DC        JMS         LOAD MEMORY
1007 0    1142             00015           DC        INRAM
```

-continued

```
1008 0  802A          DC     FIM+/A    CLEAR METER SETTING REGISTER
1009 0  0030          DC     /30
100A 0  8050          DC     JMS
100B 0  1260          DC     CLEER
100C 0  8050          DC     JMS       SET METER TO 0000
100D 0  1174          DC     HOME
100E 0  80D4    WW    DC     LDM+4     LOAD DESCENDING REGISTER
100F 0  80FA          DC     STC
1010 0  8026          DC     FIM+6
1011 0  1224          DC     DESC
1012 0  8050          DC     JMS
1013 0  12C1          DC     FCTN
1014 0  802C          DC     FIM+/C     WRITE  SET DATE  REMINDER INTO
1015 0  008D          DC     /8D        DISPLAY WORD
1016 0  802D          DC     SRC+/C
1017 0  80D1          DC     LDM+1
1018 0  80E0          DC     WRM
1019 0  8050          DC     JMS
101A 0  14A3          DC     CHCK
101B 0  8050          DC     JMS
101C 0  110A          DC     LDLMP
                *SUBROUTINE SCAN                              08 JUNE 1973
                *REGISTERS 0X,6X,8X,AX,CX,EX ARE USED TEMPORARILY BY ROUT.
                *REGISTER 2 'COUNT' WORD      SAVE
                *REGISTER 4 'ROW' WORD        SAVE
                *REGISTER 5 'COLUMN' WORD     SAVE
101D 0  802E    SCAN  DC     FIM+/E    SET UP CNTR TO CHECK BLANKING
101E 0  00B9          DC     /B9
101F 0  802A          DC     FIM+/A    SELECT S R PORT LOCATION
1020 0  0000          DC     /00
1021 0  8028          DC     FIM+8     OUTPUT PORT DISPLAY LOCATION
1022 0  0049          DC     /49       R9 NUMBER OF DISPLAY DIGITS
1023 0  802F    CONT3 DC     SRC+/E    ROUTINE TO DETERMINE BLANKING
1024 0  80E9          DC     RDM
1025 0  8014          DC     JCN+AZ    CHECK FOR NON-ZERO DIGIT
1026 0  1029          DC     CONT4
1027 0  80AF          DC     LD+/F
1028 0  80B9          DC     XCH+9     UPDATE COUNT REGISTER FOR DIGITS
1029 0  807F    CONT4 DC     ISZ+/F
102A 0  1023          DC     CONT3
                *S/R PORT RAM 0, DISPLAY PORT RAM 1
                * FIRST PART OF PROGRAM DETERMINES BLANKING
                *
102B 0  802E          DC     FIM+/E    INITIAL DISPLAY BUFFER LOCATION
102C 0  00B6          DC     /B6
102D 0  80D3          DC     LDM+3     GET MPX STARTED
102E 0  8050          DC     JMS
102F 0  149E          DC     CP
1030 0  802F    STRT  DC     SRC+/E    SELECT LOCATION IN DISPLAY BUFFER
1031 0  80E9          DC     RDM       READ DISPLAY CHARACTER
1032 0  8029          DC     SRC+8
1033 0  80E1          DC     WMP       RAM1
1034 0  80F1          DC     CLC
1035 0  80A9          DC     LD+9      INDICATES DIGITS TO BE DISPLAYED
1036 0  809F          DC     SUB+/F    CHECK TO SEE IF NUM. TO BE DISPLAYED
1037 0  80D0          DC     LDM+0
1038 0  80F6          DC     RAR
1039 0  802B          DC     SRC+/A    RAM0  8 BIT
103A 0  80E1          DC     WMP       RAM0  0 BLANKS, 1 UNBLANKS
                * GOES TO DECODER DRIVER
103B 0  80F1          DC     CLC
103C 0  80D7          DC     LDM+7
103D 0  808F          DC     ADD+/F
103E 0  801A          DC     JCN+CZ
103F 0  1060          DC     T4
                * SKIP OVER FIRST FEW BANKS OF KEYS
1040 0  80EA          DC     RDR       ROM0  READ 'ROW' WORD
1041 0  8014          DC     JCN+AZ    TEST FOR INPUT
1042 0  1059          DC     T1
1043 0  80FC          DC     KBP       KEYBOARD 1-4 IF KEY ON
1044 0  8083          DC     XCH+3     STORE
1045 0  80AF          DC     LD+/F
1046 0  80B5          DC     XCH+5     UPDATE 'COLUMN' WORD
1047 0  80F1          DC     CLC
1048 0  8095          DC     SUB+5     COMPARE WITH PREVIOUS 'COLUMN' WORD
1049 0  801C          DC     JCN+AN    WORD NOT EQUAL, JUMP 'COUNT' WORD =0
104A 0  105E          DC     T2
```

-continued

```
1048 0  8063   00093         DC    INC+3     CONTINUE IF SAME R3 = 2-5
104C 0  80A3   00094         DC    LD+3      CHECK TO SEE IF MORE THAN ONE KEY
104D 0  8014   00095         DC    JCN+AZ    MORE THAN ONE KEY, JUMP,
104E 0  105E   00096         DC    T2        SET 'COUNT' WORD = 0
104F 0  8084   00097         DC    XCH+4     COMPARE WITH PREVIOUS 'ROW' WORD
1050 0  80F1   00098         DC    CLC
1051 0  8094   00099         DC    SUB+4     COMPARE
1052 0  801C   00100         DC    JCN+AN    NOT SAME, JUMP, SET 'COUNT' = 0
1053 0  105E   00101         DC    T2
1054 0  80A2   00102         DC    LD+2      INCREMENT 'COUNT' WORD IF WORD SAME
1055 0  80FA   00103         DC    STC
1056 0  80F5   00104         DC    RAL
1057 0  8040   00105         DC    JUN
1058 0  105F   00106         DC    T3
1059 0  80AF   00107   T1    DC    LD+/F     COMPARE 'COLUMN' WORD
105A 0  80F1   00108         DC    CLC       F NOT 5, 'COUNT' WORD SAME
105B 0  8095   00109         DC    SUB+5     F = 5 'COUNT' WORD SET TO ZERO
105C 0  801C   00110         DC    JCN+AN
105D 0  1060   00111         DC    T4
105E 0  80D0   00112   T2    DC    LDM+0     SET 'COUNT' WORD TO ZERO
105F 0  8082   00113   T3    DC    XCH+2     UPDATE 'COUNT' WORD
1060 0  802C   00114   T4    DC    FIM+/C    INITIALIZE REGISTER
1061 0  00F0   00115         DC    /F0
1062 0  807D   00116   CIRC  DC    ISZ+/D    DELAY LOOP
1063 0  1062   00117         DC    CIRC
1064 0  8011   00118         DC    JCN+TZ    TEST FOR SHUTDOWN
1065 0  10E7   00119         DC    DWN3
1066 0  807C   00120         DC    ISZ+/C
1067 0  1062   00121         DC    CIRC
1068 0  80D2   00122         DC    LDM+2     GENERATE CP TO ADVANCE SCAN
1069 0  8050   00123         DC    JMS       TO NEXT DIGIT
106A 0  149E   00124         DC    CP
106B 0  807F   00125         DC    ISZ+/F    LOOK FOR END OF SCAN
106C 0  1030   00126         DC    STRT
106D 0  80F1   00127         DC    CLC
106E 0  80D7   00128         DC    LDM+7     PROCESS KEY ON 'COUNT' WORD = 0111
106F 0  8092   00129         DC    SUB+2
1070 0  801C   00130         DC    JCN+AN    CHECK TO SEE IF PROPER 'COUNT' WORD
1071 0  1099   00131         DC    T5        IF NOT 0111, GO BACK TO SCAN
1072 0  80F1   00132         DC    CLC
1073 0  80DA   00133         DC    LDM+/A    PLACE TABLE
1074 0  8084   00134         DC    ADD+4     SET UP FIN
               00135   *ADD CONTENTS OF R4 (2-5)
1075 0  8080   00136         DC    XCH+0
1076 0  80A5   00137         DC    LD+5      6-F
1077 0  8081   00138         DC    XCH+1     0X SET UP WITH ADDRESS
               00139   *
1078 0  8036   00140         DC    FIN+6
1079 0  802A   00141         DC    FIM+/A    ADDRESS CONTAINING BATCH
107A 0  008E   00142         DC    /8E       INDICATORS
107B 0  802B   00143         DC    SRC+/A
107C 0  80E9   00144         DC    RDM
107D 0  80F1   00145         DC    CLC       ISOLATE BATCH INDICATORS
107E 0  80F6   00146         DC    RAR
107F 0  80F1   00147         DC    CLC
1080 0  80F6   00148         DC    RAR
               00149   *READ TO SEE IF BATCH DISPLAYED
               00150   *
1081 0  80E4   00151         DC    WRO       (8) STORE
1082 0  802A   00152         DC    FIM+/A    CLLMP CLEAR LAMP DISPLAY AREA
1083 0  008B   00153         DC    /8B
1084 0  8050   00154         DC    JMS
1085 0  1260   00155         DC    CLEER
1086 0  80FA   00156         DC    STC       TEMPORARY CARD CHANGE SUBROUTINES
1087 0  8050   00157         DC    JMS       JUMP TO FUNCTION REPRESENTED BY KEY
1088 0  12C1   00158         DC    FCTN
1089 0  802A   00159         DC    FIM+/A    SELECT STATUS CHARACTER
108A 0  0080   00160         DC    /80
108B 0  802B   00161         DC    SRC+/A
108C 0  80E4   00162         DC    WRO       (B) ACCUMULATOR CONTENTS UPON RETURN
               00163   *                   FROM FCTN STORED HERE
108D 0  8050   00164         DC    JMS       COMPARE METER SETTING REGISTER WITH
108E 0  109B   00165         DC    CMPAR     DESCENDING REGISTER
108F 0  802A   00166         DC    FIM+/A    SELECT OUTPUT WORD
1090 0  008C   00167         DC    /8C       LOW POSTAGE, NO POSTAGE
1091 0  802B   00168         DC    SRC+/A
1092 0  80F1   00169         DC    CLC
```

-continued

```
1093 0  80EB         DC     ADM       WRITE LOW POSTAGE, NO POSTAGE IN
1094 0  80E0         DC     WRM       DISPLAY LAMP REGISTER
1095 0  8050         DC     JMS
1096 0  14A3         DC     CHCK
1097 0  8050         DC     JMS
1098 0  110A         DC     LDLMP
1099 0  8040   T5    DC     JUN       RETURN TO SCAN
109A 0  101D         DC     SCAN
               *SUBROUTINE COMPARE  METER SETTING VS DESC. REG 08 JUNE 1973
               *REGISTERS 8X,AX,EX USED BY ROUTINE
109B 0  8028   CMPAR DC     FIM+8     METER SETTING REGISTER
109C 0  003C         DC     /3C
109D 0  802A         DC     FIM+/A    INITIAL LOCATION OF DESCENDING REG.
109E 0  0000         DC     /00
109F 0  802E         DC     FIM+/E    COUNTING LOOPS
10A0 0  000E         DC     /0E
10A1 0  80FA         DC     STC
               *
10A2 0  80F9   C1    DC     TCS       SUBTRACTION LOOP TO COMPARE MSR WITH
10A3 0  8029         DC     SRC+8     DESCENDING REGISTER
10A4 0  80E8         DC     SBM
10A5 0  80F1         DC     CLC
10A6 0  802B         DC     SRC+/A
10A7 0  80EB         DC     ADM
10A8 0  80FB         DC     DAA
10A9 0  806B         DC     INC+/B
10AA 0  8079         DC     ISZ+9
10AB 0  10A2         DC     C1
               *BASIC SUBTRACTION LOOP
               *
10AC 0  80F9   C2    DC     TCS
10AD 0  802B         DC     SRC+/A
10AE 0  80EB         DC     ADM
10AF 0  80FB         DC     DAA       PROCESS CARRY
10B0 0  80E9         DC     RDM
10B1 0  8014         DC     JCN+AZ
10B2 0  10B4         DC     C3
10B3 0  806E         DC     INC+/E    CHECK FOR MORE THAN $100
               *E NOT ZERO, DESC. REG. GREATER THAN OR = $100.00
10B4 0  806B   C3    DC     INC+/B
10B5 0  807F         DC     ISZ+/F
10B6 0  10AC         DC     C2
10B7 0  80AE         DC     LD+/E
10B8 0  8014         DC     JCN+AZ
10B9 0  10BB         DC     C4
10BA 0  80C0         DC     BBL+0     GREATER THAN $100
10BB 0  801A   C4    DC     JCN+CZ
10BC 0  10F8         DC     C5        C5    BBL+3
10BD 0  80C2         DC     BBL+2     LESS THAN $100
               *SUBROUTINE FETCH                               08 JUNE 1973
               *REGISTERS 0X,8X,AX,CX,EX ARE USED
               *ROUTINE INITIALIZES REGISTERS 8X,AX,CX,EX
               *8X  INITIAL ADDRESS OF 'NUMBER METER SET TO' REGISTER
               *AX  INITIAL ADDRESSES OF VARIOUS REGISTERS
               *CX  WORD ADDRESS FOR LOAD LAMP
               *E WORD FOR LOAD LAMP, F COUNTER FOR LOOP IN ADD SUBROUTINE
10BE 0  80B1   FETCH DC     XCH+1     ACCUMULATOR CARRIES ADDRESS (0-6)
10BF 0  80DD         DC     LDM+/D
10C0 0  80B0         DC     XCH+0     0X TO DX
10C1 0  803A         DC     FIN+/A    AX INITIALIZED
10C2 0  8060         DC     INC+0     0X TO EX
10C3 0  803C         DC     FIN+/C    CX INITIALIZED
10C4 0  8060         DC     INC+0     0X TO FX
10C5 0  803E         DC     FIN+/E    EX INITIALIZED
10C6 0  8028         DC     FIM+8     8X INITIALIZED
10C7 0  003C         DC     /3C
10C8 0  80C0         DC     BBL+0
               *SUBROUTINE LOOK-UP TABLE                       08 JUNE 1973
10C9                 ORG    /10C9
10C9 0  1276         DC     TT1       T1   ADP                        C9
10CA 0  1223         DC     COUNT     PIECE COUNT                     CA
10CB 0  1201         DC     ONE       NUMBER 1                        CB
10CC 0  1202         DC     TWO       NUMBER 2                        CC
10CD 0  1203         DC     THREE     NUMBER 3                        CD
10CE 0  1226         DC     CNTRL     CONTROL SUM                     CE
10CF 0  0000         DC     /00                                       CF
               *
```

-continued

```
10D0 0  0000          DC    /00                                          D0
10D1 0  002A          DC    /2A     BATCH COUNT                          D1
10D2 0  001A          DC    /1A     BATCH SUM                            D2
10D3 0  0010          DC    /10     PIECE COUNT                          D3
10D4 0  0000          DC    /00     DESCENDING REGISTER                  D4
10D5 0  0006          DC    /06     ASCENDING REGISTER                   D5
10D6 0  0020          DC    /20     CONTROL SUM                          D6
                *INITIAL ADDRESSES OF REGISTERS     AX
                *
10D7 0  0000          DC    /00                                          D7
10D8 0  0000          DC    /00                                          D8
10D9 0  1273          DC    TT2     T2   SUBP                            D9
10DA 0  1222          DC    BSUM    BATCH SUM                            DA
10DB 0  1204          DC    FOUR    NUMBER 4                             DB
10DC 0  1205          DC    FIVE    NUMBER 5                             DC
10DD 0  1206          DC    SIX     NUMBER 6                             DD
10DE 0  1225          DC    ASC     ASCENDING REGISTER                   DE
10DF 0  0000          DC    /00                                          DF
                *
10E0 0  0000          DC    /00                                          E0
10E1 0  008E          DC    /8E     BATCH COUNT                          E1
10E2 0  008E          DC    /8E     BATCH SUM                            E2
10E3 0  008F          DC    /8F     PIECE COUNT                          E3
10E4 0  008F          DC    /8F     DESCENDING REGISTER                  E4
10E5 0  008F          DC    /8F     ASCENDING REGISTER                   E5
10E6 0  008E          DC    /8E     CONTROL SUM                          E6
                *SELECT WORD FOR LOAD LAMP AREA   CX
                *
10E7 0  8040    DWN3  DC    JUN                                          E7
10E8 0  115A          DC    DOWN                                         E8
10E9 0  1297          DC    POST    PHOTOCELL                            E9
10EA 0  1221          DC    BCNT    BATCH COUNT                          EA
10EB 0  1207          DC    SEVEN   NUMBER 7                             EB
10EC 0  1208          DC    EIGHT   NUMBER 8                             EC
10ED 0  1209          DC    NINE    NUMBER 9                             ED
10EE 0  1224          DC    DESC    DESCENDING REGISTER                  EE
10EF 0  0000          DC    /00                                          EF
                *
10F0 0  0000          DC    /00                                          F0
10F1 0  004C          DC    /4C     BATCH COUNT                          F1
10F2 0  008A          DC    /8A     BATCH SUM                            F2
10F3 0  0029          DC    /29     PIECE COUNT                          F3
10F4 0  004A          DC    /4A     DESCENDING REGISTER                  F4
10F5 0  0086          DC    /86     ASCENDING REGISTER                   F5
10F6 0  0026          DC    /26     CONTROL SUM                          F6
                *WORD FOR LDLAMP, COUNTER   E,F
                *
10F7 0  0000          DC    /00                                          F7
10F8 0  80C3    C5    DC    BBL+3                                        F8
10F9 0  0000          DC    /00                                          F9
10FA 0  123D          DC    CLEAR   CLEAR                                FA
10FB 0  1266          DC    UNLCK   $UNLOCK                              FB
10FC 0  1200          DC    ZERO    NUMBER 0                             FC
10FD 0  0000          DC    /00                                          FD
10FE 0  127B          DC    PLUS    +=                                   FE
10FF 0  12C5          DC    SET     SET                                  FF
                *SUBROUTINE                                    08 JUNE 1973
1100                  ORG   /1100
                ***********************************************************
                * ROM =1 **************************************************
                ***********************************************************
                *SUBROUTINE METER ENABLE                       08 JUNE 1973
                *REGISTERS AX USED
1100 0  8050    ENBLE DC    JMS     COMPARE WITH REGISTER CONTENTS
1101 0  109B          DC    CMPAR   METER SETTING VS DESC. REG.
1102 0  801A          DC    JCN+CZ
1103 0  1109          DC    Z11     JUMP OUT IF TOO LARGE C=0
1104 0  80D4          DC    LDM+4
1105 0  802A          DC    FIM+/A  IF YES, LOAD BIT TO ENABLE METER
1106 0  008D          DC    /8D     LOCATION IN OUTPUT WORD
1107 0  802B          DC    SRC+/A
1108 0  80E0          DC    WRM
1109 0  80C0    Z11   DC    BBL+0
                *SUBROUTINE LOAD LAMPS                         08 JUNE 1973
                *REGISTERS AX,CX,F USED
110A 0  802C    LDLMP DC    FIM+/C  FIRST ADDRESS IN LAMP STORAGE
110B 0  008B          DC    /8B     LOCATION
```

-continued

```
1100 0  802D   00324  RTN   DC   SRC+/C    SET UP INITIAL ADDRESS
110D 0  80E9   00325        DC   RDM       READ WORD
110E 0  80BF   00326        DC   XCH+/F    TEMP. STORE
110F 0  8050   00327        DC   JMS
1110 0  1114   00328        DC   OUTPT
1111 0  807D   00329        DC   ISZ+/D
1112 0  110C   00330        DC   RTN
1113 0  80C0   00331        DC   BBL+0
1114 0  802A   00332  OUTPT DC   FIM+/A    SET UP COUNTING LOOP
1115 0  000C   00333        DC   /0C
1116 0  80BF   00334  OUT   DC   XCH+/F    RECALL WORD
1117 0  80F6   00335        DC   RAR       PUT RIGHT BIT IN CARRY
1118 0  80BF   00336        DC   XCH+/F    STORE REST OF WORD
1119 0  80D2   00337        DC   LDM+2     WRITE IN CP
111A 0  80F5   00338        DC   RAL
111B 0  8050   00339        DC   JMS       JUMP TO CLOCK PULSE
111C 0  149E   00340        DC   CP
111D 0  807B   00341        DC   ISZ+/B
111E 0  1116   00342        DC   OUT
111F 0  80C0   00343        DC   BBL+0
               00344  *SUBROUTINE ADD SUBROUTINES                    08 JUNE 1973
               00345  *REGISTERS 8X,AX,F USED
1120 0  8029   00346  ADD1  DC   SRC+8     INITIAL ADDRESS OF METER REGISTER
1121 0  80E9   00347        DC   RDM
1122 0  806F   00348  ADD1X DC   INC+/F    INCREMENT COUNTER
1123 0  802B   00349  ADD2  DC   SRC+/A    SELECT REGISTER ADDRESS
1124 0  80EB   00350        DC   ADM       ADD
1125 0  80FB   00351        DC   DAA
1126 0  80E0   00352        DC   WRM       WRITE
1127 0  806B   00353        DC   INC+/B    INCREMENT REGISTER ADDRESS
1128 0  80C0   00354        DC   BBL+0
1129 0  80F1   00355  ADDD  DC   CLC
112A 0  8050   00356  ADDY  DC   JMS
112B 0  1120   00357        DC   ADD1
112C 0  8079   00358        DC   ISZ+9     INCREMENT ADDRESS OF METER REGISTER
112D 0  112A   00359        DC   ADDY      TERMINATE LOOP WHEN COMPLETED
112E 0  8050   00360  ADDX  DC   JMS
112F 0  1123   00361        DC   ADD2
1130 0  807F   00362        DC   ISZ+/F    INCREMENT COUNTER, TERMINATE LOOP
1131 0  112E   00363        DC   ADDX      WHEN FINISHED
1132 0  80C0   00364        DC   BBL+0
               00365  *SUBROUTINE ERROR                              08 JUNE 1973
               00366  *REGISTERS AX USED
1133 0  802A   00367  ERROR DC   FIM+/A    SELECT LOCATION IN DISPLAY BUFFER
1134 0  00BF   00368        DC   /BF
1135 0  802B   00369        DC   SRC+/A
1136 0  80E0   00370        DC   WRM       WRITE IN ERROR MESSAGE
1137 0  80C0   00371        DC   BBL+0
               00372  *SUBROUTINE CHECK (USED IN SET)                08 JUNE 1973
               00373  *REGISTERS AX,C USED
               00374  *CHECKS TO SEE IF CERTAIN LOCATIONS ARE NON-ZERO.  IF
               00375  *NON-ZERO, CARRY IS SET
               00376  *REGISTERS SET UP BEFORE SUBROUTINE CALLED
1138 0  80F1   00377  CHECK DC   CLC
1139 0  802B   00378  CK1   DC   SRC+/A
113A 0  80E9   00379        DC   RDM
113B 0  8014   00380        DC   JCN+AZ
113C 0  113E   00381        DC   CK2
113D 0  80FA   00382        DC   STC
113E 0  806B   00383  CK2   DC   INC+/B
113F 0  807C   00384        DC   ISZ+/C
1140 0  1139   00385        DC   CK1
1141 0  80C0   00386        DC   BBL+0
               00387  *SUBROUTINE INITIALIZE                         08 JUNE 1973
               00388  *REGISTERS 0X,2X,4X,6X ARE USED
1142 0  8020   00389  INRAM DC   FIM+0     SELECT PORT  RAM1
1143 0  0040   00390        DC   /40       BCD OUTPUT
1144 0  8022   00391        DC   FIM+2     SELECT PORT  RAM 2
1145 0  0080   00392        DC   /80       CP
1146 0  8024   00393        DC   FIM+4     INTEL RAM WHERE CONTENTS DUMPED
1147 0  0000   00394        DC   /00       ADDRESSING
1148 0  8026   00395        DC   FIM+6     SELECT PORT  ROM2
1149 0  0020   00396        DC   /20       BCD INPUT
114A 0  8027   00397  LD1   DC   SRC+6
114B 0  80EA   00398        DC   RDR       ROM2  OUTPUT OF SHIFT REGISTER
114C 0  8025   00399        DC   SRC+4     MEMORY
114D 0  80E0   00400        DC   WRM       PUT IN MEMORY
```

-continued

```
114E 0  8021   00401        DC    SRC+0
114F 0  80E1   00402        DC    WMP       RAM1  WRITE BACK IN S/R
1150 0  8023   00403        DC    SRC+2
1151 0  80D8   00404        DC    LDM+8     GENERATE CLOCK PULSE
1152 0  80E1   00405        DC    WMP       RAM2
1153 0  80D0   00406        DC    LDM+0
1154 0  80E1   00407        DC    WMP       RAM2
1155 0  8075   00408        DC    ISZ+5     INCREMENT RAM ADDRESS
1156 0  114A   00409        DC    LD1
1157 0  8074   00410        DC    ISZ+4     INCREMENT RAM ADDRESS
1158 0  114A   00411        DC    LD1
1159 0  80C0   00412        DC    BBL+0
               00413  *SUBROUTINE SHUTDOWN                    08 JUNE 1973
               00414  *REGISTERS OX,2X,4X USED
115A 0  8020   00415  DOWN  DC    FIM+0     SELECT S/R INPUT
115B 0  0040   00416        DC    /40       BCD INPUT
115C 0  8022   00417        DC    FIM+2     SELECT PORT
115D 0  0088   00418        DC    /88       CP
115E 0  8024   00419        DC    FIM+4
115F 0  0000   00420        DC    /00       ADDRESSING, RAM
1160 0  8025   00421  DWN1  DC    SRC+4
1161 0  80E9   00422        DC    RDM       READ RAM
1162 0  8021   00423        DC    SRC+0
1163 0  80E1   00424        DC    WMP       RAM1  WRITE OUT TO S/R
1164 0  8023   00425        DC    SRC+2
1165 0  80D8   00426        DC    LDM+8     GENERATE CLOCK PULSE
1166 0  80E1   00427        DC    WMP       RAM2
1167 0  80D0   00428        DC    LDM+0
1168 0  80E1   00429        DC    WMP       RAM2
1169 0  8075   00430        DC    ISZ+5     INCREMENT RAM ADDRESS
116A 0  1160   00431        DC    DWN1
116B 0  8064   00432        DC    INC+4
116C 0  8073   00433        DC    ISZ+3
116D 0  1160   00434        DC    DWN1
116E 0  80D4   00435  DWN2  DC    LDM+4     TURN OFF MEMORY
116F 0  80E1   00436        DC    WMP       RAM2
1170 0  80D0   00437        DC    LDM+0
1171 0  80E1   00438        DC    WMP       RAM2
1172 0  8040   00439        DC    JUN       STAY IN LOOP UNTIL RESET OCCURS
1173 0  116E   00440        DC    DWN2
               00441  *SUBROUTINE HOME                        08 JUNE 1973
               00442  *REGISTERS OX,CX,EX USED
1174 0  802C   00443  HOME  DC    FIM+/C    SET UP ADDRESS OF OLD
1175 0  0030   00444        DC    /30       NUMBER LOCATON RAM ADDRESS
1176 0  80DC   00445        DC    LDM+/C    COUNT OF 4
1177 0  80B0   00446        DC    XCH+0
1178 0  8050   00447        DC    JMS       CLEAR PHOTOCELL S/R
1179 0  1189   00448        DC    CLR       FIRST BANK OF PHOTOCELLS ENABLED
117A 0  802D   00449  BLANK DC    SRC+/C    WRITE ZEROS IN ALL OLD
117B 0  80E0   00450        DC    WRM       NUMBER LOCATIONS
117C 0  806D   00451        DC    INC+/D
117D 0  8070   00452        DC    ISZ+0     LOCATIONS 30-33
117E 0  117A   00453        DC    BLANK
117F 0  802E   00454        DC    FIM+/E    WRITE ZEROS IN ALL STATUS
1180 0  00C0   00455        DC    /C0       CHARACTERS USED
1181 0  802F   00456        DC    SRC+/E
1182 0  80E4   00457        DC    WR0       (C)
1183 0  80E5   00458        DC    WR1       (C)
1184 0  8020   00459        DC    FIM+0
1185 0  0030   00460        DC    /30
1186 0  8021   00461        DC    SRC+0
1187 0  80E4   00462        DC    WR0       (3)
1188 0  80E5   00463        DC    WR1       (3)
1189 0  80E6   00464        DC    WR2       (3)
118A 0  80E7   00465        DC    WR3       (3)
118B 0  80EA   00466        DC    RDR       ROM3  CHECK EVERY STEP PHOTOCELL
118C 0  80F5   00467        DC    RAL       USING CARRY BIT
118D 0  8012   00468        DC    JCN+CN    IF CARRY IS ONE CONTINUE
118E 0  1198   00469        DC    HOME1     WITH PROGRAM
118F 0  80DF   00470        DC    LDM+/F    IF CARRY IS ZERO INSTRUCT
1190 0  80E4   00471        DC    WR0       (3) MOTOR TO TAKE ONE
1191 0  8050   00472        DC    JMS       HALF STEP
1192 0  11C7   00473        DC    STEP
1193 0  8014   00474        DC    JCN+AZ    IF NO ERROR FLAGGED CONT.
1194 0  1198   00475        DC    HOME1     WITH PROGRAM
1195 0  8050   00476  ERR1  DC    JMS       IF ERROR FLAGGED JUMP TO
1196 0  1133   00477        DC    ERROR     DISPLAY IT
```

-continued

```
1197 0   80C0     00478           DC     BBL+0
1198 0   80DC     00479    HOME1  DC     LDM+/C    FLAG BANK IN REGISTER D
1199 0   80BD     00480           DC     XCH+/D
119A 0   8050     00481    HOME4  DC     JMS       JUMP TO SET ROUTINE
119B 0   1300     00482           DC     STPB      SET TO PROPER BANK
119C 0   8014     00483           DC     JCN+AZ    IF NO ERROR FLAGGED CONT.
119D 0   11A0     00484           DC     HOME3     WITH PROGRAM
119E 0   8040     00485           DC     JUN       IF NO ERROR FLAGGED, JUMP TO
119F 0   1195     00486           DC     ERR1      DISPLAY IT
11A0 0   8050     00487    HOME3  DC     JMS       CHECK FOR BANK AT ZERO
11A1 0   1353     00488           DC     ZEROB
11A2 0   8050     00489           DC     JMS       CLEAR PHOTOCELL S/R
11A3 0   11B9     00490           DC     CLR
11A4 0   8012     00491           DC     JCN+CN    IF BANK IS ZERO CONT. WITH
11A5 0   11AC     00492           DC     HOME2     PROGRAM
11A6 0   8050     00493           DC     JMS       IF BANK IS NOT ZERO STEP
11A7 0   11C7     00494           DC     STEP      TO ZERO
11A8 0   8014     00495           DC     JCN+AZ    IF NO ERROR FLAGGED CONT.
11A9 0   11A0     00496           DC     HOME3     WITH PROGRAM
11AA 0   8040     00497           DC     JUN       IF ERROR FLAGGED, JUMP TO
11AB 0   1195     00498           DC     ERR1      DISPLAY IT
11AC 0   8021     00499    HOME2  DC     SRC+0     CLEAR STATUS CHARACTERS
11AD 0   80E5     00500           DC     WR1       (3)
11AE 0   80E6     00501           DC     WR2       (3)
11AF 0   80E7     00502           DC     WR3       (3)
11B0 0   807D     00503           DC     ISZ+/D    LOOP TO ZERO ALL FOUR
11B1 0   119A     00504           DC     HOME4     BANKS
11B2 0   80EA     00505           DC     RDR       ROM3  CHECK FIFTH POSITION
11B3 0   80F5     00506           DC     RAL       PHOTOCELL
11B4 0   80F5     00507           DC     RAL
11B5 0   80DE     00508           DC     LDM+/E
11B6 0   801A     00509           DC     JCN+CZ    IF CARRY IS ZERO FLAG
11B7 0   1195     00510           DC     ERR1      ERROR
11B8 0   80C0     00511           DC     BBL+0     BRANCH BACK WITH NO ERROR
                  00512    *SUBROUTINE CLEAR S/R                             08 JUNE 1973
                  00513    *REGISTERS 6X USED
                  00514    *RAM 2 S/R OUTPUT
11B9 0   8026     00515    CLR    DC     FIM+6     CLOCK IN TEN ZEROS
11BA 0   0086     00516           DC     /86       PHOTOCELL S/R TO
11BB 0   8027     00517           DC     SRC+6     CLEAR ALL OUTPUTS
11BC 0   80D1     00518    CL1    DC     LDM+1     GENERATE CLOCK PULSE
11BD 0   80E1     00519           DC     WMP       RAM2
11BE 0   80D0     00520           DC     LDM+0
11BF 0   80E1     00521           DC     WMP       RAM2
11C0 0   8077     00522           DC     ISZ+7
11C1 0   11BC     00523           DC     CL1
11C2 0   80D3     00524           DC     LDM+3     CLOCK ONE TO FIRST OUTPUT
11C3 0   80E1     00525           DC     WMP       RAM2   OF PHOTOCELL S/R
11C4 0   80D0     00526           DC     LDM+0
11C5 0   80E1     00527           DC     WMP       RAM2
11C6 0   80C0     00528           DC     BBL+0
                  00529    *SUBROUTINE STEP                                  08 JUNE 1973
                  00530    *REGISTERS 0X,8X,EX USED
11C7 0   8020     00531    STEP   DC     FIM+0     SET UP ADDRESS FOR STEP              *&
11C8 0   00FC     00532           DC     /FC       SEQUENCE
11C9 0   802F     00533           DC     SRC+/E    SELECT MOTOR OUTPUT PORT
11CA 0   8038     00534    STEP6  DC     FIN+8
11CB 0   80EC     00535           DC     RDO       (C) CHECK DIRECTION
11CC 0   801C     00536           DC     JCN+AN    LOAD APPROPRIATE PATTERM
11CD 0   11D1     00537           DC     STEP5     FOR DIRECTION
11CE 0   80A8     00538           DC     LD+8
11CF 0   8040     00539           DC     JUN
11D0 0   11D2     00540           DC     STEP2
11D1 0   80A9     00541    STEP5  DC     LD+9
11D2 0   80E1     00542    STEP2  DC     WMP       RAM3  WRITE PATTERN TO MOTOR
11D3 0   8028     00543           DC     FIM+8     WAIT FOR MOTOR TO RESPOND
11D4 0   0008     00544           DC     /08
11D5 0   8078     00545    STEP3  DC     ISZ+8
11D6 0   11D5     00546           DC     STEP3
                  00547    *INSERT TEST FOR SHUTDOWN HERE
11D7 0   8079     00548           DC     ISZ+9
11D8 0   11D5     00549           DC     STEP3
11D9 0   8071     00550           DC     ISZ+1     LOOP TO STEP 4 TIMES
11DA 0   11CA     00551           DC     STEP6
11DB 0   8020     00552           DC     FIM+0
11DC 0   0030     00553           DC     /30       RAM 0
11DD 0   8021     00554           DC     SRC+0
```

-continued

```
11DE 0  80EA     00555         DC      RDR        ROM3  READ EVERY STEP PHOTOCELL
11DF 0  80F5     00556         DC      RAL
11E0 0  80EC     00557         DC      RDO        (3) CHECK FOR HALF STEP OR
11E1 0  80F4     00558         DC      CMA        FULL STEP
11E2 0  80E4     00559         DC      WRO        (3)
11E3 0  8014     00560         DC      JCN+AZ
11E4 0  11E8     00561         DC      STEP4
11E5 0  801A     00562         DC      JCN+CZ
11E6 0  11C7     00563         DC      STEP       HALF STEP
11E7 0  80CC     00564   ERR4  DC      BBL+/C     IF MOTOR DID NOT STEP FLAG
11E8 0  801A     00565   STEP4 DC      JCN+CZ     ERROR
11E9 0  11E7     00566         DC      ERR4
11EA 0  80C0     00567         DC      BBL+0
                 00568   *** TABLE  ********************
11EB             00569         ORG     /11FC
11FC 0  00C3     00570         DC      /C3
11FD 0  0066     00571         DC      /66        BIT PATTERNS FOR MOTOR STEPS
11FE 0  003C     00572         DC      /3C
11FF 0  0099     00573         DC      /99
                 00574   *SUBROUTINE                              08 JUNE 1973
1200             00575         ORG     /1200
                 00576   ***********************************************************
                 00577   * ROM =2 **************************************************
                 00578   ***********************************************************
                 00579   *** SUBROUTINES TO PERFORM KYBD FNCTNS ********************
                 00580   *SUBROUTINE NUMERICAL KEYS               08 JUNE 1973
                 00581   *REGISTERS 7,AX,C USED
                 00582   *ROUTINE MUST BE PROPERLY LOCATED
                 00583   *INITIAL ADDRESS OF FORM XO
1200 0  8000     00584   ZERO  DC      NOP        0
1201 0  8000     00585   ONE   DC      NOP        1
1202 0  8000     00586   TWO   DC      NOP        2
1203 0  8000     00587   THREE DC      NOP        3
1204 0  8000     00588   FOUR  DC      NOP        4
1205 0  8000     00589   FIVE  DC      NOP        5
1206 0  8000     00590   SIX   DC      NOP        6
1207 0  8000     00591   SEVEN DC      NOP        7
1208 0  8000     00592   EIGHT DC      NOP        8
1209 0  802A     00593   NINE  DC      FIM+/A     9  MEMORY LOCATION FOR NEW DIGIT
120A 0  00B6     00594         DC      /B6
120B 0  802B     00595         DC      SRC+/A
120C 0  80A7     00596         DC      LD+7
120D 0  80E0     00597         DC      WRM        WRITE DIGIT VALUE
120E 0  80EC     00598         DC      RDO        (B)
120F 0  80F6     00599         DC      RAR        CHECK TO SEE IF NUMBER ENTERED
1210 0  8012     00600         DC      JCN+CN     PREVIOUSLY
1211 0  1214     00601         DC      Z16
1212 0  8050     00602         DC      JMS
1213 0  125E     00603         DC      CLDSP
1214 0  802A     00604   Z16   DC      FIM+/A     ADVAN ROUTINE
1215 0  00B6     00605         DC      /B6        MOVES DIGITS THROUGH DISPLAY
1216 0  802B     00606   AD1   DC      SRC+/A
1217 0  80E9     00607         DC      RDM
1218 0  80BC     00608         DC      XCH+/C
1219 0  80E0     00609         DC      WRM
121A 0  807B     00610         DC      ISZ+/B
121B 0  1216     00611         DC      AD1
121C 0  80F0     00612         DC      CLB        SET $UNLOCK TO ZERO
121D 0  80E6     00613         DC      WR2        (B)
121E 0  80C1     00614         DC      BBL+1
                 00615   *SUBROUTINE                              08 JUNE 1973
                 00616   *** RETURN FOR ADDITION                  ********************
121F 0  80C2     00617   PLS   DC      BBL+2
                 00618   *SUBROUTINE DISPLAY REGISTER             08 JUNE 1973
                 00619   *REGISTERS 7,AX,CX,EX USED
                 00620   *ROUTINE MUST BE PROPERLY LOCATED
                 00621   *INITIAL ADDRESS MUST BE OF FORM XO
1220 0  8000     00622         DC      NOP
1221 0  8000     00623   BCNT  DC      NOP        BATCH COUNT
1222 0  8000     00624   BSUM  DC      NOP        BATCH SUM
1223 0  8000     00625   COUNT DC      NOP        PIECE COUNT
1224 0  8000     00626   DESC  DC      NOP        DESCENDING REGISTER
1225 0  8000     00627   ASC   DC      NOP        ASCENDING REGISTER
1226 0  8050     00628   CNTRL DC      JMS        CONTROL SUM
1227 0  125E     00629   ZZZ   DC      CLDSP      CLEAR DISPLAY
1228 0  802A     00630         DC      FIM+/A     CLRRR
1229 0  0077     00631         DC      /77        CLEAR ADD REGISTER
122A 0  8050     00632         DC      JMS
122B 0  1260     00633         DC      CLEER
```

-continued

```
122C 0  80A7    00634          DC      LD+7
122D 0  8050    00635          DC      JMS       INITIALIZE REGISTERS
122E 0  10BE    00636          DC      FETCH
122F 0  802D    00637          DC      SRC+/C    SELECT WORD FOR LDLMP
1230 0  80AE    00638          DC      LD+/E
1231 0  80E0    00639          DC      WRM
                00640   *LOAD UP DISPLAY AREA
1232 0  802C    00641   TRANS  DC      FIM+/C    INITIALIZE DISPLAY ADDRESS
1233 0  00B7    00642          DC      /B7
1234 0  802B    00643   TRANZ  DC      SRC+/A    SELECT RAM MEMORY
1235 0  80E9    00644          DC      RDM       READ
1236 0  802D    00645          DC      SRC+/C    DISPLAY
1237 0  80E0    00646          DC      WRM       WRITE
1238 0  806B    00647          DC      INC+/B
1239 0  806D    00648          DC      INC+/D
123A 0  807F    00649          DC      ISZ+/F
123B 0  1234    00650          DC      TRANZ
123C 0  80C0    00651          DC      BBL+0
                00652   *SUBROUTINE CLEAR                              08 JUNE 1973
                00653   *REGISTERS AX,EX USED
123D 0  8050    00654   CLEAR  DC      JMS
123E 0  125E    00655          DC      CLDSP
123F 0  80E6    00656          DC      WR2       (B) SET $UNLOCK TO ZERO
1240 0  80EC    00657          DC      RD0       (B) CHECK FOR PREVIOUS CLEAR
1241 0  80F5    00658          DC      RAL       CLEAR IS BIT 8
1242 0  801A    00659          DC      JCN+CZ
1243 0  1248    00660          DC      Z23
1244 0  802A    00661   ZZC1   DC      FIM+/A    CLRRR
1245 0  0077    00662          DC      /77       CLEAR ADD REGISTER
1246 0  8050    00663          DC      JMS
1247 0  1260    00664          DC      CLEER
1248 0  802A    00665   Z23    DC      FIM+/A    RECALL CONTENTS OF ADDITION REGISTER
1249 0  0077    00666          DC      /77
124A 0  802E    00667          DC      FIM+/E
124B 0  0007    00668          DC      /07
124C 0  8050    00669          DC      JMS
124D 0  1232    00670          DC      TRANS
124E 0  802A    00671          DC      FIM+/A    CLLMP
124F 0  008B    00672          DC      /8B       CLEAR LAMP AREA
1250 0  8050    00673          DC      JMS
1251 0  1260    00674          DC      CLEER
1252 0  80EC    00675          DC      RD0       (B) READ BATCH INDICATOR
1253 0  8014    00676          DC      JCN+AZ
1254 0  125D    00677          DC      ZZC2
1255 0  802A    00678          DC      FIM+/A    CLEAR BATCH
1256 0  001A    00679          DC      /1A
1257 0  8050    00680          DC      JMS
1258 0  1260    00681          DC      CLEER
1259 0  802A    00682          DC      FIM+/A    CLEAR BATCH
125A 0  002A    00683          DC      /2A
125B 0  8050    00684          DC      JMS
125C 0  1260    00685          DC      CLEER
125D 0  80C8    00686   ZZC2   DC      BBL+8
125E 0  802A    00687   CLDSP  DC      FIM+/A    CLEAR DISPLAY
125F 0  00B7    00688          DC      /B7
1260 0  80D0    00689   CLEER  DC      LDM+0
1261 0  802B    00690   Y      DC      SRC+/A
1262 0  80E0    00691          DC      WRM
1263 0  807B    00692          DC      ISZ+/B
1264 0  1261    00693          DC      Y
1265 0  80C0    00694          DC      BBL+0
                00695   *SUBROUTINE $UNLOCK                            08 JUNE 1973
                00696   *REGISTERS AX USED
1266 0  802A    00697   UNLCK  DC      FIM+/A    $UNLOCK
1267 0  00B0    00698          DC      /B0
1268 0  802B    00699          DC      SRC+/A
1269 0  80EC    00700          DC      RD0       (B) CHECK TO SEE IF NUMBER ENTERED
126A 0  80F1    00701          DC      CLC
126B 0  80F5    00702          DC      RAL
126C 0  80F1    00703          DC      CLC
126D 0  80F5    00704          DC      RAL
126E 0  8014    00705          DC      JCN+AZ    BIT 4
126F 0  1296    00706          DC      ZZB1      IF NOT,EXIT WITH ZERO IN ACCUMULATOR
1270 0  80DF    00707          DC      LDM+/F    OTHERWISE, SET $UNLOCK
1271 0  80E6    00708          DC      WR2       (B) EXIT WITH 1 IN ACCUMULATOR
1272 0  80C1    00709          DC      BBL+1
```

-continued

```
                00710   *SUBROUTINE NOT YET IMPLEMENTED                    08 JUNE 1973
1273 0  8040    00711   TT2    DC      JUN
1274 0  1450    00712          DC      SUBP
1275 0  8000    00713   KEY1   DC      NOP
1276 0  8000    00714   TT1    DC      NOP
1277 0  8040    00715          DC      JUN
1278 0  1400    00716          DC      ADP
1279 0  8000    00717   KEY2   DC      NOP
127A 0  80C0    00718   KEY3   DC      BBL+0
                00719   *SUBROUTINE ADDITION AND RECALL                    08 JUNE 1973
                00720   *REGISTERS AX,CX USED
127B 0  802A    00721   PLUS   DC      FIM+/A    DISPLAY ADDRESS
127C 0  00B7    00722          DC      /B7
127D 0  802C    00723          DC      FIM+/C    ADD REGISTER ADDRESS
127E 0  0077    00724          DC      /77
127F 0  802B    00725          DC      SRC+/A
1280 0  80F1    00726          DC      CLC
1281 0  80EC    00727          DC      RD0       (B) LOOK AT STATUS CHARACTER
1282 0  80F6    00728          DC      RAR
1283 0  801A    00729          DC      JCN+CZ    GO TO RECALL IF BIT 1 IS 0
1284 0  1296    00730          DC      ZZB1
1285 0  80F1    00731          DC      CLC
1286 0  802B    00732   Z200   DC      SRC+/A    ADD DISPLAY AND REGISTER
1287 0  80E9    00733          DC      RDM       AND WRITE BACK IN BOTH
1288 0  802D    00734          DC      SRC+/C
1289 0  80EB    00735          DC      ADM
128A 0  80FB    00736          DC      DAA
128B 0  80E0    00737          DC      WRM
128C 0  802B    00738          DC      SRC+/A
128D 0  80E0    00739          DC      WRM
128E 0  806B    00740          DC      INC+/B
128F 0  807D    00741          DC      ISZ+/D
1290 0  1286    00742          DC      Z200
1291 0  801A    00743          DC      JCN+CZ    CHECK FOR OVERFLOW
1292 0  121F    00744          DC      PLS       OVERFLOW EXIT WITH 2
1293 0  80DE    00745          DC      LDM+/E
1294 0  8050    00746          DC      JMS
1295 0  1133    00747          DC      ERROR
1296 0  80C0    00748   ZZB1   DC      BBL+0
                00749   *SUBROUTINE UPDATE METER REGISTERS                 08 JUNE 1973
                00750   *REGISTERS 8X,F USED
1297 0  80D5    00751   POST   DC      LDM+5     UPDTR  ASCENDING
1298 0  8050    00752          DC      JMS
1299 0  10BE    00753          DC      FETCH
129A 0  8050    00754          DC      JMS
129B 0  1129    00755          DC      ADDD
129C 0  80D2    00756          DC      LDM+2     BATCH SUM
129D 0  8050    00757          DC      JMS
129E 0  10BE    00758          DC      FETCH
129F 0  8050    00759          DC      JMS
12A0 0  1129    00760          DC      ADDD
12A1 0  80D3    00761          DC      LDM+3     PIECE COUNTER
12A2 0  8050    00762          DC      JMS
12A3 0  10BE    00763          DC      FETCH
12A4 0  80FA    00764          DC      STC
12A5 0  8050    00765          DC      JMS
12A6 0  112E    00766          DC      ADDX
12A7 0  80D1    00767          DC      LDM+1     BATCH COUNTER
12A8 0  8050    00768          DC      JMS
12A9 0  10BE    00769          DC      FETCH
12AA 0  80FA    00770          DC      STC
12AB 0  8050    00771          DC      JMS
12AC 0  112E    00772          DC      ADDX
12AD 0  80D4    00773          DC      LDM+4     DESCENDING REGISTER
12AE 0  8050    00774          DC      JMS
12AF 0  10BE    00775          DC      FETCH
12B0 0  80FA    00776          DC      STC
12B1 0  80F9    00777   RTN00  DC      TCS
12B2 0  8029    00778          DC      SRC+8
12B3 0  80E8    00779          DC      SBM
12B4 0  80F1    00780          DC      CLC
12B5 0  8050    00781          DC      JMS
12B6 0  1122    00782          DC      ADD1X
12B7 0  8079    00783          DC      ISZ+9
12B8 0  12B1    00784          DC      RTN00
12B9 0  80F9    00785   RTN01  DC      TCS
```

-continued

```
12BA 0  8050    00786          DC      JMS
12BB 0  1123    00787          DC      ADD2
12BC 0  807F    00788          DC      ISZ+/F
12BD 0  12B9    00789          DC      RTN01
12BE 0  8050    00790          DC      JMS
12BF 0  1100    00791          DC      ENBLE
12C0 0  80C0    00792          DC      BBL+0
                00793    *SUBROUTINE TO HANDLE KYBD INPUTS                 08 JUNE 1973
                00794    *REGISTERS 6X USED
12C1 0  801A    00795    FCTN  DC      JCN+CZ
12C2 0  12C4    00796          DC      FCTN1
12C3 0  8037    00797          DC      JIN+6
12C4 0  80C0    00798    FCTN1 DC      BBL+0
                00799    *SUBROUTINE SET                                   08 JUNE 1973
                00800    *REGISTERS AX,CX,EX USED
12C5 0  802A    00801    SET   DC      FIM+/A    SET METER
12C6 0  00B9    00802          DC      /B9       INITIAL ADDRESS IN DISPLAY  TO
12C7 0  80DE    00803          DC      LDM+/E    CHECK FOR $UNLOCK ETC.
12C8 0  80BC    00804          DC      XCH+/C    INITIALIZE REGISTERS FOR 'CHECK'
12C9 0  8050    00805          DC      JMS       PUTS CARRY BIT ON IF AMOUNT IS
12CA 0  1138    00806          DC      CHECK     GREATER THAN OR EQUAL TO $1.00
12CB 0  80F5    00807          DC      RAL
12CC 0  80BD    00808          DC      XCH+/D    STORE CARRY $10 - $99
12CD 0  80EC    00809          DC      RD0       (B) CHECK TO SEE IF NUMBER FROM KYBD
12CE 0  80F1    00810          DC      CLC       OR FROM PLUS  LOOK AT BITS 1 AND 2
12CF 0  80F5    00811          DC      RAL
12D0 0  80F1    00812          DC      CLC
12D1 0  80F5    00813          DC      RAL
12D2 0  8014    00814          DC      JCN+AZ
12D3 0  12DF    00815          DC      ZZE3
12D4 0  80DB    00816          DC      LDM+/B    INITIALIZE REGISTER
12D5 0  80BC    00817          DC      XCH+/C
12D6 0  8050    00818          DC      JMS       TURNS CARRY BIT ON IF MORE THAN
12D7 0  1138    00819          DC      CHECK     $100.00
12D8 0  80AD    00820          DC      LD+/D     RECOVER PREVIOUS CARRY
12D9 0  801A    00821          DC      JCN+CZ    CHECK FOR MORE THAN $100
12DA 0  12E9    00822          DC      ZZE1
12DB 0  80DE    00823          DC      LDM+/E    ERROR MESSAGE IF GREATER THAN OR
12DC 0  8050    00824          DC      JMS       EQUAL TO 100.00
12DD 0  1133    00825          DC      ERROR
12DE 0  80C0    00826          DC      BBL+0
12DF 0  8050    00827    ZZE3  DC      JMS       CLEAR DISPLAY
12E0 0  125E    00828          DC      CLDSP
12E1 0  802A    00829          DC      FIM+/A    METER SETTING REGISTER ADDRESS
12E2 0  003C    00830          DC      /3C
12E3 0  802E    00831          DC      FIM+/E    INITIALIZING COUNTER
12E4 0  000C    00832          DC      /0C
12E5 0  8050    00833          DC      JMS       TRANSFER METER SETTING REGISTER TO
12E6 0  1232    00834          DC      TRANS     DISPLAY
12E7 0  8040    00835          DC      JUN
12E8 0  12F0    00836          DC      ZZE5
12E9 0  8014    00837    ZZE1  DC      JCN+AZ    CHECK FOR MORE THAN $10
12EA 0  12EE    00838          DC      ZZE4
12EB 0  80EE    00839          DC      RD2       (B) $UNLOCK
12EC 0  8014    00840          DC      JCN+AZ
12ED 0  12F7    00841          DC      ZZE2
12EE 0  8040    00842    ZZE4  DC      JUN
12EF 0  137E    00843          DC      SETX
12F0 0  8050    00844    ZZE5  DC      JMS
12F1 0  1100    00845          DC      ENBLE
12F2 0  802A    00846          DC      FIM+/A    CLEAR ADD REGISTER
12F3 0  0077    00847          DC      /77
12F4 0  8050    00848          DC      JMS
12F5 0  1260    00849          DC      CLEER
12F6 0  80C0    00850          DC      BBL+0
12F7 0  80D4    00851    ZZE2  DC      LDM+4     SET UP ERROR LIGHT
12F8 0  802A    00852          DC      FIM+/A    $UNLOCK WARNING LAMP
12F9 0  008C    00853          DC      /8C
12FA 0  802B    00854          DC      SRC+/A
12FB 0  80E0    00855          DC      WRM
12FC 0  80C1    00856          DC      BBL+1
                00857    *SUBROUTINE                                       08 JUNE 1973
12FD            00858          ORG     /1300
                00859    *SUBROUTINE SET TO PROPER BANK                    08 JUNE 1973
                00860    *REGISTERS 0X,6X,AX,D,EX USED
1300 0  80DF    00861    STPB  DC      LDM+/F    CHECK REGISTER D TO SEE
```

```
1301 0  80F1   00862          DC    CLC       WHICH BANK IS SET
1302 0  8090   00863          DC    SUB+/D
1303 0  8014   00864          DC    JCN+AZ
1304 0  131B   00865          DC    CNTR1
1305 0  80F8   00866          DC    DAC
1306 0  8014   00867          DC    JCN+AZ
1307 0  1329   00868          DC    CNTR2
1308 0  80F8   00869          DC    DAC
1309 0  8014   00870          DC    JCN+AZ
130A 0  1339   00871          DC    CNTR3
130B 0  8050   00872          DC    JMS       SET TO BANK 4
130C 0  1377   00873          DC    CLK6      ENERGIZE BOTH SOLENOIDS
130D 0  8050   00874          DC    JMS
130E 0  1377   00875          DC    CLK6
130F 0  8050   00876          DC    JMS       WAIT FOR SOLENOIDS TO
1310 0  134A   00877          DC    WAIT      RESPOND
1311 0  80EA   00878          DC    RDR       ROM3  CHECK FOR CORRECT POSITION
1312 0  80F6   00879          DC    RAR       OF SOLENOIDS
1313 0  801A   00880          DC    JCN+CZ
1314 0  1349   00881          DC    ERR5
1315 0  80F6   00882          DC    RAR
1316 0  801A   00883          DC    JCN+CZ
1317 0  1349   00884          DC    ERR5
1318 0  80D1   00885          DC    LDM+1     FLAG BANK 4 IN STATUS
1319 0  80E5   00886          DC    WR1       (3)  CHARACTER
131A 0  80C0   00887          DC    BBL+0
131B 0  8050   00888   CNTR1  DC    JMS       SET TO BANK 1
131C 0  1374   00889          DC    CLK4
131D 0  8050   00890          DC    JMS
131E 0  1374   00891          DC    CLK4
131F 0  8050   00892          DC    JMS       WAIT FOR SOLENOIDS TO
1320 0  134A   00893          DC    WAIT      RESPOND
1321 0  80EA   00894          DC    RDR       ROM3  CHECK FOR CORRECT POSITION
1322 0  80F6   00895          DC    RAR       OF SOLENOIDS
1323 0  8012   00896          DC    JCN+CN
1324 0  1349   00897          DC    ERR5
1325 0  80F6   00898          DC    RAR
1326 0  8012   00899          DC    JCN+CN
1327 0  1349   00900          DC    ERR5
1328 0  80C0   00901          DC    BBL+0
1329 0  8050   00902   CNTR2  DC    JMS       SET TO BANK 2
132A 0  1374   00903          DC    CLK4
132B 0  8050   00904          DC    JMS
132C 0  1377   00905          DC    CLK6
132D 0  8050   00906          DC    JMS       WAIT FOR SOLENOIDS TO
132E 0  134A   00907          DC    WAIT      RESPOND
132F 0  80EA   00908          DC    RDR       ROM3  CHECK FOR CORRECT POSITION
1330 0  80F6   00909          DC    RAR       OF SOLENOIDS
1331 0  801A   00910          DC    JCN+CZ
1332 0  1349   00911          DC    ERR5
1333 0  80F6   00912          DC    RAR
1334 0  8012   00913          DC    JCN+CN
1335 0  1349   00914          DC    ERR5
1336 0  80D1   00915          DC    LDM+1     FLAG BANK 2 IN STATUS
1337 0  80E7   00916          DC    WR3       (3)  CHARACTER
1338 0  80C0   00917          DC    BBL+0
1339 0  8050   00918   CNTR3  DC    JMS       SET TO BANK 3
133A 0  1377   00919          DC    CLK6
133B 0  8050   00920          DC    JMS
133C 0  1374   00921          DC    CLK4
133D 0  8050   00922          DC    JMS       WAIT FOR SOLENOIDS TO
133E 0  134A   00923          DC    WAIT      RESPOND
133F 0  80EA   00924          DC    RDR       ROM3  CHECK FOR CORRECT POSITION
1340 0  80F6   00925          DC    RAR       OF SOLENOIDS
1341 0  8012   00926          DC    JCN+CN
1342 0  1349   00927          DC    ERR5
1343 0  80F6   00928          DC    RAR
1344 0  801A   00929          DC    JCN+CZ
1345 0  1349   00930          DC    ERR5
1346 0  80D1   00931          DC    LDM+1     FLAG BANK 3 IN STATUS
1347 0  80E6   00932          DC    WR2       (3)  CHARACTER
1348 0  80C0   00933          DC    BBL+0
1349 0  80CB   00934   ERR5   DC    BBL+/B    FLAG SOLENOID ERROR
134A 0  80D6   00935   WAIT   DC    LDM+6     50 MSEC WAIT FOR SOLENOIDS
134B 0  8077   00936   WAIT1  DC    ISZ+7     TO RESPOND
134C 0  134B   00937          DC    WAIT1
```

-continued

```
134D 0  8071          DC   ISZ+1
134E 0  134B          DC   WAIT1
134F 0  80F2          DC   IAC
1350 0  801C          DC   JCN+AN
1351 0  134B          DC   WAIT1
1352 0  80C0          DC   BBL+0
1353 0  80D1   ZERO8  DC   LDM+1     CLOCK ONE TO SECOND OUTPUT
1354 0  8027          DC   SRC+6     OF PHOTOCELL S/R
1355 0  80E1          DC   WMP       RAM2
1356 0  80D0          DC   LDM+0
1357 0  80E1          DC   WMP       RAM2
1358 0  8077   WFPC2  DC   ISZ+7     WAIT FOR PHOTOCELL TO
1359 0  1358          DC   WFPC2     RESPOND
135A 0  8077   WFPC3  DC   ISZ+7
135B 0  135A          DC   WFPC3
135C 0  8021          DC   SRC+0     CHECK FOR BANK 4 FLAG
135D 0  80ED          DC   RD1       (3)
135E 0  8014          DC   JCN+AZ
135F 0  1363          DC   Z1
1360 0  80EA          DC   RDR       ROM3  LOAD BANK 4 PHOTOCELL TO
1361 0  80F6          DC   RAR       CARRY
1362 0  80C0          DC   BBL+0
1363 0  80EE   Z1     DC   RD2       (3)  CHECK FOR BANK 3 FLAG
1364 0  8014          DC   JCN+AZ
1365 0  136A          DC   Z2
1366 0  80EA          DC   RDR       ROM3  LOAD BANK 3 PHOTOCELL TO
1367 0  80F6          DC   RAR       CARRY
1368 0  80F6          DC   RAR
1369 0  80C0          DC   BBL+0
136A 0  80EF   Z2     DC   RD3       (3)
136B 0  8014          DC   JCN+AZ    CHECK FOR BANK 2 FLAG
136C 0  1371          DC   Z3
136D 0  80EA          DC   RDR       ROM3  LOAD BANK 2 PHOTOCELL TO
136E 0  80F5          DC   RAL       CARRY
136F 0  80F5          DC   RAL
1370 0  80C0          DC   BBL+0
1371 0  80EA   Z3     DC   RDR       ROM3  LOAD BANK 1 PHOTOCELL TO
1372 0  80F5          DC   RAL       CARRY
1373 0  80C0          DC   BBL+0
1374 0  80D4   CLK4   DC   LDM+4     CLOCK ZERO TO SOLENOID S/R
1375 0  8040          DC   JUN
1376 0  1378          DC   CLK2
1377 0  80D6   CLK6   DC   LDM+6     CLOCK ONE TO SOLENOID S/R
1378 0  8027   CLK2   DC   SRC+6
1379 0  80E1          DC   WMP       RAM2
137A 0  80D0          DC   LDM+0
137B 0  80E1          DC   WMP       RAM2
137C 0  8021          DC   SRC+0
137D 0  80C0          DC   BBL+0
137E 0  802A   SETX   DC   FIM+/A    DISPLAY ADDRESS
137F 0  00B7          DC   /B7
1380 0  802E          DC   FIM+/E    METER SETTING AREA
1381 0  003C          DC   /3C
1382 0  802B   SET1   DC   SRC+/A
1383 0  80E9          DC   RDM       READ DISPLAY
1384 0  802F          DC   SRC+/E
1385 0  80E0          DC   WRM       PUT IN MSA
1386 0  806B          DC   INC+/B    INCREMENT ADDRESSES AND COUNTER
1387 0  807F          DC   ISZ+/F
1388 0  1382          DC   SET1
               *SUBROUTINE MAIN                              08 JUNE 1973
               *REGISTERS 0X,6X,AX,CX,EX USED
1389 0  802E   MAIN   DC   FIM+/E
138A 0  00C0          DC   /C0       SELECT OUTPUT PORT FOR MOTOR
138B 0  8026          DC   FIM+6     SELECT OUTPUT PORT FOR
138C 0  0080          DC   /80       SHIFT REGISTERS
138D 0  8020          DC   FIM+0     SELECT INPUT PORT FOR
138E 0  0030          DC   /30       PHOTOCELLS
138F 0  802A          DC   FIM+/A    SELECT ADDRESS FOR OLD
1390 0  003F          DC   /3F       AND NEW NUMBER
1391 0  802C          DC   FIM+/C
1392 0  003C          DC   /3C
1393 0  80BD   MAIN8  DC   XCH+/D
1394 0  80F4          DC   CMA
1395 0  80BD          DC   XCH+/D
1396 0  802D          DC   SRC+/C    COMPARE NEW NUMBER WITH
```

-continued

```
1397 0  80E9  01014        DC  RDM      OLD
1398 0  802B  01015        DC  SRC+/A
1399 0  80F1  01016        DC  CLC
139A 0  80E8  01017        DC  SBM
139B 0  801A  01018        DC  JCN+CZ   LOAD NUMBER OF STEPS TO
139C 0  13A5  01019        DC  MAIN3    REGISTER F AND
139D 0  8014  01020        DC  JCN+AZ   FLAG DIRECTION IN
139E 0  13EC  01021        DC  MAIN6    STATUS CHARACTER
139F 0  80F4  01022        DC  CMA
13A0 0  80F2  01023        DC  IAC
13A1 0  80BF  01024        DC  XCH+/F
13A2 0  80D0  01025        DC  LDM+0
13A3 0  8040  01026        DC  JUN
13A4 0  13A7  01027        DC  MAIN4
13A5 0  80BF  01028 MAIN3  DC  XCH+/F
13A6 0  80DF  01029        DC  LDM+/F
13A7 0  802F  01030 MAIN4  DC  SRC+/E
13A8 0  80E4  01031        DC  WRO      (C)
13A9 0  802B  01032        DC  SRC+/A   WRITE NEW NUMBER IN OLD
13AA 0  80E9  01033        DC  RDM      LOCATION
13AB 0  802D  01034        DC  SRC+/C
13AC 0  80E0  01035        DC  WRM
13AD 0  80BD  01036        DC  XCH+/D
13AE 0  80F4  01037        DC  CMA
13AF 0  80BD  01038        DC  XCH+/D
13B0 0  8050  01039        DC  JMS      SET TO PROPER BANK
13B1 0  1300  01040        DC  STPB
13B2 0  80BD  01041        DC  XCH+/D
13B3 0  80F4  01042        DC  CMA
13B4 0  80BD  01043        DC  XCH+/D
13B5 0  8014  01044        DC  JCN+AZ   IF NO ERROR FLAGGED CONT
13B6 0  13B8  01045        DC  MAIN2    WITH PROGRAM
13B7 0  8040  01046 ERR6   DC  JUN      IF ERROR FLAGGED JUMP TO
13B8 0  1133  01047        DC  ERROR    DISPLAY IT
13B9 0  8000  01048        DC  NOP
13BA 0  8000  01049        DC  NOP
13BB 0  8050  01050 MAIN2  DC  JMS      STEP MOTOR TO NEW NUMBER
13BC 0  11C7  01051        DC  STEP
13BD 0  801C  01052        DC  JCN+AN   IF ERROR FLAGGED JUMP TP
13BE 0  13B7  01053        DC  ERR6     DISPLAY IT
13BF 0  802F  01054        DC  SRC+/E   CHECK DIRECTION AND KEEP
13C0 0  80EC  01055        DC  RDO      (C)  TRACK AND CHECK FIRST
13C1 0  8014  01056        DC  JCN+AZ   POSITION PHOTOCELL
13C2 0  13D5  01057        DC  POS56    ACCORDINGLY
13C3 0  80ED  01058        DC  RD1      (C)  ROTATE LEFT THROUGH CARRY
13C4 0  80F1  01059        DC  CLC
13C5 0  801C  01060        DC  JCN+AN
13C6 0  13C8  01061        DC  POS55
13C7 0  80FA  01062        DC  STC
13C8 0  80F5  01063 POS55  DC  RAL
13C9 0  801C  01064        DC  JCN+AN
13CA 0  13DD  01065        DC  POS53
13CB 0  8021  01066 POS51  DC  SRC+0
13CC 0  80EA  01067        DC  RDR      ROM3
13CD 0  80F5  01068        DC  RAL
13CE 0  80F5  01069        DC  RAL
13CF 0  80DE  01070        DC  LDM+/E
13D0 0  801A  01071        DC  JCN+CZ   IF ERROR FLAGGED JUMP TO
13D1 0  13B7  01072        DC  ERR6     DISPLAY IT
13D2 0  80F0  01073        DC  CLB
13D3 0  8040  01074        DC  JUN
13D4 0  13DD  01075        DC  POS53
13D5 0  80ED  01076 POS56  DC  RD1      (C)  READ 5TH PHOTOCELL
13D6 0  80F1  01077        DC  CLC       ROTATE RIGHT THROUGH CARRY
13D7 0  801C  01078        DC  JCN+AN
13D8 0  13DA  01079        DC  POS58
13D9 0  80FA  01080        DC  STC
13DA 0  80F6  01081 POS58  DC  RAR
13DB 0  8014  01082        DC  JCN+AZ
13DC 0  13CB  01083        DC  POS51
13DD 0  802F  01084 POS53  DC  SRC+/E
13DE 0  80E5  01085        DC  WR1      (C)
13DF 0  807F  01086        DC  ISZ+/F   COUNT TO NEW NUMBER
13E0 0  13BB  01087        DC  MAIN2
13E1 0  802D  01088        DC  SRC+/C   IF NEW NUMBER IS ZERO
13E2 0  80E9  01089        DC  RDM      CHECK THAT BANK IS
```

-continued

```
13E3 0   801C   01090          DC    JCN+AN    AT ZERO
13E4 0   13EC   01091          DC    MAIN6
13E5 0   8050   01092          DC    JMS
13E6 0   1353   01093          DC    ZEROB
13E7 0   80DD   01094          DC    LDM+/D
13E8 0   801A   01095          DC    JCN+CZ    IF ERROR FLAGGED JUMP TO
13E9 0   13B7   01096          DC    ERR6      DISPLAY IT
13EA 0   8050   01097          DC    JMS       CLEAR PHOTOCELL S/R
13EB 0   11B9   01098          DC    CLR
13EC 0   80D0   01099   MAIN6  DC    LDM+0     CLEAR FLAGS FROM STATUS
13ED 0   8021   01100          DC    SRC+0     CHARACTERS
13EE 0   80E5   01101          DC    WR1       (3)
13EF 0   80E6   01102          DC    WR2       (3)
13F0 0   80E7   01103          DC    WR3       (3)
13F1 0   80BB   01104          DC    XCH+/B
13F2 0   80F8   01105          DC    DAC       DECREMENT MEMORY ADDRESS
13F3 0   80BB   01106          DC    XCH+/B
13F4 0   80BD   01107          DC    XCH+/D
13F5 0   80F4   01108          DC    CMA
13F6 0   80BD   01109          DC    XCH+/D
13F7 0   807D   01110          DC    ISZ+/D    COUNT FOR 4 BANKS
13F8 0   1393   01111          DC    MAIN8
13F9 0   8050   01112          DC    JMS       ALWAYS LEAVE METER AT
13FA 0   131B   01113          DC    CNTR1     BANK1
13FB 0   801C   01114          DC    JCN+AN    IF ERROR FLAGGED, JUMP TO
13FC 0   13B7   01115          DC    ERR6      DISPLAY IT
13FD 0   8040   01116          DC    JUN
13FE 0   12F0   01117          DC    ZZE5
                01118   *SUBROUTINE                               08 JUNE 1973
13FF            01119          ORG   /1400
                01120   *SUBROUTINE ADP                            30 JAN 74
                01121   *ROUTINE TO ADD POSTAGE TO METER (BOTH DESCENDING REGISTER
                01122   *AND CONTROL SUM)
1400 0   802C   01123   ADP    DC    FIM+/C
1401 0   00B7   01124          DC    /B7
1402 0   802D   01125          DC    SRC+/C
1403 0   80EC   01126          DC    RD0       (B)  READ STATUS CHARACTER
1404 0   80F6   01127          DC    RAR       CHECK FOR XXX1
1405 0   801A   01128          DC    JCN+CZ
1406 0   143B   01129          DC    ERRR
1407 0   802E   01130          DC    FIM+/E
1408 0   0000   01131          DC    /00
1409 0   806F   01132   RTN1   DC    INC+/F    DETERMINE NUMBER OF CHARACTERS
140A 0   802D   01133          DC    SRC+/C    IN DISPLAY
140B 0   80E9   01134          DC    RDM
140C 0   8014   01135          DC    JCN+AZ
140D 0   1410   01136          DC    END
140E 0   80AF   01137          DC    LD+/F
140F 0   80BE   01138          DC    XCH+/E    AT END, CONTAINS NUMBER OF CHARACTER
1410 0   807D   01139   END    DC    ISZ+/D    IN DISPLAY
1411 0   1409   01140          DC    RTN1
1412 0   80F1   01141          DC    CLC
1413 0   80D6   01142          DC    LDM+6
1414 0   809E   01143          DC    SUB+/E    GO TO ERROR IF TOO MANY
1415 0   801A   01144          DC    JCN+CZ
1416 0   143B   01145          DC    ERRR
1417 0   802A   01146          DC    FIM+/A    DESCENDING REGISTER
1418 0   0000   01147          DC    /00
1419 0   802C   01148          DC    FIM+/C    DISPLAY
141A 0   00B7   01149          DC    /B7
141B 0   802E   01150          DC    FIM+/E
141C 0   00AA   01151          DC    /AA
141D 0   80F1   01152          DC    CLC
141E 0   802D   01153   RTN2   DC    SRC+/C    ADD TO DESCENDING REGISTER
141F 0   80E9   01154          DC    RDM
1420 0   802B   01155          DC    SRC+/A
1421 0   80EB   01156          DC    ADM
1422 0   80FB   01157          DC    DAA
1423 0   80E0   01158          DC    WRM
1424 0   806B   01159          DC    INC+/B
1425 0   806D   01160          DC    INC+/D
1426 0   807E   01161          DC    ISZ+/E
1427 0   141E   01162          DC    RTN2
1428 0   801A   01163          DC    JCN+CZ
1429 0   1441   01164          DC    END1
142A 0   802A   01165          DC    FIM+/A    UNDO ADDITION IF OVERFLOW
```

-continued

```
142B 0  0000   01166        DC    /00
142C 0  802C   01167        DC    FIM+/C
142D 0  00B7   01168        DC    /B7
142E 0  80FA   01169        DC    STC
142F 0  80F9   01170  RTN3  DC    TCS
1430 0  802D   01171        DC    SRC+/C
1431 0  80E8   01172        DC    SBM
1432 0  80F1   01173        DC    CLC
1433 0  802B   01174        DC    SRC+/A
1434 0  80EB   01175        DC    ADM
1435 0  80FB   01176        DC    DAA
1436 0  80E0   01177        DC    WRM
1437 0  806B   01178        DC    INC+/B
1438 0  806D   01179        DC    INC+/D
1439 0  807F   01180        DC    ISZ+/F
143A 0  142F   01181        DC    RTN3
143B 0  802C   01182  ERRR  DC    FIM+/C     ERROR ROUTINE, LOADS MESSAGE INTO
143C 0  00BF   01183        DC    /BF        DISPLAY
143D 0  802D   01184        DC    SRC+/C
143E 0  80DE   01185        DC    LDM+/E
143F 0  80E0   01186        DC    WRM
1440 0  80C0   01187        DC    BBL+0
1441 0  802A   01188  END1  DC    FIM+/A     ADD CONTENTS OF DISPLAY TO CONTROL
1442 0  00B7   01189        DC    /B7        SUM
1443 0  802C   01190        DC    FIM+/C
1444 0  0020   01191        DC    /20
1445 0  80F1   01192        DC    CLC
1446 0  802B   01193  RTN4  DC    SRC+/A
1447 0  80E9   01194        DC    RDM
1448 0  802D   01195        DC    SRC+/C
1449 0  80EB   01196        DC    ADM
144A 0  80FB   01197        DC    DAA
144B 0  80E0   01198        DC    WRM
144C 0  806D   01199        DC    INC+/D
144D 0  807B   01200        DC    ISZ+/B
144E 0  1446   01201        DC    RTN4
144F 0  80C0   01202        DC    BBL+0
               01203  *SUBROUTINE SUBP                          30 JAN 74
               01204  *ROUTINE TO SUBTRACT POSTAGE FROM METER (DESCENDING REGISTER
               01205  *AND CONTROL SUM OPERATED UPON)
1450 0  802C   01206  SUBP  DC    FIM+/C
1451 0  00B7   01207        DC    /B7
1452 0  802D   01208        DC    SRC+/C
1453 0  80EC   01209        DC    RDO        (B)  READ STATUS CHARACTER  CHECK
1454 0  80F6   01210        DC    RAR        FOR XXX1
1455 0  801A   01211        DC    JCN+CZ
1456 0  143B   01212        DC    ERRR
1457 0  802E   01213        DC    FIM+/E
1458 0  0000   01214        DC    /00
1459 0  806F   01215  RTN11 DC    INC+/F     DETERMINE NUMBER OF CHARACTERS IN
145A 0  802D   01216        DC    SRC+/C     DISPLAY
145B 0  80E9   01217        DC    RDM
145C 0  8014   01218        DC    JCN+AZ
145D 0  1460   01219        DC    END11
145E 0  80AF   01220        DC    LD+/F
145F 0  80BE   01221        DC    XCH+/E
1460 0  807D   01222  END11 DC    ISZ+/D
1461 0  1459   01223        DC    RTN11
1462 0  80F1   01224        DC    CLC
1463 0  80D6   01225        DC    LDM+6
1464 0  809E   01226        DC    SUB+/E
1465 0  801A   01227        DC    JCN+CZ     GO TO ERROR ROUTINE IF NUMBER TOO
1466 0  143B   01228        DC    ERRR       LARGE
1467 0  802A   01229        DC    FIM+/A     INITIALIZE REGISTERS
1468 0  0000   01230        DC    /00
1469 0  802C   01231        DC    FIM+/C
146A 0  00B7   01232        DC    /B7
146B 0  802E   01233        DC    FIM+/E
146C 0  00AA   01234        DC    /AA
146D 0  80FA   01235        DC    STC
146E 0  80F9   01236  RTN33 DC    TCS        SUBTRACT DISPLAY FROM DESCENDING
146F 0  802D   01237        DC    SRC+/C     REGISTER
1470 0  80E8   01238        DC    SBM
1471 0  80F1   01239        DC    CLC
1472 0  802B   01240        DC    SRC+/A
1473 0  80EB   01241        DC    ADM
```

-continued

```
1474 0  80FB   01242          DC    DAA
1475 0  80E0   01243          DC    WRM
1476 0  806B   01244          DC    INC+/B
1477 0  806D   01245          DC    INC+/D
1478 0  807F   01246          DC    ISZ+/F
1479 0  146E   01247          DC    RTN33
147A 0  8012   01248          DC    JCN+CN    CHECK TO SEE IF BORROW OCCURRED
147B 0  148D   01249          DC    END12
147C 0  802A   01250          DC    FIM+/A    IF BORROW OCCURRED, ADD DISPLAY
147D 0  0000   01251          DC    /00       CONTENTS BACK TO DESCENDING
147E 0  802C   01252          DC    FIM+/C    REGISTER
147F 0  00B7   01253          DC    /B7
1480 0  80F1   01254          DC    CLC
1481 0  802D   01255    RTN22 DC    SRC+/C
1482 0  80E9   01256          DC    RDM
1483 0  802B   01257          DC    SRC+/A
1484 0  80EB   01258          DC    ADM
1485 0  80FB   01259          DC    DAA
1486 0  80E0   01260          DC    WRM
1487 0  806B   01261          DC    INC+/B
1488 0  806D   01262          DC    INC+/D
1489 0  807E   01263          DC    ISZ+/E
148A 0  1481   01264          DC    RTN22
148B 0  8040   01265          DC    JUN
148C 0  143B   01266          DC    ERRR
148D 0  802A   01267    END12 DC    FIM+/A    SUBTRACT DISPLAY CONTENTS FROM
148E 0  00B7   01268          DC    /B7       CONTROL SUM
148F 0  802C   01269          DC    FIM+/C
1490 0  0020   01270          DC    /20
1491 0  80FA   01271          DC    STC
1492 0  80F9   01272    RTN44 DC    TCS
1493 0  802B   01273          DC    SRC+/A
1494 0  80E8   01274          DC    SBM
1495 0  80F1   01275          DC    CLC
1496 0  802D   01276          DC    SRC+/C
1497 0  80EB   01277          DC    ADM
1498 0  80FB   01278          DC    DAA
1499 0  80E0   01279          DC    WRM
149A 0  806D   01280          DC    INC+/D
149B 0  807B   01281          DC    ISZ+/B
149C 0  1492   01282          DC    RTN44
149D 0  80C0   01283          DC    BBL+0
               01284    *SUBROUTINE CLOCK PULSE                       08 JUNE 1973
               01285    *REGISTER AX  SPECIFIES PORT ADDRESS
149E 0  802B   01286    CP    DC    SRC+/A
149F 0  80E1   01287          DC    WMP       RAMO  WRITE SET-UP WORD
14A0 0  80D0   01288          DC    LDM+0     CLEAR ACCUMULATOR
14A1 0  80E1   01289          DC    WMP       RAMO  END CP
14A2 0  80C0   01290          DC    BBL+0
               01291    *SUBROUTINE CHCK
14A3 0  80DA   01292    CHCK  DC    LDM+/A
14A4 0  80B0   01293          DC    XCH+0     INITIALIZE LOOP COUNTER
14A5 0  8028   01294          DC    FIM+8     DESC ADDRESS
14A6 0  0000   01295          DC    /00
14A7 0  802C   01296          DC    FIM+/C    ASC ADDRESS
14A8 0  0006   01297          DC    /06
14A9 0  802E   01298          DC    FIM+/E    CNTRL ADDRESS
14AA 0  0020   01299          DC    /20
14AB 0  80F1   01300          DC    CLC
14AC 0  8029   01301    CHCK1 DC    SRC+8     READ DESCENDING REGISTER
14AD 0  80E9   01302          DC    RDM
14AE 0  802D   01303          DC    SRC+/C
14AF 0  80EB   01304          DC    ADM       ADD ASCENDING REGISTER
14B0 0  80FB   01305          DC    DAA
14B1 0  80F5   01306          DC    RAL
14B2 0  80BB   01307          DC    XCH+/B    STORE CARRY
14B3 0  80AB   01308          DC    LD+/B
14B4 0  80F6   01309          DC    RAR       RESTORE WORD
14B5 0  80FA   01310          DC    STC
14B6 0  80F4   01311          DC    CMA
14B7 0  802F   01312          DC    SRC+/E
14B8 0  80EB   01313          DC    ADM       COMPARE CNTRL
14B9 0  801C   01314          DC    JCN+AN
14BA 0  14D6   01315          DC    CHCK9     GO TO ERROR MESSAGE
14BB 0  80AB   01316          DC    LD+/B
14BC 0  80F6   01317          DC    RAR       RESTORE CARRY
```

-continued

```
14BD 0  8069   01318        DC   INC+9
14BE 0  806D   01319        DC   INC+/D
14BF 0  806F   01320        DC   INC+/F
14C0 0  8070   01321        DC   ISZ+0
14C1 0  14AC   01322        DC   CHCK1
14C2 0  80D0   01323  CHCK2 DC   LDM+0     PROPAGATE CARRY THROUGH SUM
14C3 0  802D   01324        DC   SRC+/C    ADD CARRY
14C4 0  80EB   01325        DC   ADM
14C5 0  80FB   01326        DC   DAA
14C6 0  80F5   01327        DC   RAL
14C7 0  80BB   01328        DC   XCH+/B    STORE CARRY
14C8 0  80AB   01329        DC   LD+/B
14C9 0  80F6   01330        DC   RAR       RESTORE WORD
14CA 0  80FA   01331        DC   STC
14CB 0  80F4   01332        DC   CMA
14CC 0  802F   01333        DC   SRC+/E
14CD 0  80EB   01334        DC   ADM       COMPARE CNTRL
14CE 0  801C   01335        DC   JCN+AN
14CF 0  14D6   01336        DC   CHCK9     GO TO ERROR MESSAGE
14D0 0  80AB   01337        DC   LD+/B
14D1 0  80F6   01338        DC   RAR       RESTORE CARRY
14D2 0  806F   01339        DC   INC+/F
14D3 0  807D   01340        DC   ISZ+/D
14D4 0  14C2   01341        DC   CHCK2
14D5 0  80C0   01342        DC   BBL+0
14D6 0  8028   01343  CHCK9 DC   FIM+8
14D7 0  008C   01344        DC   /8C
14D8 0  802A   01345        DC   FIM+/A
14D9 0  008B   01346        DC   /8B
14DA 0  8050   01347        DC   JMS
14DB 0  1260   01348        DC   CLEER
14DC 0  8029   01349        DC   SRC+8
14DD 0  80D8   01350        DC   LDM+8
14DE 0  80E0   01351        DC   WRM
14DF 0  80C0   01352        DC   BBL+0
               01353        END -
03C0 0  1000   01354  START NOP
               01355        WDISK
03C8    03C0   01356        END       START
```

```
SYMBOL   VALUE  REL DEFN   REFERENCES

ADD      8080   0   00003  00078,R 00134,R
ADDD     1129   0   00355  00755,R 00760,R
ADDX     112E   0   00360  00363,R 00766,R 00772,R
ADDY     112A   0   00356  00359,R
ADD1     1120   0   00346  00357,R
ADD1X    1122   0   00348  00782,R
ADD2     1123   0   00349  00361,R 00787,R
ADM      80EB   0   00003  00170,R 00193,R 00202,R 00350,R 00735,R 01156,R 01175,R 01196,R 01241,R 01258,R 01277,R
                           01304,R 01313,R 01325,R 01334,R
ADP      1400   0   01123  00716,R
AD1      1216   0   00606  00611,R
AN       000C   0   00003  00091,R 00100,R 00110,R 00130,R 00536,R 00941,R 01052,R 01060,R 01064,R 01078,R 01090,R
                           01114,R 01314,R 01335,R
ASC      1225   0   00627  00263,R
AZ       0004   0   00003  00050,R 00083,R 00095,R 00205,R 00213,R 00380,R 00474,R 00483,R 00495,R 00560,R 00676,R
                           00705,R 00814,R 00837,R 00840,R 00864,R 00867,R 00870,R 00955,R 00961,R 00968,R 01020,R
                           01044,R 01056,R 01082,R 01135,R 01218,R
BBL      80C0   0   00003  00215,R 00218,R 00236,R 00295,R 00319,R 00331,R 00343,R 00354,R 00364,R 00371,R 00386,R
                           00412,R 00478,R 00511,R 00528,R 00564,R 00567,R 00614,R 00617,R 00651,R 00686,R 00694,R
                           00709,R 00718,R 00748,R 00792,R 00798,R 00826,R 00850,R 00856,R 00887,R 00901,R 00917,R
                           00933,R 00934,R 00943,R 00959,R 00966,R 00973,R 00976,R 00986,R 01187,R 01202,R 01283,R
                           01290,R 01342,R 01352,R
BCNT     1221   0   00623  00278,R
BLANK    117A   0   00449  00453,R
BSUM     1222   0   00624  00259,R
CHCK     14A3   0   01292  00034,R 00173,R
CHCK1    14AC   0   01301  01322,R
CHCK2    14C2   0   01323  01341,R
CHCK9    14D6   0   01343  01315,R 01336,R
CHECK    1138   0   00377  00806,R 00819,R
CIRC     1062   0   00116  00117,R 00121,R
CK1      1139   0   00378  00385,R
CK2      113E   0   00383  00381,R
CLB      80F0   0   00003  00612,R 01073,R
CLC      80F1   0   00003  00068,R 00076,R 00089,R 00098,R 00108,R 00127,R 00132,R 00145,R 00147,R 00169,R 00191,R
                           00355,R 00377,R 00701,R 00703,R 00726,R 00731,R 00780,R 00810,R 00812,R 00862,R 01016,R
                           01059,R 01077,R 01141,R 01152,R 01173,R 01192,R 01224,R 01239,R 01254,R 01275,R 01300,R
CLDSP    125E   0   00687  00603,R 00629,R 00655,R 00828,R
CLEAR    123D   0   00654  00297,R
CLEER    1260   0   00689  00019,R 00155,R 00633,R 00664,R 00674,R 00681,R 00685,R 00849,R 01348,R
CLK2     1378   0   00981  00979,R
CLK4     1374   0   00977  00889,R 00891,R 00903,R 00921,R
CLK6     1377   0   00980  00873,R 00875,R 00905,R 00919,R
CLR      11B9   0   00515  00448,R 00490,R 01098,R
CL1      11BC   0   00518  00523,R
CMA      80F4   0   00003  00558,R 01011,R 01022,R 01037,R 01042,R 01108,R 01311,R 01332,R
CMC      80F3   0   00003
CMPAR    109B   0   00180  00165,R 00311,R
CN       0002   0   00003  00468,R 00491,R 00600,R 00896,R 00899,R 00913,R 00926,R 01248,R
```

-continued

| SYMBOL | VALUE | REL | DEFN | REFERENCES |
|---|---|---|---|---|
| CNTRL | 1226 | 0 | 00628 | 00244,R |
| CNTR1 | 1316 | 0 | 00888 | 00865,R 01113,R |
| CNTR2 | 1329 | 0 | 00902 | 00868,R |
| CNTR3 | 1339 | 0 | 00918 | 00871,R |
| CONT3 | 1023 | 0 | 00048 | 00055,R |
| CONT4 | 1029 | 0 | 00054 | 00051,R |
| COUNT | 1223 | 0 | 00625 | 00240,R |
| CP | 149E | 0 | 01286 | 00063,R 00124,R 00340,R |
| CZ | 000A | 0 | 00003 | 00079,R 00216,R 00312,R 00509,R 00562,R 00565,R 00659,R 00729,R 00743,R 00795,R 00821,R 00880,R 00883,R 00910,R 00929,R 01018,R 01071,R 01095,R 01128,R 01144,R 01163,R 01211,R 01227,R |
| C1 | 10A2 | 0 | 00188 | 00197,R |
| C2 | 10AC | 0 | 00200 | 00211,R |
| C3 | 10B4 | 0 | 00209 | 00206,R |
| C4 | 10BB | 0 | 00216 | 00214,R |
| C5 | 10F8 | 0 | 00295 | 00217,R |
| DAA | 80F8 | 0 | 00003 | 00194,R 00203,R 00351,R 00736,R 01157,R 01176,R 01197,R 01242,R 01259,R 01278,R 01305,R 01326,R |
| DAC | 80F8 | 0 | 00003 | 00866,R 00869,R 01105,R |
| DCL | 80FD | 0 | 00003 | |
| DESC | 1224 | 0 | 00626 | 00025,R 00282,R |
| DOWN | 115A | 0 | 00415 | 00276,R |
| DWN1 | 1160 | 0 | 00421 | 00431,R 00434,R |
| DWN2 | 116E | 0 | 00435 | 00440,R |
| DWN3 | 10E7 | 0 | 00275 | 00119,R |
| EIGHT | 1208 | 0 | 00592 | 00280,R |
| ENBLE | 1100 | 0 | 00310 | 00791,R 00845,R |
| END | 1410 | 0 | 01139 | 01136,R |
| END1 | 1441 | 0 | 01188 | 01164,R |
| END11 | 1460 | 0 | 01222 | 01219,R |
| END12 | 148D | 0 | 01267 | 01249,R |
| ERROR | 1133 | 0 | 00367 | 00477,R 00747,R 00825,R 01047,R |
| ERRR | 143B | 0 | 01182 | 01129,R 01145,R 01212,R 01228,R 01266,R |
| ERR1 | 1195 | 0 | 00476 | 00486,R 00498,R 00510,R |
| ERR4 | 11E7 | 0 | 00564 | 00566,R |
| ERR5 | 1349 | 0 | 00934 | 00881,R 00884,R 00897,R 00900,R 00911,R 00914,R 00927,R 00930,R |
| ERR6 | 13B7 | 0 | 01046 | 01053,R 01072,R 01096,R 01115,R |
| FCIN | 12C1 | 0 | 00795 | 00027,R 00158,R |
| FCTN1 | 12C4 | 0 | 00798 | 00796,R |
| FETCH | 108E | 0 | 00226 | 00636,R 00753,R 00758,R 00763,R 00769,R 00775,R |
| FIM | 8020 | 0 | 00003 | 00009,R 00016,R 00024,R 00028,R 00042,R 00044,R 00046,R 00059,R 00114,R 00141,R 00152,R 00159,R 00166,R 00180,R 00182,R 00184,R 00234,R 00315,R 00322,R 00332,R 00367,R 00389,R 00391,R 00393,R 00395,R 00415,R 00417,R 00419,R 00443,R 00454,R 00459,R 00515,R 00531,R 00543,R 00552,R 00593,R 00604,R 00630,R 00641,R 00661,R 00665,R 00667,R 00671,R 00678,R 00682,R 00687,R 00697,R 00721,R 00723,R 00801,R 00829,R 00831,R 00846,R 00852,R 00967,R 00989,R 01000,R 01002,R 01004,R 01006,R 01008,R 01123,R 01130,R 01146,R 01148,R 01150,R 01165,R 01167,R 01182,R 01188,R 01190,R 01206,R 01213,R 01229,R 01231,R 01233,R 01250,R 01252,R 01267,R 01269,R 01294,R 01296,R 01298,R 01343,R 01345,R |
| FIN | 8030 | 0 | 00003 | 00140,R 00229,R 00231,R 00233,R 00534,R |
| FIVE | 1205 | 0 | 00589 | 00261,R |
| FOUR | 1204 | 0 | 00588 | 00260,R |
| HOME | 1174 | 0 | 00443 | 00021,R |
| HOME1 | 1198 | 0 | 00479 | 00469,R 00475,R |
| HOME2 | 11AC | 0 | 00499 | 00492,R |
| HOME3 | 11A0 | 0 | 00487 | 00484,R 00496,R |
| HOME4 | 119A | 0 | 00481 | 00504,R |
| IAC | 80F2 | 0 | 00003 | 00940,R 01023,R |
| INC | 8060 | 0 | 00003 | 00093,R 00195,R 00207,R 00209,R 00230,R 00232,R 00348,R 00353,R 00383,R 00432,R 00451,R 00647,R 00648,R 00740,R 00995,R 01132,R 01159,R 01160,R 01178,R 01179,R 01199,R 01215,R 01244,R 01245,R 01261,R 01262,R 01280,R 01318,R 01319,R 01320,R 01339,R |
| INRAM | 1142 | 0 | 00389 | 00015,R |
| ISZ | 8070 | 0 | 00003 | 00054,R 00116,R 00120,R 00125,R 00196,R 00210,R 00329,R 00341,R 00358,R 00362,R 00384,R 00408,R 00410,R 00430,R 00433,R 00452,R 00503,R 00522,R 00545,R 00548,R 00550,R 00610,R 00649,R 00692,R 00741,R 00783,R 00788,R 00936,R 00938,R 00949,R 00951,R 00996,R 01086,R 01110,R 01139,R 01161,R 01180,R 01200,R 01222,R 01246,R 01263,R 01281,R 01321,R 01340,R |
| JCN | 8010 | 0 | 00003 | 00050,R 00079,R 00083,R 00091,R 00095,R 00100,R 00110,R 00118,R 00130,R 00205,R 00213,R 00216,R 00312,R 00380,R 00468,R 00474,R 00483,R 00491,R 00495,R 00509,R 00536,R 00560,R 00562,R 00565,R 00600,R 00659,R 00676,R 00705,R 00729,R 00743,R 00795,R 00814,R 00821,R 00837,R 00840,R 00864,R 00867,R 00870,R 00880,R 00883,R 00896,R 00899,R 00910,R 00913,R 00926,R 00929,R 00941,R 00955,R 00961,R 00968,R 01018,R 01020,R 01044,R 01052,R 01056,R 01060,R 01064,R 01071,R 01078,R 01082,R 01090,R 01095,R 01114,R 01128,R 01135,R 01144,R 01163,R 01211,R 01218,R 01227,R 01248,R 01314,R 01335,R |
| JIN | 8031 | 0 | 00003 | 00797,R |
| JMS | 8050 | 0 | 00003 | 00014,R 00018,R 00020,R 00026,R 00033,R 00035,R 00062,R 00123,R 00154,R 00157,R 00164,R 00172,R 00174,R 00310,R 00327,R 00339,R 00356,R 00360,R 00447,R 00472,R 00476,R 00481,R 00487,R 00489,R 00493,R 00602,R 00628,R 00632,R 00635,R 00654,R 00663,R 00669,R 00673,R 00680,R 00684,R 00746,R 00752,R 00754,R 00757,R 00759,R 00762,R 00765,R 00768,R 00771,R 00774,R 00781,R 00786,R 00790,R 00805,R 00818,R 00824,R 00827,R 00833,R 00844,R 00848,R 00872,R 00874,R 00876,R 00888,R 00890,R 00892,R 00902,R 00904,R 00906,R 00918,R 00920,R 00922,R 01039,R 01050,R 01092,R 01097,R 01112,R 01347,R |
| JUN | 8040 | 0 | 00003 | 00105,R 00176,R 00275,R 00439,R 00485,R 00497,R 00539,R 00711,R 00715,R 00835,R 00842,R 00978,R 01026,R 01046,R 01074,R 01116,R 01265,R |
| KBP | 80FC | 0 | 00003 | 00085,R |
| KEY1 | 1275 | 0 | 00713 | |
| KEY2 | 1279 | 0 | 00717 | |
| KEY3 | 127A | 0 | 00718 | |
| LD | 80A0 | 0 | 00003 | 00052,R 00069,R 00087,R 00094,R 00102,R 00107,R 00137,R 00212,R 00538,R 00541,R 00596,R 00634,R 00638,R 00820,R 01137,R 01220,R 01308,R 01316,R 01329,R 01337,R |
| LDLMP | 110A | 0 | 00322 | 00036,R 00175,R |
| LDM | 80D0 | 0 | 00003 | 00012,R 00022,R 00031,R 00061,R 00071,R 00077,R 00112,R 00122,R 00128,R 00133,R 00227,R 00314,R 00337,R 00404,R 00406,R 00426,R 00428,R 00435,R 00437,R 00445,R 00470,R 00479,R 00508,R 00518,R 00520,R 00524,R 00526,R 00689,R 00707,R 00745,R 00751,R 00756,R 00761,R 00767,R 00773,R 00803,R 00816,R 00823,R 00851,R 00861,R 00885,R 00915,R 00931,R 00935,R 00944,R 00947,R 00977,R 00980,R 00983,R 01025,R 01029,R 01070,R 01094,R 01099,R 01142,R 01185,R 01225,R 01288,R 01292,R 01323,R 01350,R |
| LD1 | 114A | 0 | 00397 | 00409,R 00411,R |
| MAIN | 1389 | 0 | 01000 | |
| MAIN2 | 13BB | 0 | 01050 | 01045,R 01087,R |
| MAIN3 | 13A5 | 0 | 01028 | 01019,R |
| MAIN4 | 13A7 | 0 | 01030 | 01027,R |
| MAIN6 | 13EC | 0 | 01099 | 01021,R 01091,R |
| MAIN8 | 1393 | 0 | 01010 | 01111,R |

-continued

| SYMBOL | VALUE | REL | DEFN | REFERENCES |
|---|---|---|---|---|
| NINE | 1209 | 0 | 00593 | 00281,R |
| NOP | 8000 | 0 | 00003 | 00008,R 00584,R 00585,R 00586,R 00587,R 00588,R 00589,R 00590,R 00591,R 00592,R 00622,R 00623,R 00624,R 00625,R 00626,R 00627,R 00713,R 00714,R 00717,R 01048,R 01049,R |
| ONE | 1201 | 0 | 00585 | 00241,R |
| OUT | 1116 | 0 | 00334 | 00342,R |
| OUTPT | 1114 | 0 | 00332 | 00328,R |
| PLS | 121F | 0 | 00617 | 00744,R |
| PLUS | 127B | 0 | 00721 | 00301,R |
| POST | 1297 | 0 | 00751 | 00277,R |
| POS51 | 13CB | 0 | 01066 | 01083,R |
| POS53 | 13DD | 0 | 01084 | 01065,R 01075,R |
| POS55 | 13CE | 0 | 01063 | 01061,R |
| POS56 | 13D5 | 0 | 01076 | 01057,R |
| POS58 | 13DA | 0 | 01081 | 01079,R |
| RAL | 80F5 | 0 | 00003 | 00104,R 00338,R 00467,R 00506,R 00507,R 00556,R 00658,R 00702,R 00704,R 00807,R 00811,R 00813,R 00971,R 00972,R 00975,R 01063,R 01068,R 01069,R 01306,R 01327,R |
| RAR | 80F6 | 0 | 00003 | 00072,R 00146,R 00148,R 00335,R 00599,R 00728,R 00879,R 00882,R 00895,R 00898,R 00909,R 00912,R 00925,R 00928,R 00958,R 00964,R 00965,R 01081,R 01127,R 01210,R 01309,R 01317,R 01330,R 01338,R |
| RDM | 80E9 | 0 | 00003 | 00049,R 00065,R 00144,R 00204,R 00325,R 00347,R 00379,R 00422,R 00607,R 00644,R 00733,R 00992,R 01014,R 01033,R 01089,R 01134,R 01154,R 01194,R 01217,R 01256,R 01302,R |
| RDR | 80EA | 0 | 00003 | 00082,R 00398,R 00466,R 00505,R 00555,R 00878,R 00894,R 00908,R 00924,R 00957,R 00963,R 00970,R 00974,R 01067,R |
| RD0 | 80EC | 0 | 00003 | 00535,R 00557,R 00598,R 00657,R 00675,R 00700,R 00727,R 00809,R 01055,R 01126,R 01209,R |
| RD1 | 80ED | 0 | 00003 | 00954,R 01058,R 01076,R |
| RD2 | 80EE | 0 | 00003 | 00839,R 00960,R |
| RD3 | 80EF | 0 | 00003 | 00967,R |
| RTN | 110C | 0 | 00324 | 00330,R |
| RTN00 | 12B1 | 0 | 00777 | 00784,R |
| RTN01 | 12B9 | 0 | 00785 | 00789,R |
| RTN1 | 1409 | 0 | 01132 | 01140,R |
| RTN11 | 1459 | 0 | 01215 | 01223,R |
| RTN2 | 141E | 0 | 01153 | 01162,R |
| RTN22 | 1481 | 0 | 01255 | 01264,R |
| RTN3 | 142F | 0 | 01170 | 01181,R |
| RTN33 | 146E | 0 | 01236 | 01247,R |
| RTN4 | 1446 | 0 | 01193 | 01201,R |
| RTN44 | 1492 | 0 | 01272 | 01282,R |
| SBM | 80E8 | 0 | 00003 | 00190,R 00779,R 01017,R 01172,R 01238,R 01274,R |
| SCAN | 101D | 0 | 00042 | 00177,R |
| SET | 12C5 | 0 | 00801 | 00302,R |
| SETX | 137E | 0 | 00987 | 00843,R |
| SET1 | 1382 | 0 | 00991 | 00997,R |
| SEVEN | 1207 | 0 | 00591 | 00279,R |
| SIX | 1206 | 0 | 00590 | 00262,R |
| SRC | 8021 | 0 | 00003 | 00011,R 00030,R 00048,R 00064,R 00066,R 00073,R 00143,R 00161,R 00168,R 00189,R 00192,R 00201,R 00317,R 00324,R 00346,R 00349,R 00369,R 00378,R 00397,R 00399,R 00401,R 00403,R 00421,R 00423,R 00425,R 00449,R 00456,R 00461,R 00499,R 00517,R 00533,R 00554,R 00595,R 00606,R 00637,R 00643,R 00645,R 00690,R 00699,R 00725,R 00732,R 00734,R 00738,R 00778,R 00854,R 00945,R 00953,R 00981,R 00985,R 00991,R 00993,R 01013,R 01015,R 01030,R 01032,R 01034,R 01054,R 01066,R 01084,R 01088,R 01100,R 01125,R 01133,R 01153,R 01155,R 01171,R 01174,R 01184,R 01193,R 01195,R 01208,R 01216,R 01237,R 01240,R 01255,R 01257,R 01273,R 01276,R 01286,R 01301,R 01303,R 01312,R 01324,R 01333,R 01349,R |
| START | 03C0 | 0 | 01354 | 01356,R |
| STC | 80FA | 0 | 00003 | 00023,R 00103,R 00156,R 00186,R 00382,R 00764,R 00770,R 00776,R 01062,R 01080,R 01169,R 01235,R 01271,R 01310,R 01331,R |
| STEP | 11C7 | 0 | 00531 | 00473,R 00494,R 00563,R 01051,R |
| STEP2 | 11D2 | 0 | 00542 | 00540,R |
| STEP3 | 11D5 | 0 | 00545 | 00546,R 00549,R |
| STEP4 | 11E8 | 0 | 00565 | 00561,R |
| STEP5 | 11D1 | 0 | 00541 | 00537,R |
| STEP6 | 11CA | 0 | 00534 | 00551,R |
| STPB | 1300 | 0 | 00861 | 00482,R 01040,R |
| STRT | 1030 | 0 | 00064 | 00126,R |
| SUB | 8090 | 0 | 00003 | 00070,R 00090,R 00099,R 00109,R 00129,R 00863,R 01143,R 01226,R |
| SUBP | 1450 | 0 | 01206 | 00712,R |
| TCC | 80F7 | 0 | 00003 | |
| TCS | 80F9 | 0 | 00003 | 00188,R 00200,R 00777,R 00785,R 01170,R 01236,R 01272,R |
| THREE | 1203 | 0 | 00587 | 00243,R |
| TN | 0009 | 0 | 00003 | |
| TRANS | 1232 | 0 | 00641 | 00670,R 00834,R |
| TRANZ | 1234 | 0 | 00643 | 00650,R |
| TT1 | 1276 | 0 | 00714 | 00239,R |
| TT2 | 1273 | 0 | 00711 | 00258,R |
| TWO | 1202 | 0 | 00586 | 00242,R |
| TZ | 0001 | 0 | 00003 | 00118,R |
| T1 | 1059 | 0 | 00107 | 00084,R |
| T2 | 105E | 0 | 00112 | 00092,R 00096,R 00101,R |
| T3 | 105F | 0 | 00113 | 00106,R |
| T4 | 1060 | 0 | 00114 | 00080,R 00111,R |
| T5 | 1099 | 0 | 00176 | 00131,R |
| UNLCK | 1266 | 0 | 00697 | 00298,R |
| WAIT | 134A | 0 | 00935 | 00877,R 00893,R 00907,R 00923,R |
| WAIT1 | 134B | 0 | 00936 | 00937,R 00939,R 00942,R |
| WFPC2 | 1358 | 0 | 00949 | 00950,R |
| WFPC3 | 135A | 0 | 00951 | 00952,R |
| WMP | 80E1 | 0 | 00003 | 00013,R 00067,R 00074,R 00402,R 00405,R 00407,R 00424,R 00427,R 00429,R 00436,R 00438,R 00519,R 00521,R 00525,R 00527,R 00542,R 00946,R 00948,R 00982,R 00984,R 01287,R 01289,R |
| WRM | 80E0 | 0 | 00003 | 00032,R 00171,R 00318,R 00352,R 00370,R 00400,R 00450,R 00597,R 00609,R 00639,R 00646,R 00691,R 00737,R 00739,R 00855,R 00994,R 01035,R 01158,R 01177,R 01186,R 01198,R 01243,R 01260,R 01279,R 01351,R |
| WRR | 80E2 | 0 | 00003 | |
| WR0 | 80E4 | 0 | 00003 | 00151,R 00162,R 00457,R 00462,R 00471,R 00559,R 01031,R |
| WR1 | 80E5 | 0 | 00003 | 00458,R 00463,R 00500,R 00886,R 01085,R 01101,R |
| WR2 | 80E6 | 0 | 00003 | 00464,R 00501,R 00613,R 00656,R 00708,R 00932,R 01102,R |
| WR3 | 80E7 | 0 | 00003 | 00465,R 00502,R 00916,R 01103,R |
| WW | 100E | 0 | 00022 | |
| XCH | 80B0 | 0 | 00003 | 00053,R 00086,R 00088,R 00097,R 00113,R 00136,R 00138,R 00226,R 00228,R 00326,R 00334,R 00336,R 00446,R 00480,R 00608,R 00804,R 00808,R 00817,R 01010,R 01012,R 01024,R 01028,R 01036,R 01038,R 01041,R 01043,R 01104,R 01106,R 01107,R 01109,R 01138,R 01221,R 01293,R 01307,R 01328,R |
| Y | 1261 | 0 | 00690 | 00693,R |

-continued

```
SYMBOL      VALUE  REL DEFN     REFERENCES

ZERO        1200   0   00584    00299,R
ZEROB       1353   0   00944    00488,R 01093,R
ZZB1        1296   0   00748    00706,R 00730,R
ZZC1        1244   0   00661
ZZC2        125D   0   00686    00677,R
ZZE1        12E9   0   00837    00822,R
ZZE2        12F7   0   00851    00841,R
ZZE3        12DF   0   00827    00815,R
ZZE4        12EE   0   00842    00838,R
ZZE5        12F0   0   00844    00836,R 01117,R
ZZZ         1227   0   00629
Z1          1363   0   00960    00956,R
Z11         1109   0   00319    00313,R
Z16         1214   0   00604    00601,R
Z2          136A   0   00967    00962,R
Z200        1286   0   00732    00742,R
Z23         1248   0   00665    00660,R
Z3          1371   0   00974    00969,R

   000 OVERFLOW SECTORS SPECIFIED
   000 OVERFLOW SECTORS REQUIRED
   207 SYMBOLS DEFINED
    NO ERROR(S) AND   NO WARNING(S)  FLAGGED IN ABOVE ASSEMBLY

// XEQ RUBOU
```

What is claimed is:

1. A micro computerized postage meter, comprising:

a microcomputer set containing a postage meter program for printing postage and registering said printed postage;

a postage printing mechanism operatively connected to the microcomputer set as a peripheral component thereof, for printing postage in accordance with said postage meter program;

input means operatively connected to said microcomputer set for introducing data into said microcomputer set.

2. The micro computerized postage meter of claim 1, further comprising a display operatively connected to the microcomputer set for displaying postage data and information.

3. The micro computerized postage meter of claim 1, wherein said microcomputer set comprises a non-volatile memory for storing postage information and data.

4. The micro computerized postage meter of claim 3, wherein said memory comprises a number of meter registers containing postage information and data.

5. The micro computerized postage meter of claim 1, wherein said postage printing mechanism comprises monitoring means operatively connected to said microcomputer set for scrutinizing the operation of said postage printing mechanism and informing the microcomputer set of any operating abnormalities in said postage printing mechanism.

6. A micro computerized postage meter, comprising:

a microcomputer set including a processor unit operative in accordance with a postage meter program, and a memory containing ascending and descending postage meter registers;

a keyboard operatively connected to said processor unit for introducing information and data into said microcomputer set; and a postage printing means operatively connected to said processor unit for printing postage in accordance with information and data introduced into said microcomputer set through said keyboard.

7. The micro computerized postage meter of claim 6, wherein said memory further contains a control sum register.

8. The micro computerized postage meter of claim 6, wherein said memory further contains a piece count register.

9. The micro computerized postage meter of claim 6, wherein said memory further contains a batch amount register.

10. The micro computerized postage meter of claim 6, wherein said memory further contains a batch count register.

11. A micro computerized postage meter, comprising:

a microcomputer set including a processor unit operative in accordance with a postage meter program, said program containing a base postage generating routine and a routine for adding an additional postage value to the base postage value;

a postage printing means operatively connected to said processor unit for printing postage in accordance with said postage meter program; and a keyboard operatively connected to said processor unit for introducing information and data into said microcomputer set, said keyboard having means for invoking the routine for adding an additional postage value to said base postage value, whereby said postage printing means will print postage of a value comprising said base postage and said additional postage.

* * * * *

UNITED STATES PATENT AND TRADEMARK OFFICE
CERTIFICATE OF CORRECTION

PATENT NO. : 3,978,457

DATED : August 31, 1976

INVENTOR(S) : Frank T. Check, Jr., Alton B. Eckert, Jr. Joseph R. Warren

It is certified that error appears in the above-identified patent and that said Letters Patent are hereby corrected as shown below:

Column 7, line 25, change "PCU" to -- CPU --.

Column 8, line 61, change "16" to -- lb --.

line 65, change "dorr" to -- door --.

Column 10, line 50, after "computer" insert -- system --.

lines 58 & 59, change "$5/8_1$ & $5/8_2$" to -- $\emptyset_1$ & $\emptyset_2$ --.

line 61, change "Manula" to -- Manual --.

Column 11, line 29, change "mychansim" to -- mechanism --.

Column 12, line 5, change "52" to -- 51 --.

Column 13, line 62, change "th" to -- the --.

Column 15, line 7, change "fo" to -- of --.

line 47, before the word "button" insert -- ± --.

Column 18, line 4, change "indistructable" to -- indestructable --

Column 19, line 35, change "Panaplexdisplay" to -- Panaplex display --.

Column 21, line 43, change "will" to -- with --.

Column 23, line 39, change "Proceeds" to -- proceeds --.

line 40, change "band" to -- bank --.

UNITED STATES PATENT AND TRADEMARK OFFICE

CERTIFICATE OF CORRECTION

PATENT NO. : 3,978,457

DATED : August 31, 1976

INVENTOR(S) : Frank T. Check, Jr., Alton B. Eckert, Jr. Joseph R. Warren

It is certified that error appears in the above-identified patent and that said Letters Patent are hereby corrected as shown below:

Column 24, line 24, change "ib" to -- lb --.

line 68 (note at bottom of page), change "Row work" to -- Row word --.

Column 25, line 2 (carryover of note from previous page), change "duscussion" to -- discussion --.

Column 29, line 22, the second occurrence of "ld" should be changed to -- lamp --.

Column 32, line 22, change "not" to -- no --.

line 42, change "(block 598)" to -- (block 589) --.

Column 33, the footnote at the top of this column should end after the first two sentences. The remaining material should not be there but is a continuation of the description.

line 21, change "(there.." to -- (There.. --.

Column 34, line 1, change "FIG. 31" to -- FIG. 3 --.

line 16, change "Manular" to -- Manual --.

in table under Appendium A, 1st section under "Comments" change "R is even, refers to register pair R, R-1" to -- R is even, refers to register pair R, R+1 --.

UNITED STATES PATENT OFFICE

CERTIFICATE OF CORRECTION

Patent No. 3,978,457 Dated August 31, 1976

Inventor(s) Frank T. Check, Jr., et al.

It is certified that error appears in the above-identified patent and that said Letters Patent are hereby corrected as shown below:

Column 77, line 29, claim 1, after "program;" insert -- and --.

Signed and Sealed this

*Sixth* Day of *September 1977*

[SEAL]

*Attest:*

RUTH C. MASON
*Attesting Officer*

LUTRELLE F. PARKER
*Acting Commissioner of Patents and Trademarks*

UNITED STATES PATENT AND TRADEMARK OFFICE

CERTIFICATE OF CORRECTION

PATENT NO. : 3,978,457

DATED : August 31, 1976

INVENTOR(S) : Frank T. Check, Jr., Alton B. Eckert, Jr., Joseph R. Warren

It is certified that error appears in the above-identified patent and that said Letters Patent are hereby corrected as shown below:

Column 1, line 17, Ser. No. 337,234 should be -- Ser. No. 377,234 --.

Signed and Sealed this

*Fourth* Day of *December 1979*

[SEAL]

*Attest:*

SIDNEY A. DIAMOND

*Attesting Officer* *Commissioner of Patents and Trademarks*

UNITED STATES PATENT AND TRADEMARK OFFICE
CERTIFICATE OF CORRECTION

PATENT NO. : 3,978,457

DATED : August 31, 1976

INVENTOR(S) : Frank T. Check, Jr., Alton B. Eckert, Jr., Joseph R. Warren

It is certified that error appears in the above—identified patent and that said Letters Patent is hereby corrected as shown below:

In the drawings, sheet 5, figure 3, change "100" to --100A--; change "101" to --101A--; change "102" to --102A--; change "103" to --103A--; change "104" to --104A--; change "108" to --108A--; change "109" to --109A--; change "110" to --110A--. Sheet 6, figure 4a, change "108" to --108A--; change "109" to --109A--; change "110" to --110A--. Sheet 15, figure 16, connect the common line of the lamps of the lower left row to the -24 volt source via a 300 ohm resistor. Sheet 19, figure 20, change "305" to --305A--; change "307" to --307A--; change "309" to --309A--; change "311" to --311A--; figure 21, in block 316, change "FIG. 38" to --FIG. 39--. Sheet 23, figure 26, in the Subroutine Label column change "ADD" TO --ADP--; and change "SUBD" to --SUBP--. Sheet 25, figure 31, change the title of the figure to --ADP--. Sheet 27, figure 34, in block 478, change "0" to --Ø--. Sheet 27, figure 35, in blocks 421 and 422, change "O" to --Ø--. Sheet 28, figure 39, in block 665, change "Work" to --Word--. Sheet 31, figure 46, change the label "CLDSD" to --CLDSP-- (two occasions). Sheet 32, figure 48, blocks 646 and 648, change "solenoids" to --solenoid--; in block 631, change "solenoid" to --solenoids--. In the specification: Column 3, line 24, change "data" to --date--. Column 8, line 60, change "120" to --100--; line 62, change "120" to --100--. Column 11, line 3,

UNITED STATES PATENT AND TRADEMARK OFFICE
CERTIFICATE OF CORRECTION

PATENT NO. : 3,978,457

DATED : August 31, 1976

INVENTOR(S) : Frank T. Check, Jr., Alton B. Eckert, Jr., Joseph R. Warren

It is certified that error appears in the above—identified patent and that said Letters Patent is hereby corrected as shown below:

change "and" (first occurrence) to --in--. Column 12, line 44, change "arm" (second occurrence) to --arrow--. Column 13, line 7, change "100" to --100A--; line 17, change "101" to --101A--, change "102" to --102A--; line 19, change "103" to --103A--; change "104" to --104A--; line 30, change "108" to --108A--; line 31, change "109" to --109A--; change "110" to --110A--; line 33, change "108" to --108A--; line 34, change "108" to --108A--; lines 35, 37, 39, 40 and 44, change "109" to --109A--; line 41, change "110" to --110A-- (two occasions); line 63, change "page 66" to --column 36--. Column 14, line 2, change "(FIGS. 25 and 25a)" to --(FIG. 25)--. Column 16, line 47, change "13a" to --139--. Column 18, line 4, change "indestructable", as corrected in the Certificate of Correction of September 6, 1977, to --indestructible--. Column 18, line 46, change "as" to --at--; line 66, change "memory, to preserve the emory" to --time to preserve the memory--. Column 19, line 2, change "worse" to --worst--. Column 23, line 17, change "via (line" to --(via line--. Column 25, line 8, change "make" to --made--. Column 26, line 17, omit the second 30; line 24, change "200" to --(200)--; line 36, change "aroutien" to --routine--. Column 26, line 57, change "(" to --i.e.--; before "block" insert --(--; change ";" to --,--; line 58, before "the" insert --,--. Column 29, line 3,

UNITED STATES PATENT AND TRADEMARK OFFICE

CERTIFICATE OF CORRECTION

PATENT NO. : 3,978,457

DATED : August 31, 1976

INVENTOR(S) : Frank T. Check, Jr., Alton B. Eckert, Jr., Joseph R. Warren

It is certified that error appears in the above—identified patent and that said Letters Patent is hereby corrected as shown below:

change "410" to --401--; line 21, change "8ato" to --8a to--. Column 30, line 10, insert the symbol $\geq$ between the words "register" and "meter"; line 26, change "contents" to --content--. Column 31, line 5, change "write" to --writes--; line 23, change "SET routine of FIG. 28" to --SETX routine of FIG. 50--; line 40, change "102 and 103" to --102A and 104A--. Column 32, line 17, change "different" to --difference--; line 34, change "587" to --581--. Column 34, line 9, change "(1c)" to --(/C)--. In columns 49 and 50, statement number 00536 of the program, change "PATTERM" to --PATTERN--. In columns 63 and 64, statement number 01052 of the program, change "TP" to --TO--. In columns 65 and 66, statement number 01138 of the program, change "CHARACTER" to --CHARACTERS--.

Signed and Sealed this

*Fifteenth* Day of *November 1983*

[SEAL]

*Attest:*

GERALD J. MOSSINGHOFF

*Attesting Officer* *Commissioner of Patents and Trademarks*